US012133161B2

(12) United States Patent
Jang et al.

(10) Patent No.: US 12,133,161 B2
(45) Date of Patent: Oct. 29, 2024

(54) METHOD AND APPARATUS OF EXPLICIT LINKAGE BETWEEN REPETITIVE TRANSMISSION AND RECEPTION FOR DOWNLINK CONTROL INFORMATION IN WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Taehyoung Kim, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 271 days.

(21) Appl. No.: 17/576,143

(22) Filed: Jan. 14, 2022

(65) Prior Publication Data
US 2022/0240160 A1 Jul. 28, 2022

(30) Foreign Application Priority Data

Jan. 15, 2021 (KR) .................. 10-2021-0006228
Aug. 24, 2021 (KR) .................. 10-2021-0111897
Jan. 14, 2022 (KR) .................. 10-2022-0006110

(51) Int. Cl.
*H04W 48/12* (2009.01)
*H04L 5/00* (2006.01)
*H04W 72/23* (2023.01)

(52) U.S. Cl.
CPC ............ *H04W 48/12* (2013.01); *H04L 5/001* (2013.01); *H04L 5/0053* (2013.01); *H04W 72/23* (2023.01)

(58) Field of Classification Search
CPC .......... H04W 72/23–232; H04W 48/12; H04L 5/001; H04L 5/0053
See application file for complete search history.

(56) References Cited

U.S. PATENT DOCUMENTS

2022/0304037 A1* 9/2022 Zhang .................. H04L 5/0053
2023/0371043 A1* 11/2023 Pan ..................... H04W 72/232

FOREIGN PATENT DOCUMENTS

WO  WO 2019/099435  5/2019

OTHER PUBLICATIONS

CATT, "Discussion on Enhancements on Multi-TRP/panel for PDCCH, PUCCH and PUSCH", R1-2007825, 3GPP TSG RAN WG1 Meeting #103-e, Oct. 26-Nov. 13, 2020, 15 pages.

(Continued)

*Primary Examiner* — Kevin C. Harper
(74) *Attorney, Agent, or Firm* — The Farrell Law Firm, P.C.

(57) ABSTRACT

A method performed by a terminal in a wireless communication system is provided. The method includes receiving configuration information for configuring one or more search space sets; identifying a connection between one or more PDCCH candidates of a first search space set and one or more PDCCH candidates of a second search space set, based on the configuration information; and monitoring the one or more PDCCH candidates of the first search space set and the one or more PDCCH candidates of the second search space set to receive repeated PDCCHs, wherein the one or more PDCCH candidates of the first search space set and the one or more PDCCH candidates of the second search space set are linked based on having a same aggregation level and a same PDCCH candidate index.

7 Claims, 21 Drawing Sheets

(56) References Cited

OTHER PUBLICATIONS

Spreadtrum Communications, "Discussion on Enhancements on Multi-TRP for PDCCH, PUCCH and PUSCH", R1-2009142, 3GPP TSG RAN WG1 #103-e, Oct. 26-Nov. 13, 2020, 13 pages.
Ericsson, "On PDCCH, PUCCH and PUSCH Enhancements with Multiple TRPs", R1-2009223, 3GPP TSG-RAN WG1 Meeting #103, Oct. 26-Nov. 13, 2020, 23 pages.
Convida Wireless, "Multi-TRP Enhancements for PDCCH, PUCCH and PUSCH", R1-2009159, 3GPP TSG-RAN WG1#103-e, Oct. 26-Nov. 13, 2020, 6 pages.
International Search Report dated Apr. 13, 2022 Issued in counterpart application No. PCT/KR2022/000797, 7 pages.
Qualcomm Incorporated, "Summary #1 of email discussion [102-e-NR-feMIMO-02]", R1-2007180, 3GPP TSG RAN WG1 Meeting #102-e, Aug. 17-28, 2020, 63 pages.
Ericsson, "Remaining Issues of PDCCH Enhancements for NR URLLC", R1-2000230, 3GPP TSG-RAN WG1 Meeting #100-e, Feb. 24-Mar. 6, 2020, 26 pages.
European Search Report dated Feb. 23, 2024 issued in counterpart application No. 22739799.9-1213, 10 pages.

\* cited by examiner

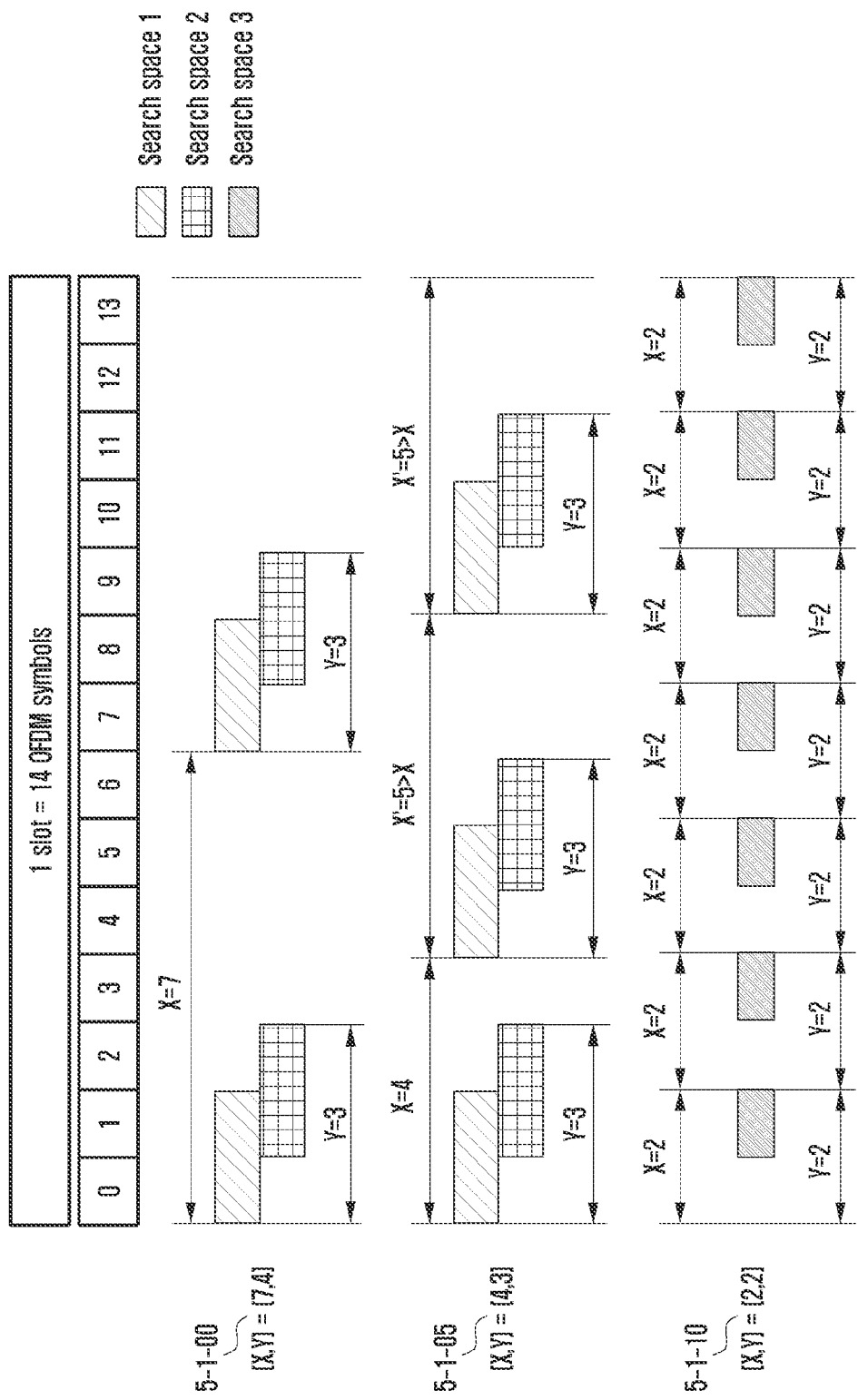

METHOD AND APPARATUS OF EXPLICIT LINKAGE BETWEEN REPETITIVE TRANSMISSION AND RECEPTION FOR DOWNLINK CONTROL INFORMATION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0006228, filed on Jan. 15, 2021, in the Korean Intellectual Property Office, Korean Patent Application No. 10-2021-0111897, filed on Aug. 24, 2021, in the Korean Intellectual Property Office, and Korean Patent Application No. 10-2022-0006110, filed on Jan. 14, 2022, in the Korean Intellectual Property Office, the disclosures of which are incorporated herein by reference in their entireties.

BACKGROUND

1. Field

The disclosure relates generally to operations of a user equipment (UE) and a base station (BS) in a wireless communication system and, particularly, to a method of explicit linkage during downlink control information repetition transmission in a wireless communication system.

2. Description of Related Art

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a "Beyond 4G Network" or a "Post Long-Term Evolution (LTE) System." The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation. In the 5G system, hybrid frequency shift keying (FSK) and quadrature amplitude modulation (QAM) modulation (FQAM), sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and Big Data processing technology through connection with a cloud server, has emerged. As technology elements, such as a "sensing technology," a "wired or wireless communication and network infrastructure," a "service interface technology," and a "security technology" have been demanded for IoT implementation, a sensor network, a machine-to-machine (M2M) communication, and a machine type communication (MTC), have been recently researched. Such an IoT environment may provide intelligent Internet technology services that create a new value to human life by collecting and analyzing data generated among connected things. IoT may be applied to a variety of fields including smart home fields, smart building fields, smart city fields, smart car fields, connected car fields, smart grid fields, health care fields, smart appliance fields and advanced medical services fields through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of a convergence between the 5G technology and the IoT technology.

With the advancement of wirless communication systems as described above, various services can be provided and, accordingly, there is a need for schemes to effectively provide these services.

SUMMARY

The present disclosure has been made to address the above-mentioned problems and disadvantages, and to provide at least the advantages described below.

According to an aspect of the present disclosure, a method performed by a terminal in a wireless communication system includes receiving configuration information for configuring one or more search space (SS) sets; identifying a linkage between one or more physical downlink control channel (PDCCH) candidates in a first SS set and one or more PDCCH candidates in a second SS set based on the configuration information; and monitoring one or more PDCCH candidates in the first SS set and one or more PDCCH candidates in the second SS set for a repetition of PDCCH reception, wherein the one or more PDCCH candidates in the first SS set and the one or more PDCCH candidates in the second SS set are linked based on having a same aggregation level and a same PDCCH candidate index.

According to another aspect of the disclosure, a method performed by a BS in a wireless communication system includes transmitting, to a terminal, configuration information for configuring one or more SS sets; and transmitting repeatedly, to the terminal, a PDCCH in one or more PDCCH candidates in a first SS set and one or more PDCCH candidates in a second SS set, the PDCCH candidates being linked based on the configuration information, wherein the one or more PDCCH candidates in the first SS set and the one or more PDCCH candidates in the second SS set are linked based on having a same aggregation level and a same PDCCH candidate index.

According to another aspect of the disclosure, a terminal of a wireless communication system includes a transceiver configured to receive configuration information for configuring one or more SS sets; and a controller configured to identify a linkage between one or more PDCCH candidates in a first SS set and one or more PDCCH candidates in a second SS set based on the configuration information; and monitor one or more PDCCH candidates in the first SS set and one or more PDCCH candidates in the second SS set for a repetition of PDCCH reception, wherein the one or more PDCCH candidates in the first SS set and the one or more PDCCH candidates in the second SS set are linked based on having a same aggregation level and a same PDCCH candidate index.

According to another aspect of the disclosure, a BS of a wireless communication system includes a transceiver configured to transmit configuration information for configuring one or more SS sets to a terminal; and a controller configured to control the transceiver to repeatedly transmit, to the terminal, a PDCCH in one or more PDCCH candidates of a first search space set and one or more PDCCH candidates of a second search space set that are linked based on the configuration information, wherein the one or more PDCCH candidates in the first SS set and the one or more PDCCH candidates in the second SS set are linked based on having a same aggregation level and a same PDCCH candidate index.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B illustrates a case in which the UE may have a plurality of PDCCH monitoring locations within a slot through a span in a wireless communication system, according to an embodiment of the disclosure;

DETAILED DESCRIPTION

Figure 1:
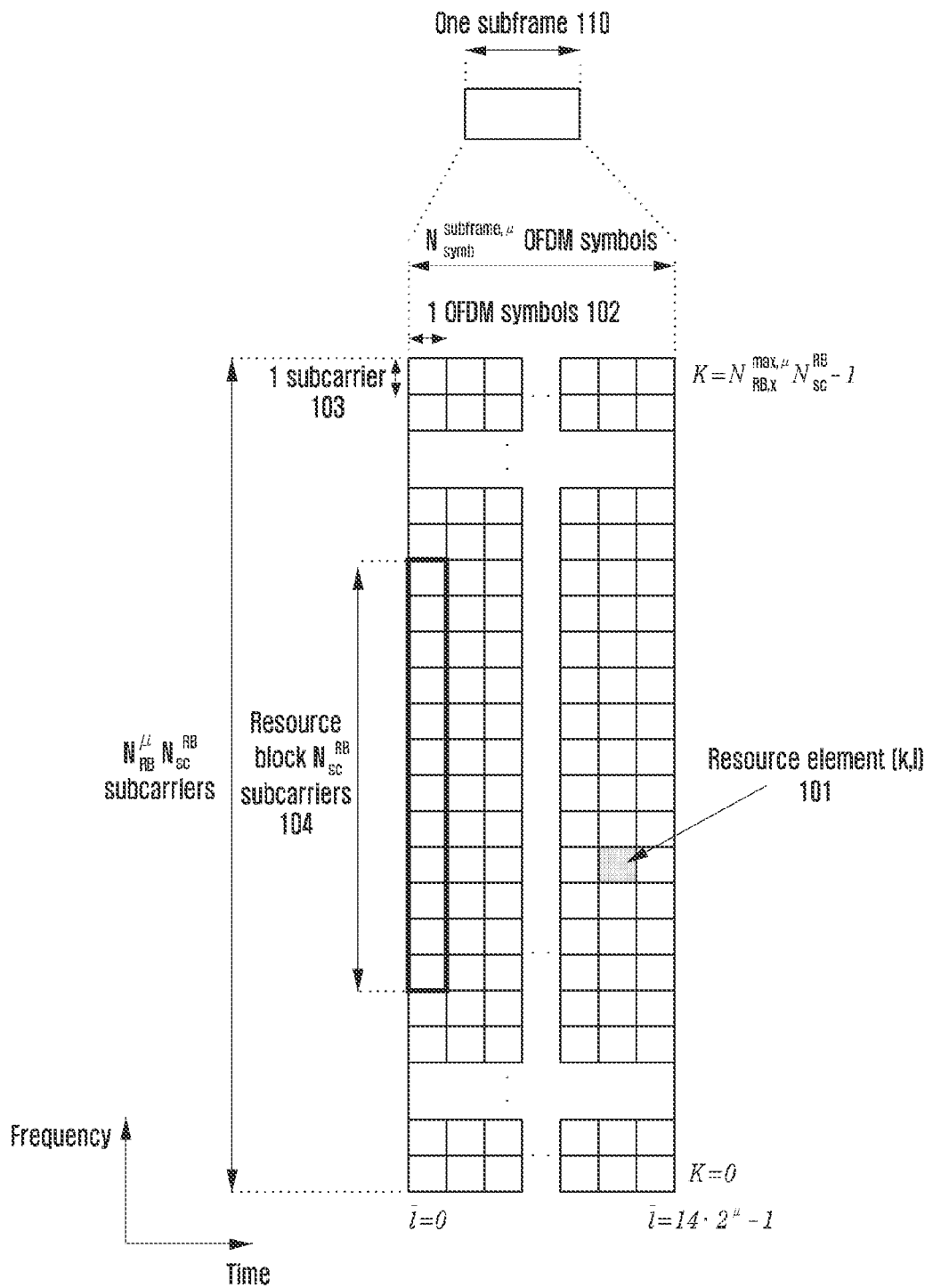
FIG. 1 illustrates a basic structure of a time-frequency domain in a wireless communication system, according to an embodiment of the disclosure.

A disclosed embodiment provides an apparatus and a method capable of effectively providing a service in a mobile communication system.

Specifically, an embodiment of the disclosure provides a method of configuring a connection of SS sets/PDCCH candidates for monitoring repeatedly transmitted control information.

According to various embodiments of the disclosure, a service can be effectively provided in a mobile communication system.

According to an embodiment of the disclosure, SS sets/PDCCH candidates for monitoring repeatedly transmitted control information can be configured.

In addition, according to an embodiment of the disclosure, terminal capability for linked SS sets/connected PDCCH candidates can be reported in consideration of the complexity of a terminal, and the SS sets/PDCCH candidates can be configured according to the terminal capability.

The effects obtainable in the disclosure are not limited to the above-mentioned effects, and other effects not mentioned herein will be clearly understood from the following description by those skilled in the art to which the disclosure belongs.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

In the drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a BS, a wireless access unit, a BS controller, and a node on a network. A terminal may include a UE, a mobile station (MS), a cellular phone, a smartphone, a computer, or a multimedia system capable of performing communication functions. In the disclosure, a "downlink" refers to a radio link via which a BS transmits a signal to a terminal, and an "uplink" refers to a radio link via which a terminal transmits a signal to a BS. Further, although the following description may be directed to a long term evolution (LTE) or LTE-A system by way of example, embodiments of the disclosure may also be applied to other communication systems having similar technical backgrounds or channel types to the embodiments of the disclosure. Examples of other communication systems may include 5G new radio (NR) developed beyond LTE-A, and in the following description, "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed concurrently or the blocks may sometimes be executed in the reverse order, depending upon the functionality involved.

As used herein, "unit" refers to a software element or a hardware element, such as a field programmable gate array (FPGA) or an application specific integrated circuit (ASIC), which performs a predetermined function. However, the term "unit" does not always have a meaning limited to software or hardware. "Unit" may be constructed either to be stored in an addressable storage medium or to execute one or more processors. Therefore, "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may either be combined into a smaller number of elements, or a "unit", or divided into a larger number of elements, or a "unit". Moreover, the elements and "units" may be implemented to reproduce one or more CPUs within a device or a security multimedia card. Further, the term "unit" in the embodiments may include one or more processors.

A wireless communication system has developed into a broadband wireless communication system that provides a high-speed and high-quality packet data service according to communication standards such as high-speed packet access (HSPA) of third generation partnership project (3GPP), LTE or evolved universal terrestrial radio access (E-UTRA), LTE-advanced (LTE-A), LTE-Pro, high rate packet data (HRPD) of 3GPP2, ultra mobile broadband (UMB), and 802.16e of the Institute of Electrical and Electronics Engineers (IEEE) beyond the initially provided voice-based service.

An LTE system, which is a representative example of the broadband wireless communication system, employs an orthogonal frequency division multiplexing (OFDM) scheme for a downlink (DL) (the term "downlink" and the term "DL" are used interchangeably throughout the disclosure), and employs a single carrier frequency division multiple access (SC-FDMA) scheme for an uplink (UL) (the term "uplink" and the term "UL" are used interchangeably throughout the disclosure). The uplink is a radio link through which a UE (or an MS) transmits data or a control signal to a BS (or an eNode B), and the downlink is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine type communication (mMTC), and ultra reliability low latency communication (URLLC).

The eMBB aims to provide a data transmission rate which is improved so as to surpass the data transmission speed supported by conventional LTE, LTE-A, or LTE-Pro. For example, in the 5G communication system, the eMBB should provide a peak downlink data rate of 20 gigabits per second (Gbps) and a peak uplink data rate of 10 Gbps from the viewpoint of one BS. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 megahertz (MHz) to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the IoT, mMTC is considered in the 5G communication system. The mMTC is required to support access of a multitude of UEs within a cell, improve coverage of the UE, increase a battery lifetime, and reduce the costs of the UE in order to efficiently provide IoT technology. IoT technology is used in conjunction with various sensors and devices to provide communication, and thus should support a large number of UEs (for example, 1,000,000 UEs/kilometer$^2$ (km$^2$)) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC needs to be produced at low cost and it is difficult to frequently exchange a battery thereof. Thus, a long battery lifetime, for example, 10 to 15 years, may be required.

The URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds and also have a requirement of a packet error rate equal to or smaller than $10^{-5}$. Accordingly, for services supporting the URLLC, the 5G system should provide a transmit time interval (TTI) smaller than that of other systems and also have a design requirement of allocating a wide array of resources in a frequency band in order to guarantee reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services. Of course, 5G is not limited to the above-described three services.

Hereinafter, a frame structure of a 5G system is described in more detail with reference to the drawings.

FIG. 1 illustrates a basic structure of a time-frequency domain in a wireless communication system, according to an embodiment of the disclosure. For example, FIG. 1 illustrates a basic structure of a time-frequency domain which is a radio resource domain in which data or a control channel is transmitted in a 5G system.

In FIG. 1, a horizontal axis indicates a time domain and a vertical axis indicates a frequency domain. The basic unit of resources in the time and frequency domain is a resource element (RE) 101 and may be defined as 1 orthogonal frequency division multiplexing (OFDM) symbol 102 in the time axis and 1 subcarrier 103 in the frequency axis. In the frequency domain, $N_{SC}^{RB}$ (for example, 12) successive REs may correspond to one resource block (RB) 104.

Figure 2:
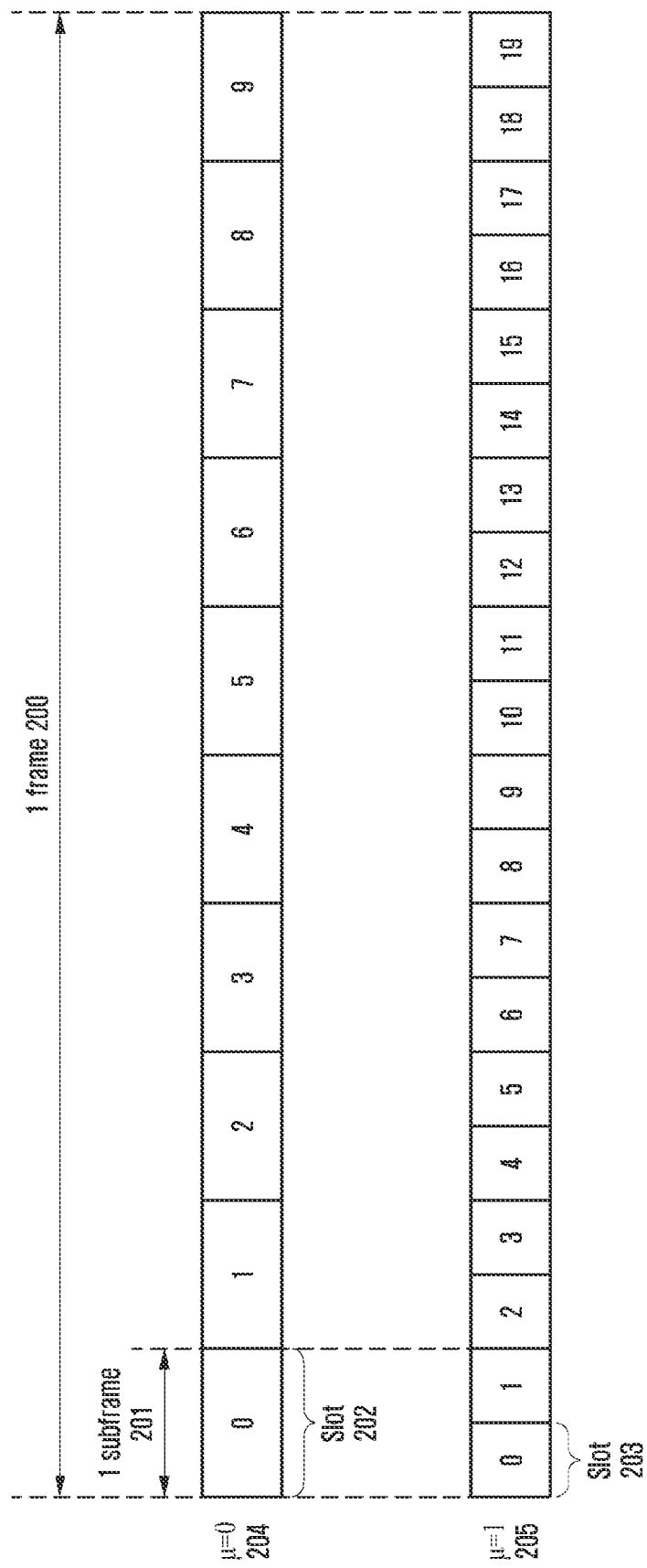
FIG. 2 illustrates frame, subframe, and slot structures in a wireless communication system, according to an embodiment of the disclosure.

FIG. 2 illustrates frame, subframe, and slot structures in a wireless communication system, according to an embodiment of the disclosure. For example, FIG. 2 illustrates frame, subframe, and slot structures in a wireless communication system (e.g., a 5G system).

In FIG. 2, an example of the structure of a frame 200, a subframe 201, and a slot 202 is illustrated. 1 frame 200 may be defined as 10 milliseconds (ms). 1 subframe 201 may be defined as 1 ms, and accordingly one frame 200 may include a total of 10 subframes 201. 1 slot 202 or 203 may be defined as 14 OFDM symbols (that is, the number symbols $N_{symb}^{slot}$ per slot=14). 1 subframe 201 may include one or a plurality of slots 202 and 203, and the number of slots 202 or 203 per subframe 201 may vary depending on a configuration value μ 204 or 205 for subcarrier spacing. FIG. 2 illustrates the case in which the subcarrier spacing configuration value 204 is μ=0 and the case in which the subcarrier spacing configuration value 205 is μ=1. 1 subframe 201 may include one slot 202 in the case of μ=0 204, and 1 subframe 201 may include 2 slots 203 in the case of μ=1 205. That is, the number ($N_{slot}^{subframe,\mu}$) of slots per subframe may vary depending on the configuration value (μ) for subcarrier spacing, and accordingly the number ($N_{slot}^{frame,\mu}$) of slots per frame may vary. The number ($N_{slot}^{subframe,\mu}$) and the number ($N_{slot}^{frame,\mu}$) according to the subcarrier spacing configuration value μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| $\mu$ | $N_{symb}^{slot}$ | $N_{slot}^{frame, \mu}$ | $N_{slot}^{subframe, \mu}$ |
|---|---|---|---|
| 4 | 14 | 160 | 16 |
| 5 | 14 | 320 | 32 |

Subsequently, a configuration of a bandwidth part (BWP) ("bandwidth part" and "BWP" are used interchangeably throughout the disclosure) in a 5G system is described in detail with reference to the drawings.

Figure 3:
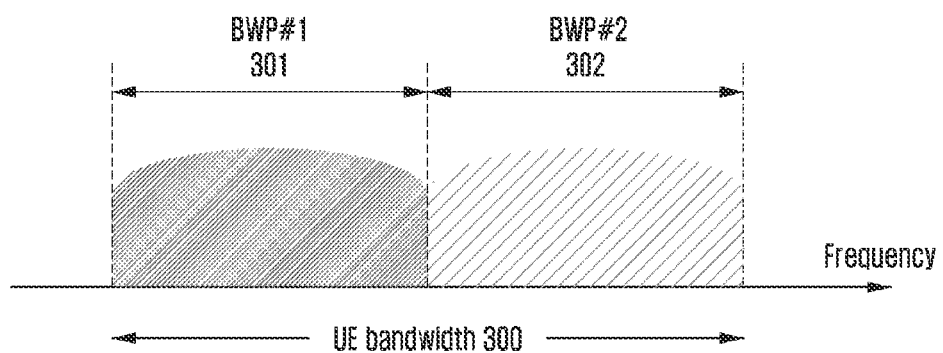
FIG. 3 illustrates an example of a configuration of a bandwidth part in a wireless communication system, according to an embodiment of the disclosure.

FIG. 3 illustrates an example of a configuration of a bandwidth part in a wireless communication system, according to an embodiment of the disclosure. For example, FIG. 3 illustrates an example of a configuration for a BWP in a 5G system.

In FIG. 3, a UE bandwidth 300 is configured as two bandwidth parts, that is, BWP #1 301 and BWP #2 302. The BS may configure one or a plurality of BWPs in the UE, and the following information provided below in Table 2 may be configured to each BWP.

TABLE 2

| BWP ::= | SEQUENCE { |
|---|---|
| bwp-Id | BWP-Id, |
| (bandwidth part identity) | |
| locationAndBandwidth | INTEGER (1..65536), |
| (bandwidth part location) | |
| subcarrierSpacing | ENUMERATED {n0, |
| n1, n2, n3, n4, n5}, | |
| (Subcarrier spacing) | |
| cyclicPrefix | ENUMERATED |
| { extended } | |
| (cyclic prefix) | |
| } | |

Of course, the disclosure is not limited to the aforementioned example, and various parameters related to a BWP as well as the configuration information may be configured in the UE. The information may be transmitted to the UE from the BS through higher-layer signaling, for example, radio resource control (RRC) signaling. Among one or a plurality of configured BWPs, at least one BSP may be activated. Information indicating whether to activate the configured BWPs may be semi-statically transferred from the BS to the UE through RRC signaling or may be dynamically transferred through DCI.

The UE may receive a configuration of an initial BWP for initial access from the BS through a master information block (MIB) before the RRC connection. More specifically, the UE may receive configuration information for a CORESET ("CORESET" and "control resource set" are used interchangeably throughout the disclosure) and a search space (the term "search space" and the term "SS" are used interchangeably throughout the disclosure) in which a PDCCH for receiving system information (remaining system information (RMSI) or system information block 1 (SIB1)) required for initial access through the MIB can be transmitted in an initial access step. The control resource set and the search space configured as the MIB may be considered as an identity (ID) 0. The BS may inform the UE of configuration information such as frequency allocation information for control resource set #0, time allocation information, and numerology, through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0.

The configuration for the BWP supported by the 5G system may be used for various purposes.

When a bandwidth supported by the UE is narrower than a system bandwidth, it may be supported through the BWP configuration. For example, the BS may configure a frequency location (configuration information 2) of the BWP in the UE, and thus the UE may transmit and receive data at a specific frequency location within the system bandwidth.

Further, in order to support different numerologies, the BS may configure a plurality of BWPs in the UE. For example, in order to support the UE to perform data transmission and reception using both subcarrier spacing of 15 kilohertz (kHz) and subcarrier spacing of 30 kHz, two BWPs may be configured as subcarrier spacings of 15 kHz and 30 kHz, respectively. Different BWPs may be frequency division-multiplexed, and when data is to be transmitted and received at specific subcarrier spacing, BWPs configured at the corresponding subcarrier spacing may be activated.

In order to reduce power consumption of the UE, the BS may configure BWPs having different sizes of bandwidths in the UE. When the UE supports a very large bandwidth, e.g., 100 MHz, but always transmits and receives data through the bandwidth, a very high power consumption may be generated. Particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively narrow bandwidth, e.g., 200 MHz. The UE may perform a monitoring operation in the bandwidth part of 200 MHz in the state in which there is no traffic, and if data is generated, may transmit and receive data through the bandwidth part of 100 MHz according to an instruction from the BS.

In a method of configuring the BWP, UEs before the RRC connection may receive configuration information for an initial bandwidth part through an MIB in an initial access step. More specifically, the UE may receive a configuration of a CORESET for a downlink control channel in which DCI for scheduling an SIB can be transmitted from an MIB of a physical broadcast channel (PBCH). A bandwidth of the control resource set configured as the MIB may be considered as an initial bandwidth part, and the UE may receive a PDSCH, in which the SIB is transmitted, through the configured initial bandwidth part. The initial BWP may be used not only for reception of the SIB but also other system information (OSI), paging, or random access (RA) (the term "random access" and the term "RA" are used interchangeably throughout the disclosure).

When one or more BWPs are configured in the UE, the BS may indicate a change (or switching or transition) in the BWPs to the UE through a BWP indicator field within the DCI. For example, in FIG. 3, when a currently activated BWP of the UE is BWP #1 301, the BS may indicate BWP #2 302 to the UE through a BWP indicator within DCI and the UE may make a BWP change to BWP #2 302 indicated by the received BWP indicator within DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, the standard has defined requirements for a delay time ($T_{BWP}$) required for the BWP change, and may be defined as shown below in Table 3.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the smaller SCS between the SCS before BWP switch and the SCS after BWP switch.

The requirements for the BWP change delay time may support type 1 or type 2 according to a UE capability. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot n+$T_{BWP}$ and transmit and receive a data channel scheduled by the corresponding DCI in the changed new BWP. When the BS desires to schedule a data channel in the new BWP, the BS may determine time domain resource allocation for the data cannel in consideration of the BWP change delay time ($T_{BWP}$) of the UE. That is, when scheduling the data channel in the new BWP, the BS may schedule the corresponding data channel after the BWP change delay time using a method of determining the time domain resource allocation for the data channel. Accordingly, the UE may not expect that the DCI indicating the BWP change indicates a slot offset ($K_0$ or $K_2$) smaller than the BWP change delay time ($T_{BWP}$).

If the UE receives DCI indicating the BWP change (for example, DCI format 1_1 or 0_1), the UE may perform no transmission or reception during a time interval from a third symbol of a slot for receiving the PDCCH including the corresponding DCI to a start point of the slot indicated by the slot offset (K0 or K2) indicated through a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

Subsequently, a synchronization signal/PBCH block in a 5G system is described.

The synchronization signal/PBCH block may be a physical layer channel block including a primary synchronization signal (PSS), a secondary synchronization signal (SSS), and a PBCH. A detailed description thereof is made below.

PSS is a signal which is a reference of downlink time/frequency synchronization and provides some pieces of information of a cell ID.

SSS is a reference of downlink time/frequency synchronization and provides the remaining cell ID information which the PSS does not provide. In addition, the SSS serves as a reference signal for demodulation of a PBCH.

PBCH provides necessary system information required for transmitting and receiving a data channel and a control channel by the UE. The necessary system information may include search space-related control information indicating radio resource mapping information of the control channel and scheduling control information for a separate data channel for transmitting system information.

Synchronization signal/PBCH block includes a combination of PSS, SSS, and PBCH. One or a plurality of synchronization signal/PBCH blocks may be transmitted within a time of 5 ms, and each of the transmitted synchronization signal/PBCH blocks may be separated by an index.

The UE may detect the PSS and the SSS in an initial access stage and decode the PBCH. The UE may acquire an MIB from the PBCH and receive a configuration of CORESET #0 (corresponding to a control resource set having control resource set index 0) therefrom. The UE may monitor control resource set #0 on the basis of the assumption that the selected SS/PBCH block and a demodulation reference signal (DMRS) transmitted in control resource set #0 are quasi co-located (QCLed). The UE may receive system information through downlink control information transmitted in control resource set #0. The UE may acquire configuration information related to a random access channel (RACH) required for initial access from the received system information. The UE may transmit a physical RACH (PRACH) to the BS in consideration of the selected synchronization signal/PBCH block index, and the BS receiving the PRACH may acquire the synchronization signal/PBCH block index selected by the UE. The BS may know which block is selected by the UE from among the synchronization signal/PBCH blocks and that CORESET #0 related thereto is monitored.

Subsequently, DCI in a 5G system is described in detail.

In the 5G system, scheduling information for uplink data (or a physical uplink data channel (a PUSCH)) or downlink data (or a physical downlink data channel (a PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a PDCCH via a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, or a random access response, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information shown below in Table 4.

TABLE 4

Identifier for DCI formats - [1] bit
Frequency domain resource assignment - $\lceil \log_2(N_{RB}^{UL, BWP}(N_{RB}^{UL, BWP} + 1)/2) \rceil$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
UL/supplementary UL (SUL) indicator - 0 or 1 bit DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information shown below in Table 5.

TABLE 5

Carrier indicator—0 or 3 bits
UL/SUL indicator—0 or 1 bit
Identifier for DCI formats—[1] bits
Bandwidth part indicator—0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment—1, 2, 3, or 4 bits
Virtual resource block (VRB)-to-physical resource block (PRB) mapping—0 or 1 bit, only for resource allocation type 1.
    0 bit if only resource allocation type 0 is configured;
    1 bit otherwise.
Frequency hopping flag—0 or 1 bit, only for resource allocation type 1.
    0 bit if only resource allocation type 0 is configured;
    1 bit otherwise.
Modulation and coding scheme—5 bits
New data indicator—1 bit
Redundancy version—2 bits
HARQ process number—4 bits
1st downlink assignment index—1 or 2 bits
    1 bit for semi-static HARQ-ACK codebook;
    2 bits for dynamic HARQ-ACK codebook with single HARQ-ACK codebook.
2nd downlink assignment index—0 or 2 bits
    2 bits for dynamic HARQ-ACK codebook with two HARQ-ACK sub-codebooks;
    0 bit otherwise.
TPC command for scheduled PUSCH—2 bits SRS resource indicator $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers—up to 6 bits
Antenna ports—up to 5 bits
SRS request—2 bits
Channel state information (CSI) request—0, 1, 2, 3, 4, 5, or 6 bits
Code block group (CBG) transmission information—0, 2, 4, 6, or 8 bits
Phase tracking reference signal (PTRS)-DMRS association—0 or 2 bits.
beta_offset indicator—0 or 2 bits
DMRS sequence initialization—0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the following information shown below in Table 6.

TABLE 6

Identifier for DCI formats - [1] bit
Frequency domain resource assignment -$\lceil \log_2(N_{RB}^{DL, BWP}(N_{RB}^{DL, BWP} + 1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information shown below in Table 7.

TABLE 7

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL, BWP}/P \rceil$ bits
    For resource allocation type 1, $\lceil \log_2(N_{RB}^{DL, BWP}(N_{RB}^{DL, BWP} + 1)/2) \rceil$ bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 0 or 1 bit
Rate matching indicator - 0, 1, or 2 bits
Zero power (ZP) CSI-reference signal (RS) trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
Code block group (CBG) transmission information - 0, 2, 4, 6, or 8 bits
CBG flushing out information - 0 or 1 bit
DMRS sequence initialization - 1 bit Subsequently, a downlink control channel in a 5G communication system is described in more detail with reference to the drawings.

Figure 4:
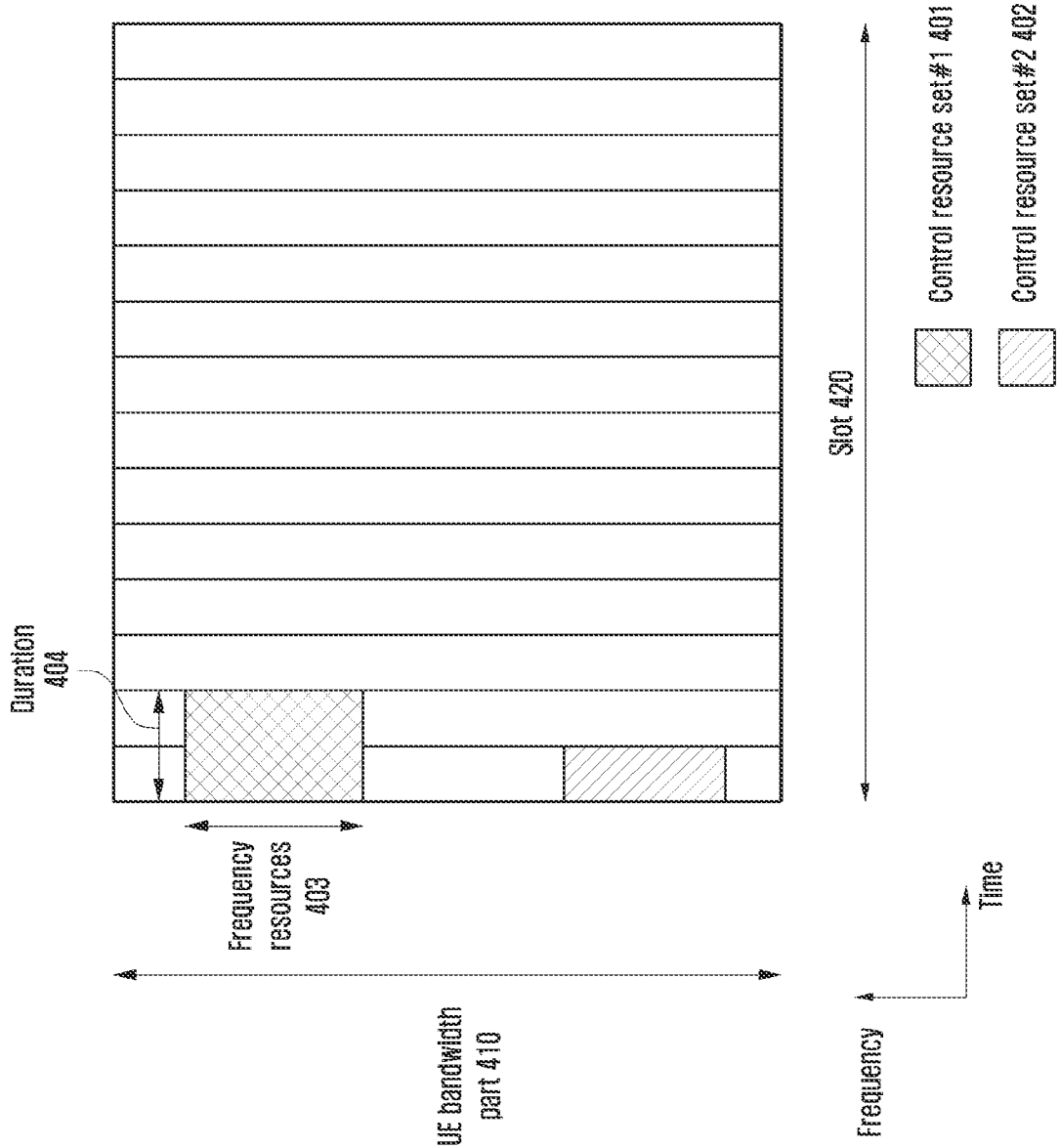
FIG. 4 illustrates an example of a configuration of a control region of a downlink control channel in a wireless communication system, according to an embodiment of the disclosure.

FIG. 4 illustrates an example of a configuration of a control region of a downlink control channel in a wireless communication system, according to an embodiment of the disclosure. For example, FIG. 4 illustrates an example of a CORESET in which a downlink control channel is transmitted in 5G wireless communication systems.

FIG. 4 illustrates an example in which a UE bandwidth part 410 is configured in the frequency axis and control resource set #1 401 and control resource set #2 402 are configured within 1 slot 420 in the time axis. The control resource sets 401 and 402 may be configured in specific frequency resources 403 within a total UE BWP 410 in the frequency axis. The control resource set may be configured as one or a plurality of OFDM symbols in the time axis, which may be defined as a control resource set duration 404.

Referring to the example illustrated in FIG. 4, control resource set #1 401 may be configured as a control resource set duration of 2 symbols, and control resource set #2 402 may be configured as a control resource set duration of 1 symbol.

The control resource sets in the 5G system may be configured through higher-layer signaling (for example, an SIB, an MIB, or RRC signaling) in the UE by the BS. Configuring the control resource set in the UE may mean providing information such as a control resource set identity, a frequency location of the control resource set, and a symbol length of the control resource set. For example, the following information may be included as shown below in Table 8.

TABLE 8

```
ControlResourceSet ::=                    SEQUENCE {
    -- Corresponds to L1 parameter 'CORESET-ID'
    controlResourceSetId
    ControlResourceSetId,
    (control resource set identity)
    frequencyDomainResources        BIT STRING
(SIZE (45)),
    (frequency axis resource allocation information)
    duration
        INTEGER (1..maxCoReSetDuration),
    (time axis resource allocation information)
    cce-REG-MappingType
    CHOICE {
    (CCE-to-REG mapping scheme)
        interleaved
        SEQUENCE {
            reg-BundleSize
            ENUMERATED {n2, n3, n6},
            (REG bundle size)
            precoderGranularity
            ENUMERATED {sameAsREG-bundle, allContiguousRBs},
            interleaverSize
            ENUMERATED {n2, n3, n6}
                (interleaver size)
                shiftIndex
            INTEGER(0..maxNrofPhysicalResourceBlocks-1)
                                           OPTIONAL
            (interleaver shift)
        },
        nonInterleaved                  NULL
    },
    tci-StatesPDCCH
    SEQUENCE(SIZE (1..maxNrofTCI-StatesPDCCH)) OF TCI-StateId
            OPTIONAL,
    (QCL configuration information)
    tci-PresentInDCI
        ENUMERATED {enabled}
                                    OPTIONAL,
    -- Need S
}
```

In Table 8, tci-StatesPDCCH (referred to as a transmission configuration indication (TCI) state) configuration information may include information on one or a plurality of synchronization signal/PBCH block indexes or CSI-RS indexes having the quasi co-located (QCL) relationship with a DMRS transmitted in the corresponding CORESET.

Figure 5A:
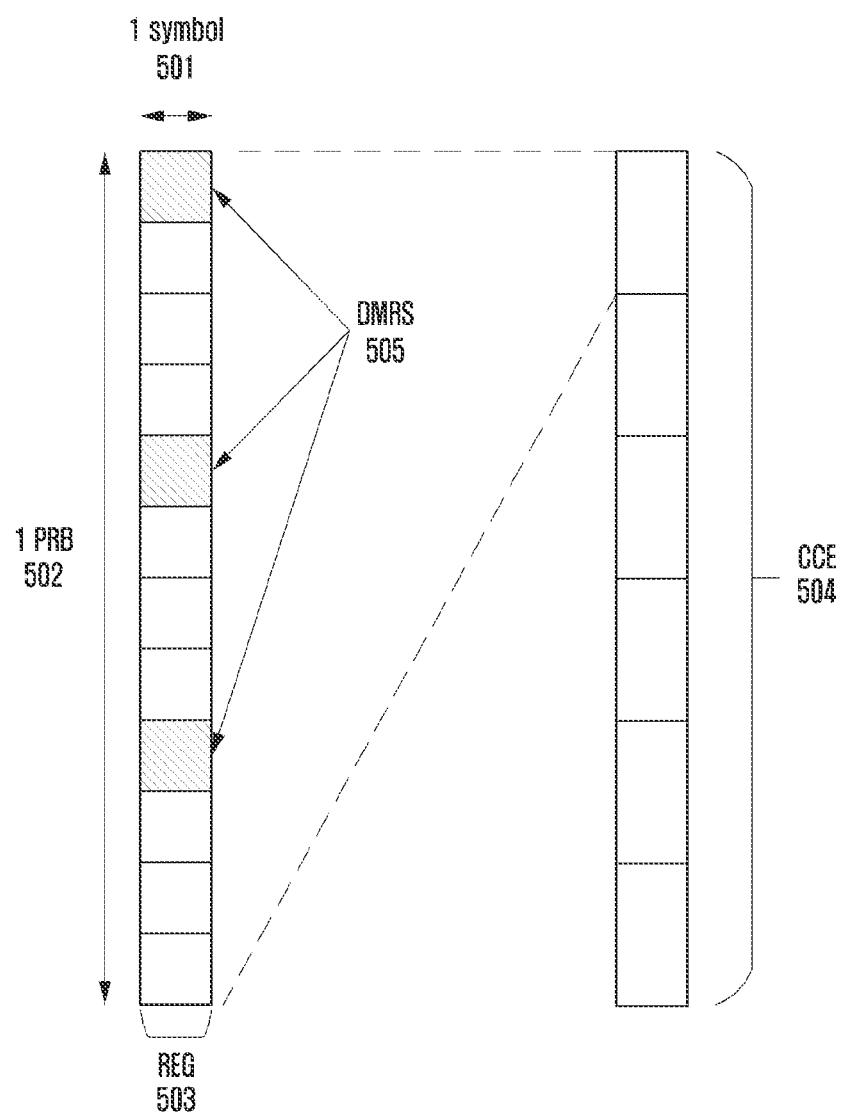
FIG. 5A illustrates a structure of a downlink control channel in a wireless communication system, according to an embodiment of the disclosure.

FIG. 5A illustrates a structure of a downlink control channel in a wireless communication system, according to an embodiment of the disclosure. For example, FIG. 5A illustrates an example of a basic unit of time and frequency resources included in a downlink control channel which can be used in a 5G system.

Referring to FIG. 5A, the basic unit of time and frequency resources included in the control channel may be a resource element group (REG) 503, and the REG 503 may be defined as 1 OFDM symbol 501 in the time axis and 1 PRB 502 in the frequency axis, that is, as 12 subcarriers. The BS may configure a downlink control channel allocation unit by concatenating the REGs 503.

As illustrated in FIG. 5A, when the basic unit for allocation of the downlink control channel in the 5G system is a control channel eminent (CCE) 504, 1 CCE 504 may include a plurality of REGs 503. In a description of the REG 503 illustrated in FIG. 5A by way of example, the REG 503 may include 12 REs and, when 1 CCE 504 includes 5 REGs 503, 1 CCE 504 may include 72 REs. When a downlink CORESET is configured, the corresponding area may include a plurality of CCEs 504, and a specific downlink control channel may be mapped to one or a plurality of CCEs 504 according to an aggregation level (AL) within the CORESET and then transmitted. CCEs 504 within the CORESET may be distinguished by numbers and the numbers of the CCEs 504 may be assigned according to a logical mapping scheme.

The basic unit of the downlink control channel illustrated in FIG. 5A, that is, the REG 503, may include all of the REs to which the DCI is mapped and the areas to which DMRSs 505, which are reference signals for decoding the REs, are mapped. As illustrated in FIG. 5A, 3 DMRSs 505 may be transmitted in 1 REG 503 The number of CCEs required to transmit the PDCCH may be 1, 2, 4, 8, or 15 according to the aggregation level (AL), and the different number of CCEs may be used to implement link adaptation of the downlink control channel. For example, if AL=L, one downlink control channel may be transmitted through L CCEs.

The UE should detect a signal in the state in which the UE does not know information on the downlink control channel, and a search space indicating a set of CCEs is defined to perform blind decoding in a wireless communication system (for example, 5G or NR system). The search space is a set of downlink control channel candidates including CCEs for which the UE should attempt decoding at the given aggregation level, and there are several aggregation levels at which one set of CCEs is configured by 1, 2, 4, 8, and 15 CCEs, so that the UE may have a plurality of search spaces. A search space set may be defined as a set of search spaces at all the configured aggregation levels.

The search space may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for (monitoring) a common search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

A parameter for a search space of a PDCCH in a wireless communication system (for example, a 5G or NR system) may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a control resource set index for monitoring the search space. For example, the following information shown below in Table 9 may be included in the information configured by the BS.

TABLE 9

```
SearchSpace ::=                                    SEQUENCE {
    -- Identity of the search space. SearchSpaceId = 0 identifies the
    SearchSpace configured via PBCH (MIB) or ServingCellConfigCommon.
        searchSpaceId
        SearchSpaceId,
    (search space identifier)
        controlResourceSetId
        ControlResourceSetId,
    (control resource set identifier)
        monitoringSlotPeriodicityAndOffset         CHOICE {
    (monitoring slot level period)
            sl1
            NULL,
            sl2
            INTEGER (0..1),
            sl4
            INTEGER (0..3),
            sl5
            INTEGER (0..4),
            sl8
            INTEGER (0..7),
            sl10
            INTEGER (0..9),
            sl16
            INTEGER (0..15),
            sl20
            INTEGER (0..19)
        }
        OPTIONAL,
    duration (monitoring length)                   INTEGER (2..2559)
        monitoringSymbolsWithinSlot                BIT
STRING (SIZE (14))
        OPTIONAL,
    (monitoring symbol within slot)
        nrofCandidates
        SEQUENCE {
    (number of PDCCH candidates at each aggregation level)
            aggregationLevel1
            ENUMERATED {n0, n1, n2, n3, n4, n5, n6, n8},
            aggregationLevel2
            ENUMERATED {n0, n1, n2, n3, n4, n5, n6, n8},
            aggregationLevel4
            ENUMERATED {n0, n1, n2, n3, n4, n5, n6, n8},
            aggregationLevel8
            ENUMERATED {n0, n1, n2, n3, n4, n5, n6, n8},
            aggregationLevel16
            ENUMERATED {n0, n1, n2, n3, n4, n5, n6, n8}
        },
        searchSpaceType
        CHOICE {
    (search space type)
    -- Configures this search space as common search space (CSS) and
DCI formats to monitor.
            common
            SEQUENCE {
    (common search space)
            }
            ue-Specific
            SEQUENCE {
    (UE-specific search space)
    -- Indicates whether the UE monitors in this USS for DCI
formats 0-0 and 1-0 or for formats 0-1 and 1-1.
                formats
                ENUMERATED {formats0-0-And-1-0, formats0-1-And-1-1},
                ...
            }
```

The BS may configure one or a plurality of search space sets in the UE according to configuration information. The BS may configure search space set 1 and search space set 2 in the UE, and the configuration may be performed such that DCI format A scrambled by an X-RNTI (e.g., a first RNTI) in search space set 1 is monitored in the common search space and DCI format B scrambled by a Y-RNTI (e.g., a second RNTI) in search space set 2 is monitored in the UE-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

DCI format 0_0/1_0 with CRC scrambled by cell-RNTI (C-RNTI), configured scheduling (CS)-RNTI, semi-persistent (SP)-CSI-RNTI, RA-RNTI, temporary cell (TC)-RNTI, paging (P)-RNTI, and system information (SI)-RNTI;

DCI format 2_0 with CRC scrambled by SFI-RNTI;

DCI format 2_1 with CRC scrambled by interruption (INT)-RNTI;

DCI format 2_2 with CRC scrambled by TPC-PUSCH-RNTI and TPC-PUCCH-RNTI; and

DCI format 2_3 with CRC scrambled by TPC-SRS-RNTI.

In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, and TC-RNTI; and

DCI format 1_0/1_1 with CRC scrambled by C-RNTI, CS-RNTI, and TC-RNTI.

The described RNTIs may follow the following definitions and uses.

C-RNTI: used for scheduling UE-specific PDSCH;

TC-RNTI: used for UE-specific PDSCH scheduling;

CS-RNTI: used for semi-statically configured UE-specific PDSCH scheduling;

RA-RNTI: used for PDSCH scheduling at random access stage;

P-RNTI: used for PDSCH scheduling through which paging is transmitted;

SI-RNTI: used for PDSCH scheduling through which system information is transmitted;

INT-RNTI: used for indicating whether puncturing is performed for PDSCH;

TPC for PUSCH RNTI (TPC-PUSCH-RNTI): used for indicating PUSCH power control command;

TPC for PUCCH RNTI (TPC-PUCCH-RNTI): used for indicating PUCCH power control command;

TPC for SRS RNTI (TPC-SRS-RNTI): used for indicating SRS power control command;

The DCI formats may follow the following definition shown below in Table 10.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE 10-continued

| DCI format | Usage |
| --- | --- |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A control resource set p and a search space of an aggregation level L in a search space set s in a wireless communication system (for example, a 5G or NR system) may be expressed as shown below in Equation (1).

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{Equation (1)}$$

L: aggregation level;
$n_{CI}$: carrier index;
$N_{CCE,p}$: total number of CCEs existing within control resource set p;
$n_{s,f}^{\mu}$: slot index; and
$M_{p,s,max}^{(L)}$: number of PDCCH candidates at aggregation level L.
In addition, $m_{s,n_{CI}} = 0, \ldots, M_{s,n_{CI}}^{(L)} - 1$, where $M_{s,n_{CI}}^{(L)}$ is the number of PDCCH candidates the UE is configured to monitor for aggregation level L of a search space set s for a serving cell corresponding to $n_{CI}$;
for a common search space, $M_{s,max}^{(L)} = M_{s,0}^{(L)}$;
for a UE-specific search space, $M_{s,max}^{(L)}$ is the maximum of $M_{s,n_{CI}}^{(L)}$ over all configured $n_{CI}$ values for a CCE aggregation level L of search space set s;
i=0, . . . , L−1;
$n_{RNTI}$: terminal identity; and
for a common search space, $Y_{p,n_{s,f}^{\mu}} = 0$.
For a UE-specific search space, the value of $Y_{p,n_{s,f}^{\mu}}$ may correspond to a value varying depending on the terminal's identity (C-RNTI or ID configured for the terminal by the BS) and the time index. For the UE-specific search space, $Y_{p,n_{s,f}^{\mu}} = (A_p \cdot Y_{p,n_{s,f}^{\mu}-1}) \bmod D$, $Y_{p,-1} = n_{RNTI} \neq 0$, $A_p = 39827$ for pmod3=0, $A_p = 39829$ for pmod3=1, $A_p = 39839$ for pmod3=2, and D=65537.

In a wireless communication system (for example, a 5G or NR system), a set of search space sets monitored by the UE at every time point may vary as a plurality of search space sets can be configured as different parameters (for example, the parameters in Table 9). When search space set #1 is configured on an X-slot period, search space set #2 is configured on a Y-slot period, and X and Y are different from each other. The UE may monitor all of search space set #1 and search space set #2 in a specific slot and monitor one of search space set #1 and search space set #2 in another specific slot.

The UE may report a UE capability in the case in which a plurality of PDCCH monitoring locations exist within the slot and, at this time, the concept "span" may be used. The span is consecutive symbols in which the UE can monitor a PDCCH within the slot, and each PDCCH monitoring location may be within 1 span. The span may be expressed by (X,Y), in which X refers to the minimum number of symbols which should be spaced apart between first symbols of two consecutive spans and Y refers to the number of consecutive symbols for monitoring a PDCCH within 1 span. At this time, the UE may monitor the PDCCH in a section within Y symbols from the first symbol of the span within the span.

FIG. 5B illustrates a case in which the UE may have a plurality of PDCCH monitoring locations within a slot through a span in a wireless communication system, according to an embodiment of the disclosure.

Referring to FIG. 5B, the span is expressed by (X,Y)= (7,4), (4,3), and (2,2), and the three cases are expressed as 5-1-00, 5-1-05, and 5-1-10 in FIG. 5B. For example, 5-1-00 indicates the case in which the number of spans which can be expressed by (7,4) is 2 is in the slot. An interval between first symbols of the two spans is expressed as X=7, a PDCCH monitoring location may exist within a total of Y=3 symbols from the first symbol of each span, and search spaces 1 and 2 exist within Y=3 symbols. In another example, 5-1-05 indicates the case in which a total number of spans which can be expressed by (4,3) is 3 is in the slot, and an interval between a second span and a third span is X'=5 symbols larger than X=4.

The slot location of the common search space and the UE-specific search space is indicated by a monitoringSymbolsWithinSlot parameter in Table 11, shown below, and the symbol location within the slot is indicated by a bitmap through a monitoringSymbolsWithinSlot parameter in Table 9, shown above. Meanwhile, the symbol location within the slot in which the UE can perform search space monitoring may be reported to the BS through the following UE capability.

UE capability 1 (hereinafter, referred to as "FG 3-1" or index "3-1") will now be described. When the number of monitoring occasions (MOs) (the term "monitoring occasion" and the term "MO" are used interchangeably throughout the disclosure) for type 1 and type 3 search spaces or the UE-specific search space is 1 within the slot, the UE capability is a capability to monitor the corresponding MO if the corresponding MO is within first 3 symbols in the slot. The UE capability is a mandatory capability which all UEs supporting NR should support and whether to support the capability is not explicitly reported to the BS.

TABLE 11

| Index | Feature group | Components | Field name in TS 38.331 [2] |
| --- | --- | --- | --- |
| 3-1 | Basic DL control channel | 1) One configured CORESET per BWP per cell in addition to CORESET0-CORESET resource allocation of 6RB bit-map and duration of 1-3 OFDM symbols for (FR)1. For type 1 CSS without dedicated RRC configuration and for type 0, 0A, and 2 CSSs, CORESET resource allocation of 6RB bit-map and duration 1-3 OFDM | n/a |

TABLE 11-continued

| Index | Feature group | Components | Field name in TS 38.331 [2] |
|---|---|---|---|
| | | symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, or 16<br>UP to 3 search space sets in a slot for a scheduled secondary cell (SCell) per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter, referred to as "FG 3-2" or index "3-2") will now be described. When the number of MOs for the common search space or the UE-specific search space is one within the slot as shown in Table 12 below, the UE capability is a capability to perform monitoring regardless of the start symbol location of the corresponding MO. The UE capability can be optionally supported by the UE, and whether to support the capability is explicitly reported to the BS.

UE capability 3 (hereinafter, referred to as "FG 3-5", "FG 3-5a", "FG 3-5b", index "3-5", index "3-5a", or index "3-5b") will now be described. When the number of MOs for the common search space or the UE-specific search space is plural within the slot, as shown in Table 13 below, the UE capability indicates a pattern of MOs which the UE can monitor. The pattern includes an interval X between start symbols of different MOs and a maximum symbol length Y of one MO. A combination of (X,Y) supported by the UE

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot. | pdcchMonitoringSingleOccasion | may be one or more of {(2,2), (4,3), (7,3)}. The UE capability can be optionally supported by the UE, and whether to support the capability and the combination (X,Y) are explicitly reported to the BS.

TABLE 13

| Index | Feature group | Components |
|---|---|---|
| 3-5 | For type 1 CSS with dedicated RRC configuration, type 3 CSS, and UE-SS, monitoring occasion can be any OFDM symbol(s) of a slot for Case 2. | For type 1 CSS with dedicated RRC configuration, type 3 CSS, and UE-SS, monitoring occasion can be any OFDM symbol(s) of a slot for Case 2. |
| 3-5a | For type 1 CSS with dedicated RRC configuration, type 3 CSS, and UE-SS, monitoring occasion can be any OFDM symbol(s) of a slot for Case 2 with a DCI gap. | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and a UL unicast DCI in different monitoring occasions where at least one of them is not the monitoring occasions of FG-3-1, for a same UE as: 2 OFDM symbols for 15 kHz; 4 OFDM symbols for 30 kHz; 7 OFDM symbols for 60 kHz with NCP; or 11 OFDM symbols for 120 kHz for up to one unicast DL DCI and up to one unicast UL DCI in a monitoring occasion except for the monitoring occasions of FG 3-1. For TDD, the minimum separation between the first two UL unicast DCIs within the first 3 OFDM symbols of a slot can be zero OFDM symbols. |
| 3-5b | All PDCCH monitoring occasions can be any OFDM symbol(s) of a slot for Case 2 with a span gap. | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), $0 \leq l \leq 13$ is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled component carrier (CC) across this set of monitoring occasions for FDD. Processing one unicast DCI scheduling DL and two unicast DCI scheduling UL per scheduled CC across this set of monitoring occasions for TDD. Processing two unicast DCI scheduling DL |

TABLE 13-continued

| Index | Feature group | Components |
|-------|---------------|------------|
|       |               | and one unicast DCI scheduling UL per scheduled CC across this set of monitoring occasions for TDD. The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. |

The UE may report whether to support UE capability 2 and/or UE capability 3 and a relevant parameter to the BS. The BS may allocate time axis resources for the common search space and the UE-specific search space on the basis of the UE capability. In the resource allocation, the BS may not place the MO at the location at which the UE cannot perform monitoring.

If a plurality of search space sets are configured in the UE, a method of determining a search space set which the UE should monitor may be based on "condition 1" and "condition 2".

If the UE receives a configuration of a value of monitoringCapabilityConfig-r16 which is higher-layer signaling as r15 monitoringcapability, the UE defines the number of PDCCH candidates which can be monitored and a maximum value for the number of CCEs included in entire search spaces (indicating a set of entire CCE sets corresponding to a union area of a plurality of search space sets). When the UE receives a configuration of a value of monitoringCapabilityConfig-r16 as r16 monitoringcapability, the UE may define the number of PDCCH candidates which can be monitored and a maximum value for the number of CCEs included in entire search spaces (indicating entire CCE sets corresponding to a union area of a plurality of search space sets) for each span.

Condition 1 will now be described. Condition 1 refers to limits on a maximum number of PDCCH candidates.

In a cell in which subcarrier spacing is configured as $15 \cdot 2^{\mu}$ kHz, the maximum number of PDCCH candidates which the UE can monitor according to the configuration value of higher-layer signaling, as described above, follows Table 14, shown below, when the maximum number of PDCCH candidates $M_{PDCCH}^{max,slot,\mu}$ is defined on the basis of a slot or Table 15, shown below, when the maximum number $M_{PDCCH}^{max,(X,Y),\mu}$ of PDCCH candidates is defined on the basis of a span.

TABLE 14

| $\mu$ | Maximum number of PDCCH candidates per slot and per serving cell $M_{PDCCH}^{max, slot, \mu}$ |
|---|---|
| 0 | 44 |
| 1 | 36 |
| 2 | 22 |
| 3 | 20 |

TABLE 15

| | Maximum number $M_{PDCCH}^{max, (X, Y), \mu}$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

Condition 2 will now be described. Condition 2 refers to limits on a maximum number of CCEs.

In a cell in which subcarrier spacing is configured as $15 \cdot 2^{\mu}$ kHz, the maximum number of CCEs included in the entire search spaces (indicating a set of entire CCE sets corresponding to a union area of a plurality of search space sets) according to the configuration value of higher-layer signaling, as described above, follows Table 16 when the maximum number $C_{PDCCH}^{max,slot,\mu}$ of CCEs is defined on the basis of a slot or Table 17, shown below, when the maximum number $C_{PDCCH}^{max,(X,Y),\mu}$ of CCEs is defined on the basis of a span.

TABLE 16

| $\mu$ | Maximum number of non-overlapped CCEs per slot and per serving cell $C_{PDCCH}^{max, slot, \mu}$ |
|---|---|
| 0 | 56 |
| 1 | 56 |
| 2 | 48 |
| 3 | 32 |

TABLE 17

| | Maximum number $C_{PDCCH}^{max, (X, Y), \mu}$ of non-overlapped CCEs per span for combination (X, Y) and per serving cell | | |
|---|---|---|---|
| $\mu$ | (2, 2) | (4, 3) | (7, 3) |
| 0 | 18 | 36 | 56 |
| 1 | 18 | 36 | 56 |

For convenience of description, a situation satisfying both conditions 1 and 2 at a specific time point is defined as "condition A". Accordingly, not satisfying condition A may mean that at least one of conditions 1 and 2 is not satisfied.

Condition A may not be satisfied at a specific time point according to a configuration of search space sets by the BS.

If condition A is not satisfied at a specific time point, the UE may select and monitor only some of the search space sets configured to satisfy condition A at the corresponding time point, and the BS may transmit the PDCCH through the selected search space sets.

The following method may be applied as a method of selecting some of the configured search space sets.

If condition A for the PDCCH is not satisfied at a specific time point (slot), the UE (or the BS) may select a search space set of which a search space type is configured as a common-search space among search space sets existing at the corresponding time point in preference to a search space set of which a search space type is configured as a UE-specific search space.

If search space sets configured as the common-search space are all selected (that is, if condition A is satisfied even after all search spaces configured as the common-search space are selected), the UE (or BS) may select search space sets configured as the UE-specific search space. At this time, if the number of search space sets of configured as the UE-specific search space is plural, a search space set having a lower search space set index may have a higher priority. UE-specific search space sets may be selected within a range in which condition A is satisfied in consideration of the priority.

Figure 6:
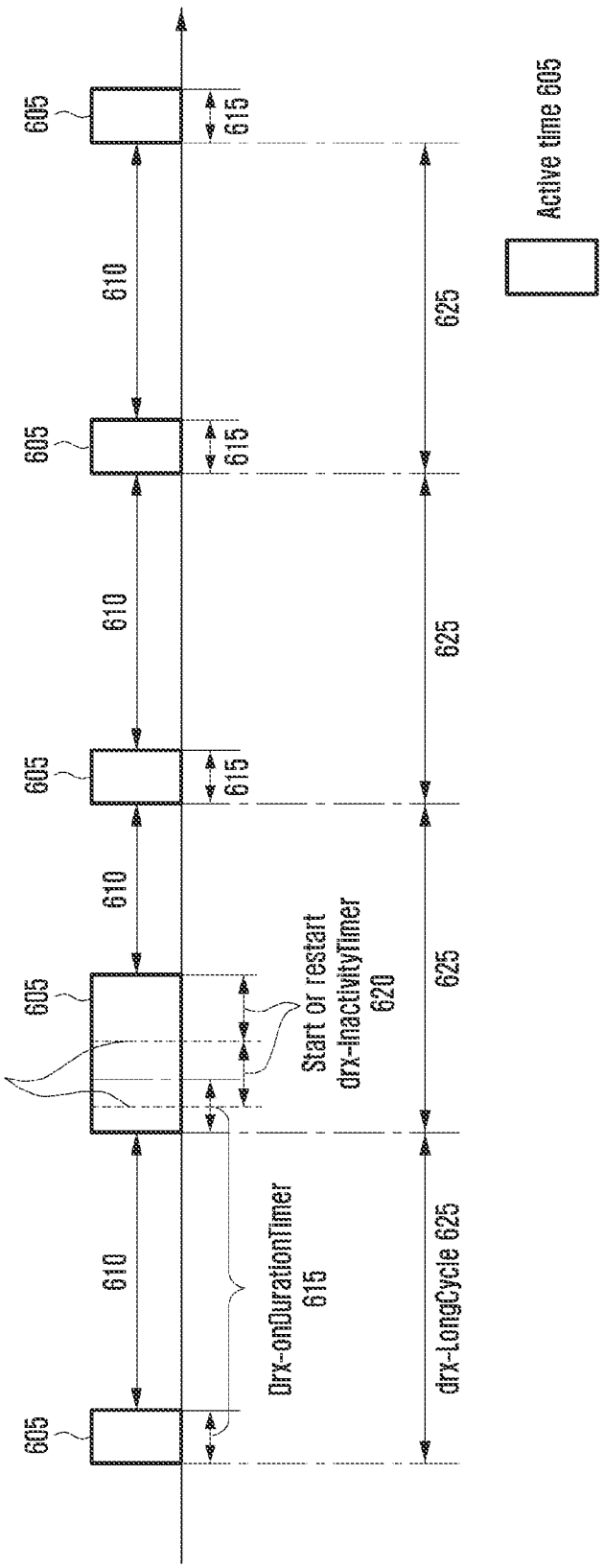
FIG. 6 illustrates an example of a discontinuous reception (DRX) operation in a wireless communication system, according to an embodiment of the disclosure.

FIG. 6 illustrates an example of a DRX operation in a wireless communication system, according to an embodiment of the disclosure.

DRX is an operation in which the UE using a service discontinuously receives data in an RRC-connected state in which a radio link is established between the BS and the UE. When DRX is applied, the UE may turn on a receiver at a specific time point and monitor a control channel, and when there is no data received for a predetermined period, turn off the receiver to reduce power consumption of the UE. The DRX operation may be controlled by a MAC layer device on the basis of various parameters and a timer.

Referring to FIG. 6, an active time 605 is a time during which the UE wakes up every DRX cycle and monitors a PDCCH. The active time 605 may be defined as follows:
- drx-onDurationTimer or drx-InactivityTimer or drx-RetransmissionTimerDL or drx-RetransmissionTimerUL or ra-ContentionResolutionTimer is running;
- a Scheduling Request is sent on PUCCH and is pending; or
- a PDCCH indicating a new transmission addressed to the C-RNTI of the MAC entity has not been received after successful reception of a random access response for the random access preamble not selected by the MAC entity among the contention-based random access preamble.

drx-onDurationTimer, drx-InactivityTimer, drx-RetransmissionTimerDL, drx-RetransmissionTimerUL, and ra-ContentionResolutionTimer, are timers of which values are configured by the BS, and have functions configured to monitor a PDCCH by the UE in the state in which a predetermined condition is satisfied.

The drx-onDurationTimer 615 is a parameter for configuring a minimum time during which the UE is awake in a DRX cycle. The drx-InactivityTimer 620 is a parameter for configuring a time during which the UE is additionally awake when a PDCCH indicating new uplink transmission or downlink transmission is received as indicated by reference numeral 630. The drx-RetransmissionTimerDL is a parameter for configuring a maximum time during which the UE is awake in order to receive downlink retransmission in a downlink hybrid automatic repeat request (HARQ) procedure. The drx-RetransmissionTimerUL is a parameter for configuring a maximum time during which the UE is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, for example, a time, the number of subframes, and the number of slots. The ra-ContentionResolutionTimer is a parameter for monitoring a PDCCH in a random access procedure.

An inactive time 610 is a time in which no PDCCH monitoring is performed or a time in which no PDCCH reception is performed during the DRX operation, and the remaining time except for the active time 605 in the entire time in which the DRX operation is performed. When the PDCCH is not monitored during the active time 605, the UE may enter a sleep or inactive state and reduce power consumption.

The DRX cycle refers to a cycle on which the UE wakes up and monitors a PDCCH. That is, the DRX cycle is a time interval or a cycle of a duration from monitoring of the PDCCH to monitoring of the next PDCCH by the UE. The DRX cycle has two types such as a short DRX cycle and a long DRX cycle. The short DRX cycle may be optionally applied.

The long DRX cycle 625 is a longer cycle among the two DRX cycles configured in the UE. The UE starts the drx-onDurationTimer 615 at a time point at which the long DRX cycle 625 passes after a start point (for example, a start symbol) of the drx-onDurationTimer 615 while the long DRX cycle operates. In the operation of the long DRX cycle 625, the UE may start the drx-onDurationTimer 615 in a slot after drx-SlotOffset in a subframe that satisfies Equation (2), below. Here, the drx-SlotOffset is a delay before the drx-onDurationTimer 615 starts. The drx-SlotOffset may be configured as, for example, a time, or the number of slots.

$$((SFN * 10) + \text{subframe number}) \text{ modulo } (drx\text{-}LongCycle) = drx\text{-}StartOffset \quad \text{Equation (2)}$$

SFN refers to a "single frequency network". The drx-LongCycleStartOffset and drx-StartOffset may be used to define a subframe for starting the long DRX cycle 625. The drx-LongCycleStartOffset may be configured as, for example, a time, the number of subframes, or the number of slots.

In the wireless communication system, one or more different antenna ports (or one or more channels, signals, and combinations thereof, but commonly referred to as different antenna ports for convenience of description) may be associated by a QCL configuration shown in Table 18, below. The TCI state is to inform of a QCL relation between a PDCCH (or a PDCCH DMRS) and another RS or channel, and a reference antenna port A (e.g., reference RS #A) and another purpose antenna port B (e.g., target RS #B) which are QCLed means that the UE is allowed to apply some or all of large-scale channel parameters estimated in the antenna port A to channel measurement from the antenna port B. The QCL is required to associate different parameters according to conditions, such as time tracking influenced by average delay and delay spread, frequency tracking influenced by Doppler shift and Doppler spread, radio resource management (RRM) influenced by an average gain, and beam management (BM) influenced by a spatial parameter. Accordingly, NR supports four types of QCL relations shown in Table 18, below.

TABLE 18

| QCL type | Large-scale characteristics |
| --- | --- |
| A | Doppler shift, Doppler spread, average delay, and delay spread |
| B | Doppler shift and Doppler spread |
| C | Doppler shift and average delay |
| D | Spatial Rx parameter |

A spatial Rx parameter may refer to some or all of an angle of arrival (AoA), a power angular spectrum (PAS) of AoA, an angle of departure (AoD), a PAS of AoD, a transmission/reception channel correlation, transmission/reception beamforming, and a spatial channel correlation.

The QCL relation can be configured in the UE through RRC parameter TCI-state and QCL-Info as shown in Table 19, below. Referring to Table 19 below, the BS may configure one or more TCI states in the UE and inform the UE of a maximum of two QCL relations (QCL-Type 1 and QCL-Type 2) for an RS referring to an ID of the TCI state, that is, a target RS. At this time, each piece of the QCL information (QCL-Info) included in the TCI state includes a serving cell index and a BWP index of a reference RS indicated by the corresponding QCL information, a type and an ID of the reference RS, and the QCL type as shown in Table 18, above.

TABLE 19

```
TCI-State ::=                    SEQUENCE {
    tci-StateId                  TCI-
StateId,
    (ID of corresponding TCI state)
    qcl-Type1                    QCL-
Info,
    (QCL information of first reference RS of RS (target RS)
    referring to
corresponding TCI state ID)
    qcl-Type2                    QCL-
Info                             OPTIONAL, -- Need R
    (QCL information of second reference RS of RS (target RS)
    referring to
corresponding TCI state ID)
    ...
}
QCL-Info ::=                     SEQUENCE {
    cell
    ServCellIndex                OPTIONAL, -- Need R
    (serving cell index of reference RS indicated by
    corresponding QCL
information)
    bwp-Id                       BWP-Id
                                 OPTIONAL, -- Cond CSI-RS-
Indicated
    (BWP index of reference RS indicated by corresponding QCL
information)
    referenceSignal              CHOICE {
        csi-rs
    NZP-CSI-RS-ResourceId,
        ssb
    SSB-Index
       (one of CSI-RSI ID or SSB ID indicated by corresponding QCL
information)
    },
    qcl-Type
    ENUMERATED {typeA, typeB, typeC, typeD},
    ...
}
```

Figure 7:
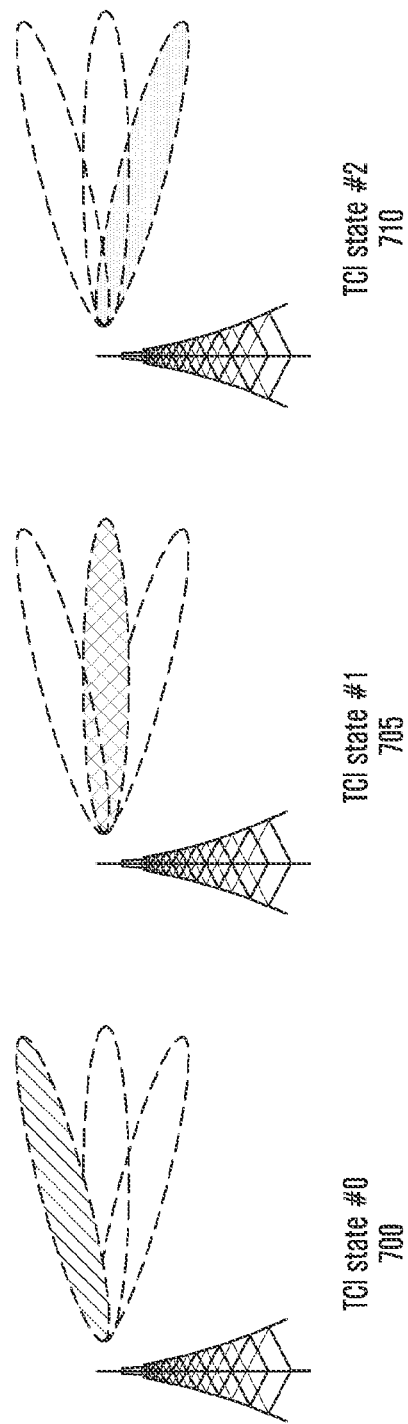
FIG. 7 illustrates an example of BS beam allocation according to a transmission configuration indication (TCI) state configuration in a wireless communication system, according to an embodiment of the disclosure.

FIG. 7 illustrates an example of BS beam allocation according to a TCI state configuration in a wireless communication system, according to an embodiment.

Referring to FIG. 7, the BS may transmit information on N different beams to the UE through N different TCI states. The N represents the number of beams or the number of TCI states. For example, when N=3 as illustrated in FIG. 7, the BS may notify that a qcl-Type 2 parameter included in three TCI states 700, 705, and 710 is associated with a CSI-RS or SSB corresponding to different beams to be configured as QCL type D and antenna ports referring to the different TCI states 700, 705, and 710 are associated with different spatial Rx parameters, that is, different beams.

Table 20 to Table 24, below, show valid TCI state configurations according to the target antenna port type.

Table 20 shows valid TCI state configurations when the target antenna port is a CSI-RS for tracking (TRS). The TRS is an NZP CSI-RS for which a repetition parameter is not configured and trs-Info is configured as true among CSI-RSs. The third configuration in Table 20 may be used for an aperiodic TRS.

TABLE 20

| Valid TCI state Configuration | DL RS 1 | qcl-Type 1 | DL RS 2 (if configured) | qcl-Type 2 (if configured) |
| --- | --- | --- | --- | --- |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 21 shows valid TCI state configurations when the target antenna port is a CSI-RS for CSI. The CSI-RS for CSI is an NZP CSI-RS for which a parameter (for example, a repetition parameter) indicating repetition is not configured and trs-Info is not configured as true among the CSI-RSs.

TABLE 21

| Valid TCI state Configuration | DL RS 1 | qcl-Type 1 | DL RS 2 (if configured) | qcl-Type 2 (if configured) |
| --- | --- | --- | --- | --- |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 22 shows valid TCI state configurations when the target antenna port is a CSI-RS for BM (that is, the same meaning as a CSI-RS for L1 RSRP reporting). The CSI-RS for BM is an NZP CSI-RS for which a repetition parameter is configured to have a value of on or off and trs-Info is not configured as true.

TABLE 22

| Valid TCI state Configuration | DL RS 1 | qcl-Type 1 | DL RS 2 (if configured) | qcl-Type 2 (if configured) |
| --- | --- | --- | --- | --- |
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH | QCL-TypeC | SS/PBCH block | QCL-TypeD |

Table 23 shows valid TCI state configurations when the target antenna port is a PDCCH DMRS.

TABLE 23

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 24 shows valid TCI state configurations when the target antenna port is a PDCCH DMRS.

TABLE 24

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by Table 20 to Table 24, the target antenna port and the reference antenna port for each step are configured and operated as "SSB"→"TRS"→"CSI-RS for CSI, CSI-RS for BM, PDCCH DMRS, or PDSCH DMRS". In a representative QCL configuration method by Table 20 to Table 24, the target antenna port and the reference antenna port for each step are configured and operated as "SSB"→"TRS"→"CSI-RS for CSI, CSI-RS for BM, PDCCH DMRS, or PDSCH DMRS".

Figure 8:
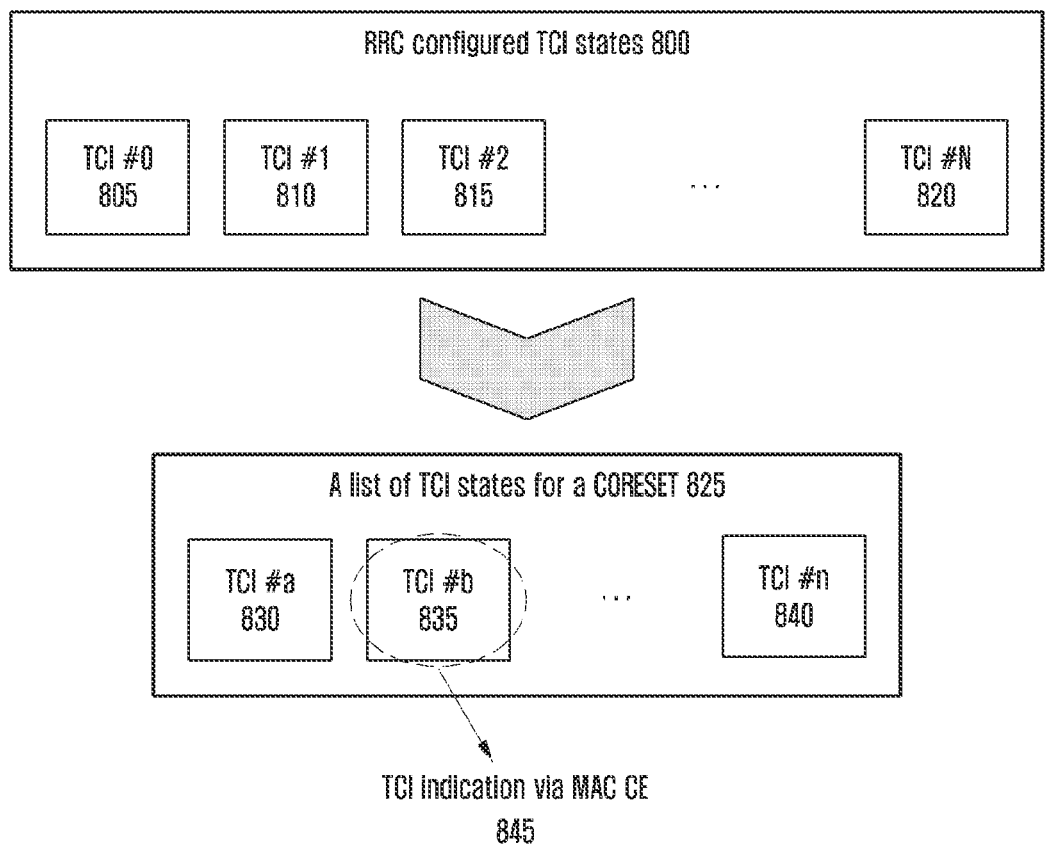
FIG. 8 illustrates an example of a method of allocating TCI states for a PDCCH in a wireless communication system, according to an embodiment of the disclosure.

FIG. 8 illustrates an example of a method of allocating TCI states for a PDCCH in a wireless communication system, according to an embodiment of the disclosure.

TCI state combinations which can be applied to the PDCCH DMRS antenna port may be as shown in Table 25, below. In Table 25, a fourth row is a combination assumed by the UE before the RRC configuration, and configurations after RRC are impossible.

TABLE 25

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

In a wireless communication system (for example, a 5G system or NR system), a hierarchical signaling method as illustrated in FIG. 8 is supported for dynamic allocation for a PDCCH beam.

Referring to FIG. 8, the BS may configure N TCI states 805, 810, 815 . . . , 820 in the UE through RRC signaling 800 and configure some thereof as TCI states for the CORESET as indicated by reference numeral 825. Thereafter, the BS may indicate one of the TCI states 830, 835, and 840 for the CORESET to the UE through MAC CE signaling as indicated by reference numeral 845. Subsequently, the UE may receive a PDCCH on the basis of beam information included in the TCI states indicated by the MAC CE signaling.

Figure 9:
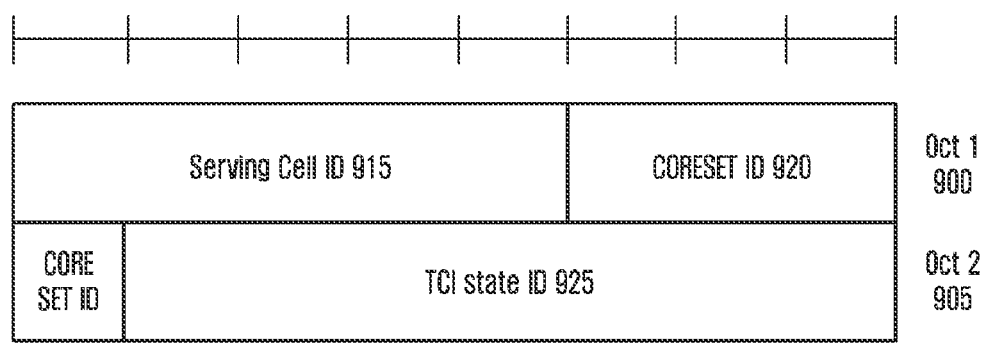
FIG. 9 illustrates a TCI indication medium access control (MAC) control element (CE) signaling structure for a PDCCH demodulation reference signal (DMRS) in a wireless communication system, according to an embodiment of the disclosure.

FIG. 9 illustrates a TCI indication MAC CE indication signaling structure for a PDCCH DMRS in a wireless communication system, according to an embodiment of the disclosure.

Referring to FIG. 9, TCI indication MAC CE signaling for the PDCCH DMRS may consist of 2 bytes (16 bits), and may include a serving cell ID 915 of 5 bits, a CORESET ID 920 of 4 bits, and a TCI state ID 925 of 7 bits.

Figure 10:
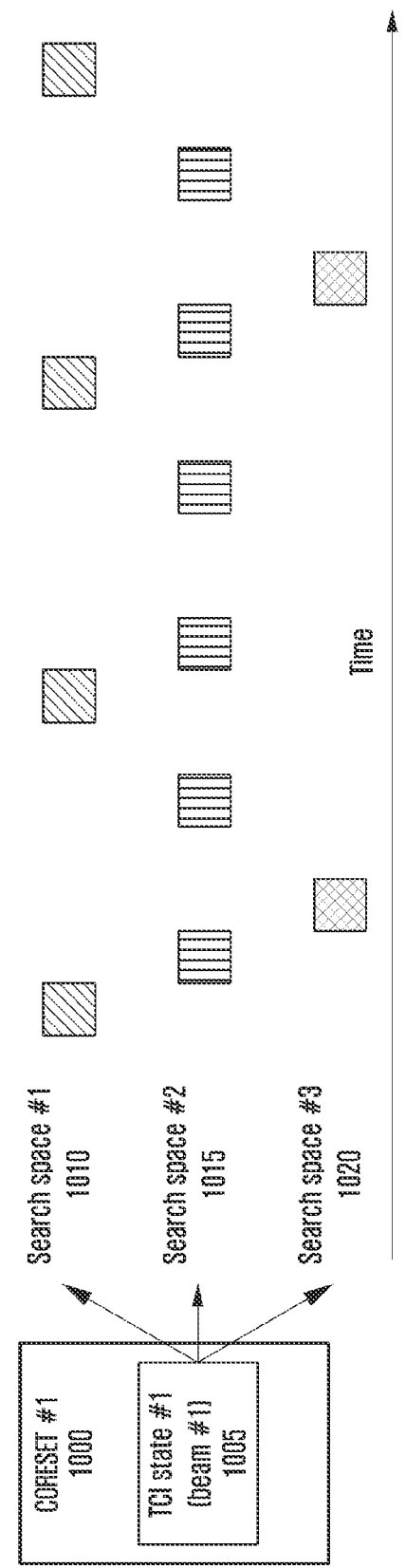
FIG. 10 illustrates an example of a control resource set (CORESET) and search space beam configuration in a wireless communication system, according to an embodiment of the disclosure.

FIG. 10 illustrates an example of a CORESET and search space beam configuration in a wireless communication system, according to an embodiment of the disclosure.

Referring to FIG. 10, the BS may indicate one of the TCI state list included in the configuration of a CORESET 1000 through MAC CE signaling as indicated by reference numeral 1005. Thereafter, before another TCI state is indicated to the corresponding CORESET through different MAC CE signaling, the UE may consider that the same QCL information (beam #1) 1005 is applied to one or more search spaces 1010, 1015, and 1050 associated with the CORESET. The PDCCH beam allocation method has difficulty indicating a beam change earlier than a MAC CE signaling delay and has a disadvantage of applying the same beam to all CORESETs regardless of a search space characteristic, and thus causes flexible PDCCH beam operation to be difficult. Hereinafter, embodiments of the disclosure provide a more flexible PDCCH beam configuration and operation method. In the following embodiments of the disclosure, some distinguished examples are provided for convenience of description, but they are not exclusive and can be applied through a proper combination thereof according to circumstances.

The BS may configure one or a plurality of TCI states for a specific CORESET in the UE and activate one of the configured TCI states through a MAC CE activation command. For example, {TCI state#0, TCI state#1, TCI state#2} are configured in CORESET #1 as the TCI states, and the BS may transmit a command for activating TCI state#0 assumed as the TCI state for CORESET #1 to the UE through the MAC CE. The UE may correctly receive a DMRS of the corresponding CORESET on the basis of QCL information within the activated TCI state by means of the activation command for the TCI state received through the MAC CE.

When the UE does not receive the MAC CE activation command for the TCI state of CORESET #0 for the CORESET having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states but does not receive a MAC CE activation command for activating one thereof, the UE may assume that a DMRS transmitted in CORESET #X is QCLed with an SS/PBCH block identified in an initial access process.

Figure 11:
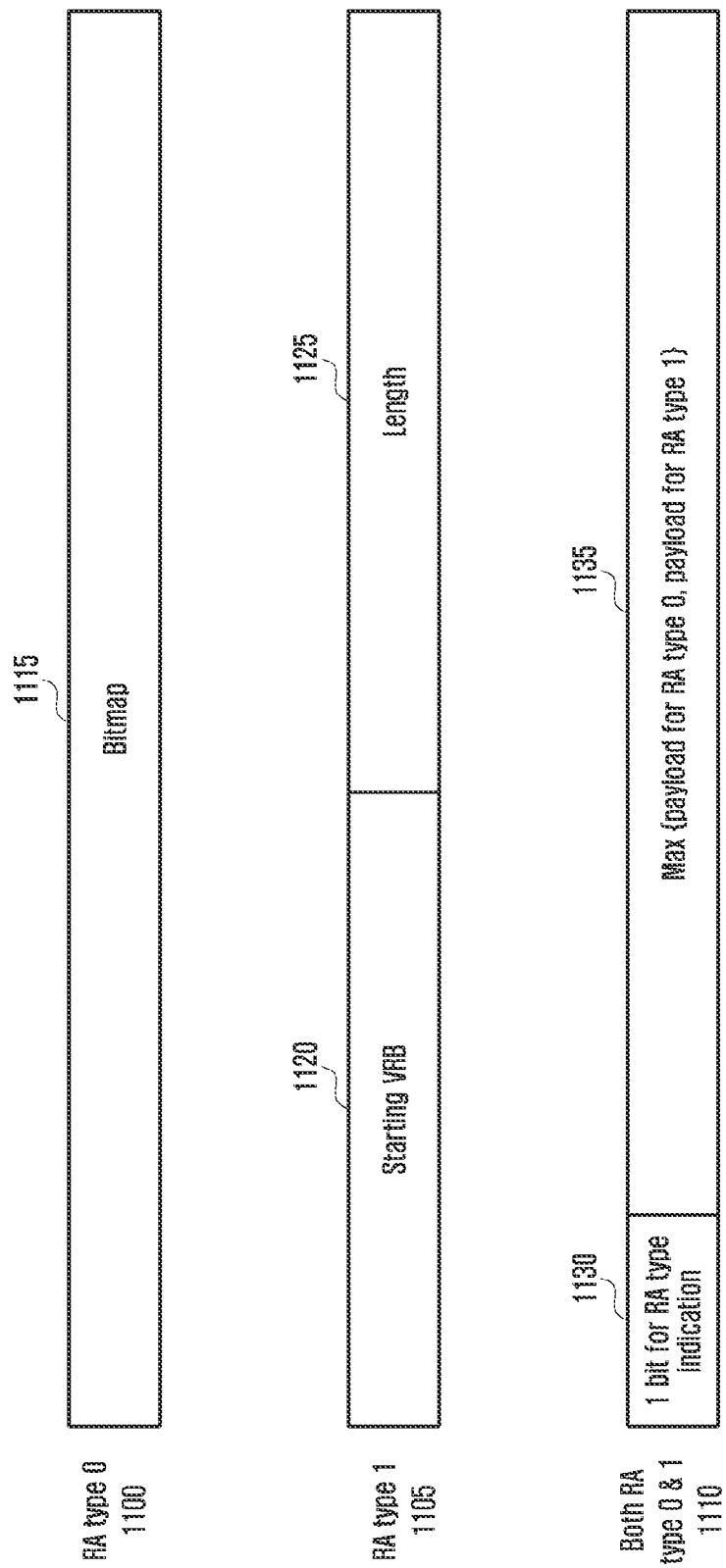
FIG. 11 illustrates an example of time axis resource allocation of a physical downlink shared channel (PDSCH) in a wireless communication system, according to an embodiment of the disclosure.

FIG. 11 illustrates an example of frequency axis resource allocation of a PDSCH in a wireless communication system, according to an embodiment of the disclosure.

FIG. 11 illustrates three frequency axis resource allocation methods of type 0 1100, type 1 1105, and dynamic switch 1110 which can be configured through a higher layer in the wireless communication system (for example, a 5G system or NR system).

Referring to FIG. 11, when the UE is configured to use only resource type 0 through higher-layer signaling as indicated by reference numeral 1100, some pieces of DCI for allocating the PDSCH to the corresponding UE includes a bitmap of $N_{RBG}$ bits. A condition therefor is described later. At this time, $N_{RBG}$ is the number of RBGs, determined as shown in Table 26, below, according to a BWP size allocated by a BWP indicator and a higher-layer parameter rbg-Size, and data is transmitted in an RBG indicated as 1 by the bitmap.

TABLE 26

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling as indicated by reference numeral 1105, some pieces of DCI for allocating the PDSCH to the corresponding UE includes frequency axis resource allocation information of $\lceil \log_2(N_{RB}^{DL,BWP}(N_{RB}^{DL,BWP}+1)/2) \rceil$ bits. A condition therefor is described later again. The BS may configure a starting virtual RB (VRB) 1120 and a length 1125 of frequency axis resources allocated successively therefrom.

When the UE is configured to use both resource type 0 and resource type 1 through higher-layer signaling as indicated by reference numeral 1110, some pieces of DCI for allocating the PDSCH to the corresponding UE includes frequency axis resource allocation information of bits of a larger value 1135 among payload 1115 for configuring resource type 0 and payload 1120 and 1125 for configuring resource type 1. A condition therefor is described later again. At this time, one bit may be added to the first part (e.g., a most significant bit (MSB)) of the frequency axis resource allocation information within the DCI, and the use of resource type 0 may be indicated when the corresponding bit is "0" and the use of resource type 1 may be indicated when the corresponding bit is "1".

Hereinafter, a method of allocating time domain resources for a data channel in a wireless communication system (for example, a 5G or NR system) according to an embodiment of the disclosure is described.

The BS may configure a table for time domain resource allocation information for a downlink data channel (e.g., a PDSCH) and an uplink data channel (e.g., a PUSCH) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0 in Table 27) or PDCCH-to-PUSCH slot timing (corresponding to a time interval in units of slots between a time point at which a PDCCH is received and a time point at which a PUSCH scheduled by the received PDCCH is transmitted, and indicated by K2 in Table 27), a location and a length of a start symbol in which a PDSCH or a PUSCH is scheduled within the slot, and a mapping type of a PDSCH or a PUSCH. For example, information shown in Table 27 or Table 28, below, may be transmitted from the BS to the UE.

TABLE 27

PDSCH-TimeDomainResourceAllocationList infomration element

PDSCH-TimeDomainResourceAllocationList ::= SEQUENCE (SIZE(1..
maxNrofDL-Allocations)) OF PDSCH-TimeDomainResourceAllocation
PDSCH-TimeDomainResourceAllocation ::= SEQUENCE {
 k0 INTEGER (0..32)
 OPTIONAL, --Need S
 (PDCCH-to-PDSCH timing, slot units)
 mapping type ENUMERATED {typeA, typeB},
 (PDSCH mapping type)
 startSymbolAndLength INTEGER (0..127)
 (Start symbol and length of PDSCH)
}

TABLE 28

PUSCH-TimeDomainResourceAllocationList information element

PUSCH-TimeDomainResourceAllocationList ::= SEQUENCE (SIZE(1..
maxNrofUL-Allocations)) OF PUSCH-TimeDomainResourceAllocation
PUSCH-TimeDomainResourceAllocation ::= SEQUENCE {
 k2 INTEGER (0..32)
 OPTIONAL, --Need S
 (PDCCH-to-PUSCH timing, slot units)
 mapping type ENUMERATED {typeA, typeB},
 (PUSCH mapping type)
 startSymbolAndLength INTEGER (0..127)
 (Start symbol and length of PUSCH)
}

The BS may inform the UE of one of the entries in the table for the time domain resource allocation information through L1 signaling (for example, DCI indicating a time domain resource allocation field). The UE may acquire time domain resource allocation information for a PDSCH or a PUSCH on the basis of the DCI received from the BS.

Figure 12:
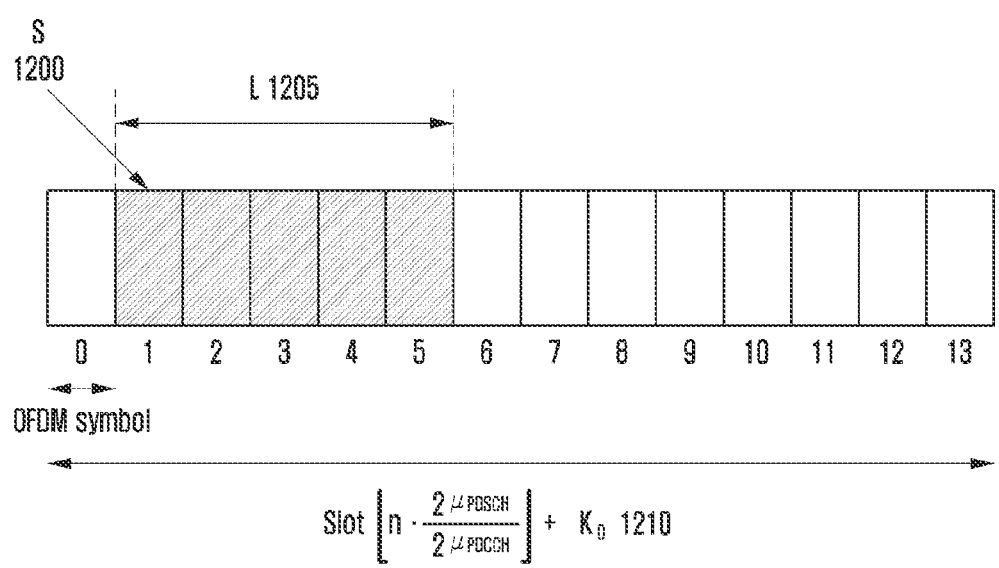
FIG. 12 illustrates an example of allocation of time axis resources of a PDSCH in a wireless communication system, according to an embodiment of the disclosure.

FIG. 12 illustrates an example of allocation of time axis resources of a PDSCH in a wireless communication system, according to an embodiment of the disclosure.

Referring to FIG. 12, the BS may indicate a time axis location of PDSCH resources according to SCS ($\mu_{PDSCH}$, $\mu_{PDCCH}$) of a data channel and a control channel configured using a higher layer, a scheduling offset (K0) value, and an OFDM symbol start location 1200 and length 1205 within one slot dynamically indicated through DCI.

Figure 13:
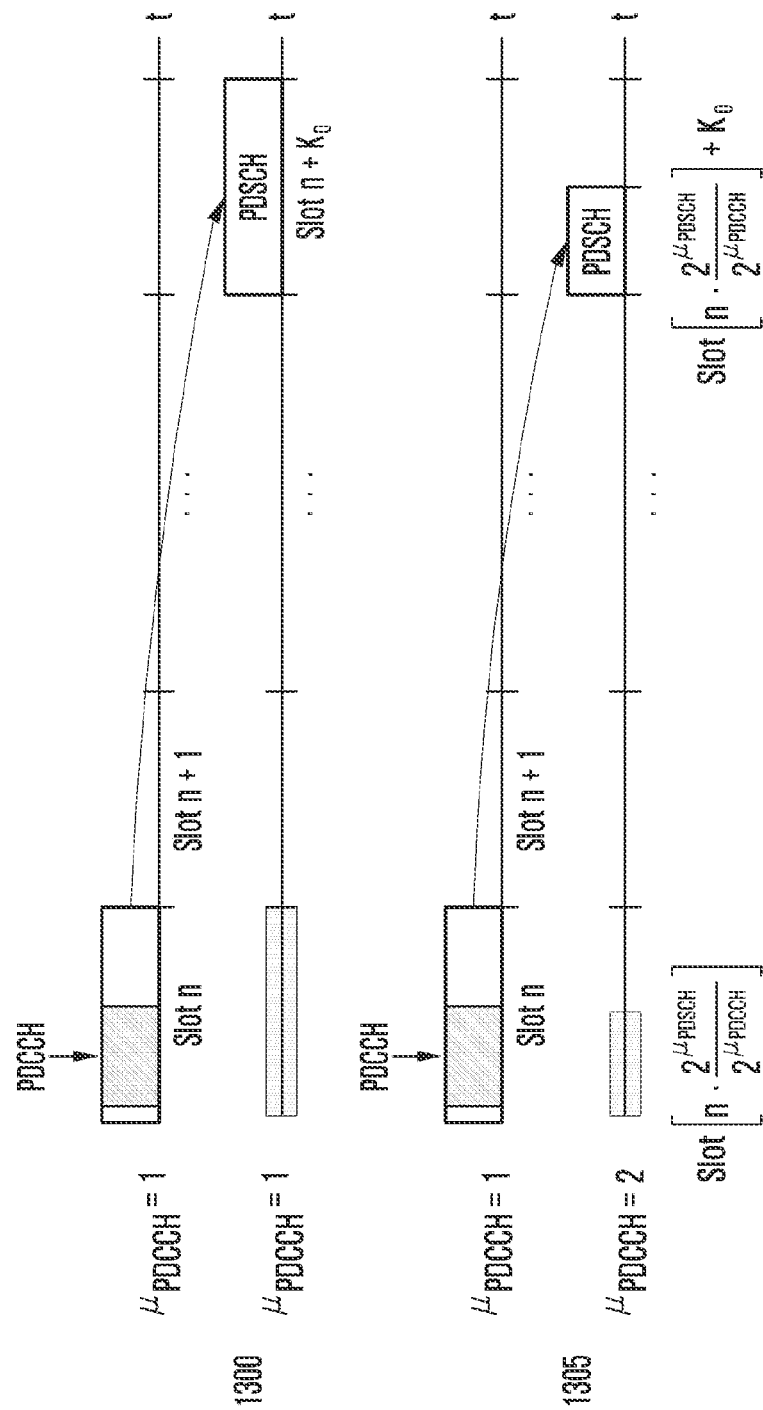
FIG. 13 illustrates an example of allocation of time-axis resources according to subcarrier spacing of a data channel and a control channel in a wireless communication system, according to an embodiment of the disclosure.

FIG. 13 illustrates an example of allocation of time-axis resources according to subcarrier spacing of a data channel and a control channel in a wireless communication system, according to an embodiment of the disclosure.

Referring to FIG. 13, when subcarrier spacings of a data channel and a control channel are the same as each other ($\mu_{PDSCH}=\mu_{PDCCH}$) as indicated by reference numeral 1300, slot numbers for the data and the control are the same as each other, and thus the BS and the UE may generate a scheduling offset according to a predetermined slot offset K0. On the other hand, when subcarrier spacings of a data channel and a control channel are different from each other ($\mu_{PDSCH} \neq \mu_{PDCCH}$) as indicated by reference numeral 1305, slot numbers for the data and the control are different from each other, and thus the BS and the UE may generate a scheduling offset according to a predetermined slot offset K0 on the basis of subcarrier spacing of the PDCCH.

In a wireless communication system (for example, an LTE system, 5G system, or NR system), the UE may perform a procedure for reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The message may include a UE capability request for each radio access technology (RAT) type of the BS. The request for each RAT type may include supported frequency band combination information. In the case of the UE capability enquiry message, a plurality of UE capabilities for respective RAT types may be requested through one RRC message container transmitted by the BS or the BS may insert the UE capability enquiry message including the UE capability request for each RAT type multiple times and transmit the same to the UE. That is, the UE capability enquiry is repeated multiple times within one message and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. The UE capability enquiry message is generally transmitted initially after the UE is connected to the BS, but may be requested at any time when the BS needs the same.

The UE receiving the request for the UE capability report from the BS in the above step may configure a UE capability according to RAT type and band information requested by the BS. A method by which the UE configures the UE capability in a wireless communication system (for example, a 5G or NR system) is described below.

When the UE receives a list of LTE and/or NR bands from the BS through a UE capability request, the UE configures a band combination (BC) for EN-DC and NR stand alone (SA). That is, the UE configures a candidate list of BCs for EN-DC and NR SA on the basis of requested bands in FreqBandList. The bands sequentially have priorities as stated in FreqBandList.

When the BS sets a "eutra-nr-only" flag or an "eutra" flag and makes a request for the UE capability report, the UE completely removes NR SA BCs from the configured candidate list of BCs. Such an operation may occur only when the LTE BS (eNB) makes a request for an "eutra" capability.

Thereafter, the UE removes fallback BCs from the candidate list of BCs configured in the above stage. The fallback BC is a BC which can be obtained by removing a band corresponding to at least one SCell from a predetermined BC, and a BC before the removal of the band corresponding at least one SCell can cover the fallback BC and thus the fallback BC can be omitted. This stage is applied to MR-DC, that is, LTE bands. BCs left after the stage are a final "candidate BC list".

The UE selects BCs suitable for a requested RAT type in the final "candidate BC list" and selects BCs to be reported. In this stage, the UE configures supportedBandCombinationList according to a determined order.

That is, the UE configures BCs and UE capability to be reported according to an order of a preset rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

When the requested rat Type is eutra-nr and influences, featureSetCombinations are included in all of the two containers of UE-MRDC-Capabilities and UE-NR-Capabilities. However, the NR feature set includes only UE-NR-Capabilities.

After configuring the UE capability, the UE may transfer a UE capability information message including the UE capability to the BS. The BS may perform scheduling for the corresponding UE and transmission/reception management on the basis of the UE capability received from the UE.

Figure 14:
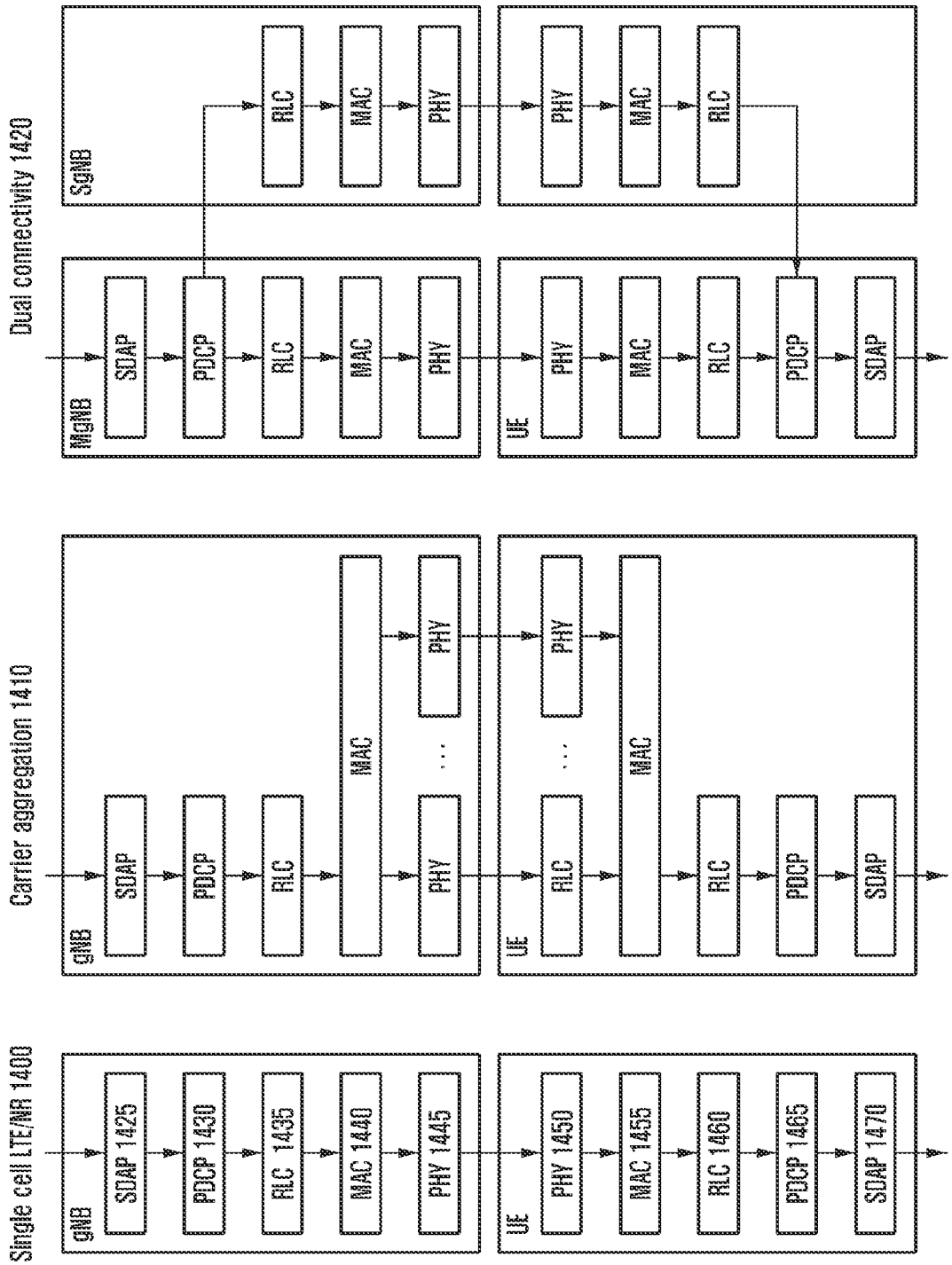
FIG. 14 illustrates a wireless protocol structure of the BS and the UE in a single cell environment, a carrier aggregation (CA) environment, and a dual connectivity (DC) environment in a wireless communication system, according to an embodiment of the disclosure.

FIG. 14 illustrates a wireless protocol structure of the BS and the UE in single cell, CA, and DC, according to an embodiment of the disclosure.

Referring to FIG. 14, a wireless protocol of a wireless communication system (for example, a 5G or NR system) includes an NR service data adaptation protocol (SDAP) 1425 or 1470, an NR packet data convergence protocol (PDCP) 1430 or 1465, an NR radio link control (RLC) 1435 or 1460, and an NR medium access control (MAC) 1440 or 1455 in each of the UE and the NR gNB.

Main functions of the NR SDAP 1425 or 1470 may include some of the following functions:
  a user data transmission function (transfer of user-plane data);
  a function of mapping QoS flow and a data bearer for uplink and downlink (mapping between a QoS flow and a DRB for both DL and UL);
  a function of marking a QoS flow ID for uplink and downlink (marking QoS flow ID in both DL and UL packets); and
  a function of mapping reflective QoS flow to a data bearer for uplink SDAP PDUs (reflective QoS flow to DRB mapping for the UL SDAP PDUs).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of non-access stratum (NAS) reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP 1430 or 1465 may include some of the following functions:
  a header compression and decompression function (header compression and decompression: robust header compression (ROHC) only);
  a user data transmission function (transfer of user data);
  a sequential delivery function (in-sequence delivery of upper-layer PDUs);
  a non-sequential delivery function (out-of-sequence delivery of upper-layer PDUs);
  a reordering function (PDCP PDU reordering for reception);
  a duplicate detection function (duplicate detection of lower-layer SDUs);
  a retransmission function (retransmission of PDCP SDUs);
  a ciphering and deciphering function (ciphering and deciphering); and a timer-based SDU removal function (timer-based SDU discard in uplink).

The reordering function of the NR PDCP layer device is a function of sequentially reordering PDCP PDUs received from a lower layer on the basis of a PDCP sequence number (SN), and may include a function of sequentially transferring the reordered data to a higher layer The reordering function of the NR PDCP layer device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLC 1435 or 1460 may include some of the following functions:

- a data transmission function (transfer of upper-layer PDUs);
- a sequential delivery function (in-sequence delivery of upper-layer PDUs);
- a non-sequential delivery function (out-of-sequence delivery of upper-layer PDUs);
- an automatic repeat request (ARQ) function (error correction through ARQ);
- a concatenation, segmentation, and reassembly function (concatenation, segmentation and reassembly of RLC SDUs);
- a re-segmentation function (re-segmentation of RLC data PDUs);
- a reordering function (reordering of RLC data PDUs);
- a duplicate detection function (duplicate detection);
- an error detection function (protocol error detection);
- an RLC SDU deletion function (RLC SDU discard); and
- an RLC reestablishment function (RLC reestablishment).

The sequential delivery function (in-sequence delivery) of the NR RLC layer device is a function of sequentially transmitting RLC SDUs received from a lower layer to the higher layer. When one original RLC SDU is divided into a plurality of RLC SDUs and then received, the sequential delivery function (in-sequence delivery) of the NR RLC layer device may include a function of reassembling and transmitting the RLC SDUs, a function of reordering the received RLC PDUs on the basis of an RLC SN or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function (in-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer. Alternatively, the sequential delivery function (in-sequence delivery) of the NR RLC layer device may include a function of, if a predetermined timer expires even though there are lost RLC SDUs, sequentially transferring all RLC SDUs received up to now to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device.

The NR RLC layer device may not include a concatenation function, and the function may be performed by the NR MAC layer, or may be replaced with a multiplexing function of the NR MAC layer.

The non-sequential function (out-of-sequence delivery) of the NR RLC layer device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC 1440 or 1455 may be connected to a plurality of NR RLC layer devices configured in one UE and main functions of the NR MAC may include some of the following functions:

- a mapping function (mapping between logical channels and transport channels);
- a multiplexing and demultiplexing function (multiplexing/demultiplexing of MAC SDUs);
- a scheduling information report function (scheduling information reporting);
- a HARQ function (error correction through HARQ);
- a logical channel priority control function (priority handling between logical channels of one UE);
- a UE priority control function (priority handling between UEs by means of dynamic scheduling);
- an MBMS service identification function (MBMS service identification);
- a transport format selection function (transport format selection); and
- a padding function (padding).

The NR PHY layer 1445 or 1450 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol may be variously changed according to a carrier (or cell) operation scheme. For example, when the BS transmits data to the UE on the basis of a single carrier (or cell), the BS and the UE use a protocol structure having a single structure for each layer as indicated by reference numeral 1400. On the other hand, when the BS transmits data to the UE on the basis of CA using multiple carriers in a single TRP, the BS and the UE use a protocol structure in which layers up to RLC have a single structure but the PHY layer is multiplexed through the MAC layer as indicated by reference numeral 1410. In another example, when the BS transmits data to the UE on the basis of DC using multiple carriers in multiple TRPs, the BS and the UE use a protocol structure in which layers up to RLC have a single structure but the PHY layer is multiplexed through the MAC layer as indicated by reference numeral 1420.

Referring to the PDCCH and beam configuration-related descriptions described above, it is difficult to achieve the required reliability in a scenario requiring high reliability, such as URLLC, since PDCCH repetition transmission is not currently supported in Rel-15 and Rel-16 NRs. The disclosure improves PDCCH reception reliability of a terminal by providing a PDCCH repetition transmission method via multiple transmission points (TRPs).

Hereinafter, an embodiment of the disclosure is applicable in FDD and TDD systems. Higher signaling (or higher layer signaling) may be a signal transmission method of transmitting a signal from a BS to a terminal by using a downlink data channel of a physical layer or from the terminal to the BS by using an uplink data channel of the physical layer, and may be referred to as RRC signaling, PDCP signaling, or an MAC control element (CE).

When determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an "NC-JT" case (a non-coherent joint transmission (NC-JT) case).

Determining the priority between A and B may be mentioned in various ways, such as selecting one having a higher priority according to a predetermined priority rule to perform an operation corresponding thereto, or omitting or dropping an operation of one having a lower priority.

According to an embodiment of the disclosure, in order to receive a PDSCH from a plurality of TRPs, the UE may use NC-JT.

A wireless communication system (for example, a 5G or NR system) may support all of the service having very short transmission latency and the service requiring a high connectivity density as well as the service requiring a high transmission rate unlike the conventional system. In a wireless communication network including a plurality of cells, TRPs, or beams, cooperative communication (coordinated transmission) between respective cells, TRPs, and/or beams may satisfy various service requirements by increasing the strength of a signal received by the UE or efficiently controlling interference between the cells, TRPs, and/or beams.

Joint transmission (JT) is a representative transmission technology for the cooperative communication and may increase the strength of a signal received by the UE or throughput by transmitting signals to one UE through different cells, TRPs, and/or beams. At this time, a channel between each cell, TRP, and/or beam and the UE may have different characteristics, and particularly, NC-JT supporting non-coherent precoding between respective cells, TRPs, and/or beams may need individual precoding, MCS, resource allocation, and TCI indication according to the channel characteristics for each link between each cell, TRP, and/or beam and the UE.

The NC-JT may be applied to at least one of a downlink data channel (e.g., a PDSCH), a downlink control channel (e.g., a PDCCH), an uplink data channel (e.g., a PUSCH), and an uplink control channel (e.g., a PUCCH)). In PDSCH transmission, transmission information such as precoding, MCS, resource allocation, and TCI may be indicated through DL DCI, and should be independently indicated for each cell, TRP, and/or beam for the NC-JT. This is a significant factor that increases payload required for DL DCI transmission, which may have a bad influence on reception performance of a PDCCH for transmitting the DCI. Accordingly, in order to support JT of the PDSCH, carefully designing a tradeoff between an amount of DCI information and reception performance of control information is required.

Figure 15:
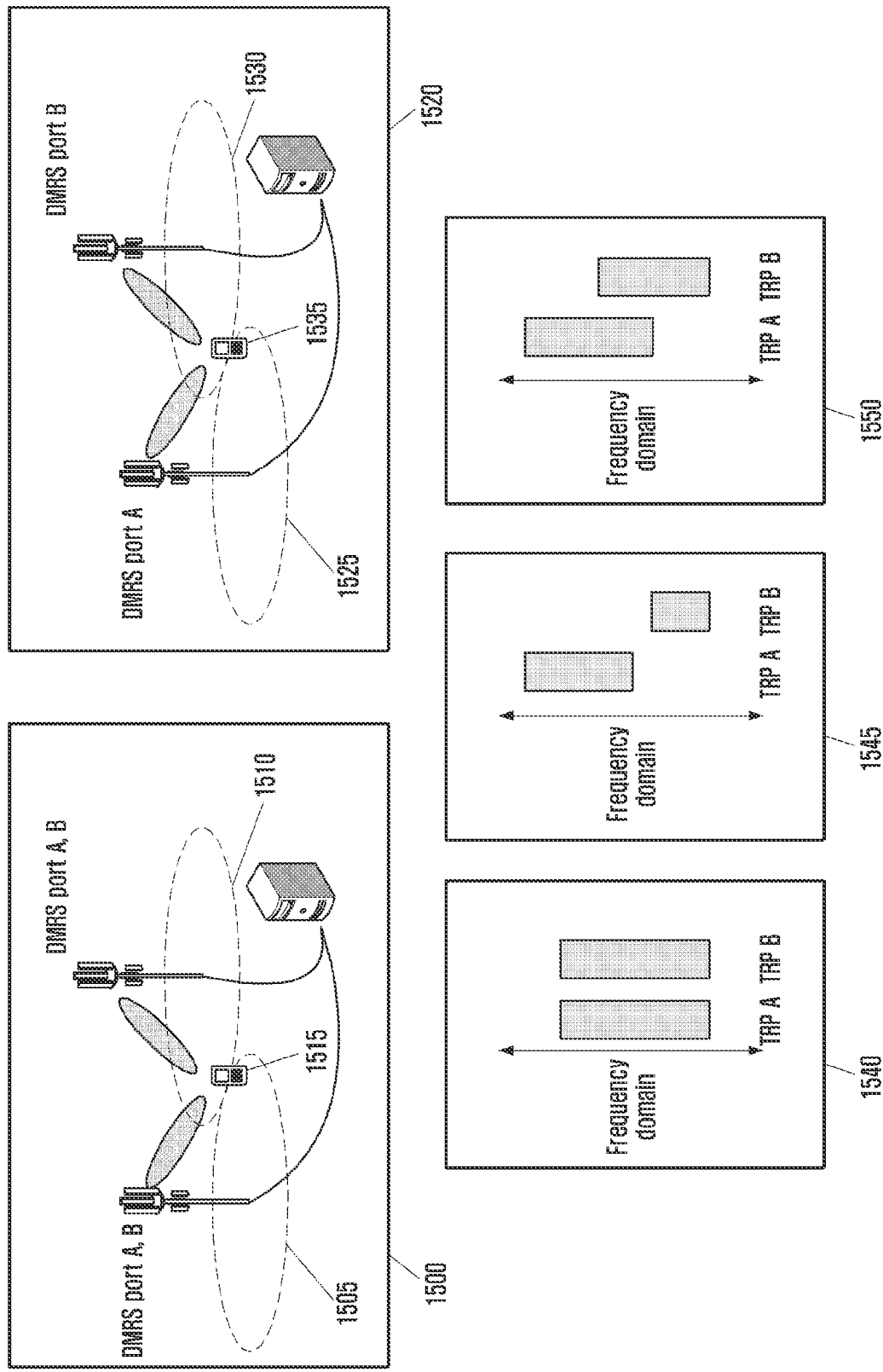
FIG. 15 illustrates a configuration of antenna ports and an example of resource allocation for cooperative communication in a wireless communication system, according to an embodiment of the disclosure.

FIG. 15 illustrates a configuration of antenna ports and an example of resource allocation for transmitting a PDSCH using cooperative communication in a wireless communication system, according to an embodiment.

Referring to FIG. 15, the example for PDSCH transmission is described for each scheme of JT, and examples for allocating radio resources for each TRP are described.

Referring to FIG. 15, an example 1500 of coherent JT (C-JT) supporting coherent precoding between respective cells, TRPs, and/or beams is illustrated.

In the case of C-JT, a TRP A 1505 and a TRP B 1510 transmit single data (e.g., a PDSCH) to a UE 1515, and the plurality of TRPs may perform joint precoding. This may mean that the TRP A 1505 and the TPR B 1510 transmit DMRSs through the same DMRS ports in order to transmit the same PDSCH. For example, the TRP A 1505 and the TPR B 1510 may transmit DMRSs to the UE through a DMRS port A and a DMRS port B, respectively. In this case, the UE may receive one piece of DCI information for receiving one PDSCH demodulated on the basis of the DMRSs transmitted through the DMRS port A and the DMRS port B.

FIG. 15 illustrates an example 1520 of NC-JT supporting non-coherent precoding between respective cells, TRPs, and/or beams for PDSCH transmission.

In the case of NC-JT, the PDSCH is transmitted to a UE 1535 for each cell, TPR, and/or beam, and individual precoding may be applied to each PDSCH. Respective cells, TRPs, and/or beams may transmit different PDSCHs or different PDSCH layers to the UE, thereby improving throughput compared to single cell, TRP, and/or beam transmission. Further, respective cells, TRPs, and/or beams may repeatedly transmit the same PDSCH to the UE, thereby improving reliability compared to single cell, TRP, and/or beam transmission. For convenience of description, the cell, TRP, and/or beam are commonly called a TRP.

At this time, various wireless resource allocations such as the case 1540 in which frequency and time resources used by a plurality of TRPs for PDSCH transmission are all the same, the case 1545 in which frequency and time resources used by a plurality of TRPs do not overlap at all, and the case 1550 in which some of the frequency and time resources used by a plurality of TRPs overlap each other may be considered.

In order to support NC-JT, DCIs in various forms, structures, and relations may be considered to simultaneously allocate a plurality of PDSCHs to one UE.

Figure 16:
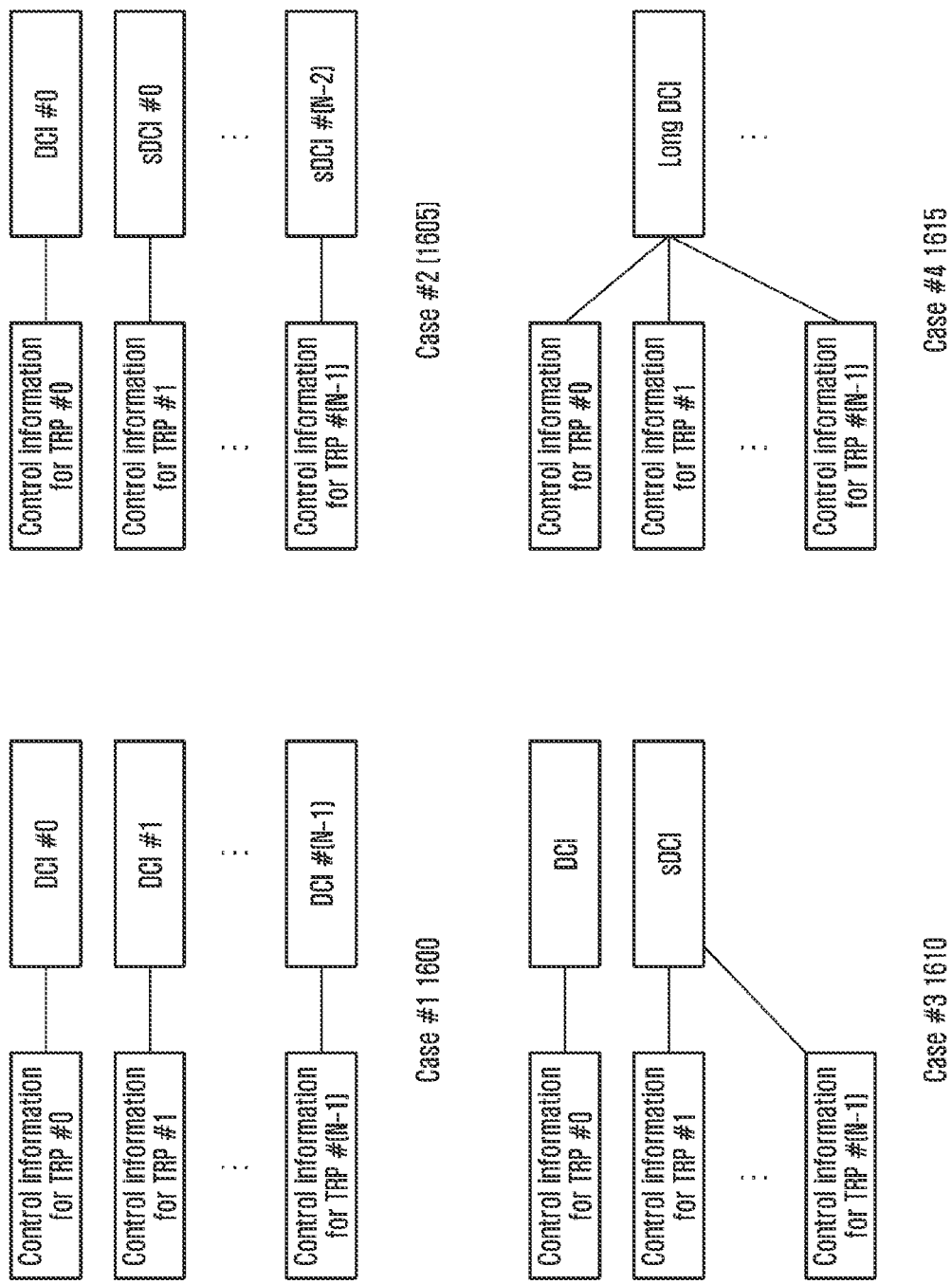
FIG. 16 illustrates an example for a configuration of downlink control information (DCI) for cooperative communication in a wireless communication system, according to an embodiment of the disclosure.

FIG. 16 illustrates an example for a configuration of DCI for cooperative communication in a wireless communication system, according to an embodiment of the disclosure.

For example, FIG. 16 illustrates a configuration of DCI for NC-JT in which respective TRPs transmit different PDSCHs or different PDSCH layers to the UE in a wireless communication system.

Referring to FIG. 16, case #1 1600 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through independent DCIs (DCI #0 to DCI #(N−1)). Formats between the independent DCIs may be the same as or different from each other, and payload between the DCIs may also be the same as or different from each other. In case #1, a degree of freedom of PDSCH control or allocation can be completely guaranteed, but when respective pieces of DCI are transmitted by different TRPs, a difference between DCI coverages may be generated and reception performance may deteriorate.

Case #2 1605 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

DCI #0 that is control information for a PDSCH transmitted from the serving TRP (TRP #0) may include all information elements of DCI format 1_0, DCI format 1_1, and DCI format 1_2, but shortened DCIs (hereinafter, referred to as sDCIs) (sDCI #0 to sDCI #(N−2)) that are control information for PDSCHs transmitted from the cooperative TRPs (TRP #1 to TRP #(N−1)) may include only some of the information elements of DCI format 1_0, DCI format 1_1, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits compared to the nDCI.

In case #2 1605, a degree of freedom of each PDSCH control or allocation may be limited according to content of information elements included in the sDCI, but reception capability of the sDCI is better than the nDCI, and thus a probability of the generation of difference between DCI coverages may become lower.

Case #3 1610 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for a single PDSCH transmission.

In the case of DCI #0 that is control information for the PDSCH transmitted from the serving TRP (TRP #0), all information elements of DCI format 1_0, DCI format 1_1, and DCI format 1_2 may be included, and in the case of control information for PDSCHs transmitted from cooperative TRPs (TRP #1 to TRP #(N−1)), only some of the information elements of DCI format 1_0, DCI format 1_1, and DCI format 1_2 may be gathered in one "secondary" DCI (sDCI) and transmitted. The sDCI may include at least one piece of HARQ-related information such as frequency domain resource assignment and time domain resource assignment of the cooperative TRPs and the MCS. In addition, information that is not included in the sDCI such as a BWP indicator and a carrier indicator may follow DCI (DCI #0, normal DCI, or nDCI) of the serving TRP.

In case #3 1610, a degree of freedom of PDSCH control or allocation may be limited according to content of the information elements included in the sDCI but reception performance of the sDCI can be controlled, and case #3 1610 may have smaller complexity of DCI blind decoding of the UE compared to case #1 1600 or case #2 1605.

Case #4 1615 is an example in which control information for PDSCHs transmitted from (N−1) additional TRPs is transmitted in DCI (long DCI) that is the same as that of control information for the PDSCH transmitted from the serving TRP in a situation in which different (N−1) PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through single DCI. In case #4 1615, complexity of DCI blind decoding of the UE may not be increased, but a degree of freedom of PDSCH control or allocation may be low since the number of cooperative TRPs is limited according to long DCI payload restriction.

The sDCI may refer to various pieces of supplementary DCI such as shortened DCI, secondary DCI, or normal DCI (DCI formats 1_0 and 1_1) including PDSCH control information transmitted in the cooperative TRP, and unless specific restriction is mentioned, the corresponding description may be similarly applied to the various pieces of supplementary DCI.

Case #1 1600, case #2 1605, and case #3 1610 in which one or more pieces of DCI (or PDCCHs) are used to support NC-JT may be classified as multiple PDCCH-based NC-JT, and case #4 1615 in which single DCI (or PDCCH) is used to support NC-JT may be classified as single PDCCH-based NC-JT. In multiple PDCCH-based PDSCH transmission, a CORESET for scheduling DCI of the serving TRP (TRP #0) is separated from CORESETs for scheduling DCI of cooperative TRPs (TRP #1 to TRP #(N−1)). A method of distinguishing the CORESETs may include a distinguishing method through a higher-layer indicator for each CORESET and a distinguishing method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. At this time, association between a layer and a TRP transmitting the corresponding layer may be indicated through a TCI indication for the layer.

The "cooperative TRP" may be replaced with various terms such as a "cooperative panel" or a "cooperative beam" when actually applied.

"The case in which NC-JT is applied" may be variously interpreted as "the case in which the UE simultaneously receives one or more PDSCHs in one BWP", "the case in which the UE simultaneously receives PDSCHs on the basis of two or more TCI indications in one BWP", and "the case in which the PDSCHs received by the UE are associated with one or more DMRS port groups" according to circumstances, but is used by one expression for convenience of description.

In the disclosure, a wireless protocol structure for NC-JT may be variously used according to a TRP development scenario. For example, when there is no backhaul delay between cooperative TRPs or there is a small backhaul delay, a method (a CA-like method) using a structure based on MAC layer multiplexing can be used similarly to reference numeral 1410 of FIG. 14. On the other hand, when the backhaul delay between cooperative TRPs is too large to be ignored (for example, when a time of 2 ms or longer is needed to exchange information such as CSI, scheduling, and HARQ-ACK between cooperative TRPs), a method (a DC-like method) of securing a characteristic robust to a delay can be used through an independent structure for each TRP from an RLC layer similarly to reference numeral 1420 of FIG. 14.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

According to an embodiment of the disclosure, a downlink control channel for NC-JT may be configured on the basis of a multi-PDCCH.

In NC-JT based on multiple PDCCHs, there may be a CORESET or a search space separated for each TRP when DCI for scheduling the PDSCH of each TRP is transmitted. The CORESET or the search space for each TRP can be configured according to at least one of the following configuration cases.

A configuration of a higher-layer index for each CORESET: CORESET configuration information configured by a higher layer may include an index value, and a TRP for transmitting a PDCCH in the corresponding CORESET may be identified by the configured index value for each CORESET. That is, in a set of CORESETs having the same higher-layer index value, the same TRP may transmit the PDCCH or the PDCCH for scheduling the PDSCH of the same TRP may be transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, a default value of CORESETPoolIndex may be configured, and the default value may be 0.

A configuration of multiple PDCCH-Config: a plurality of PDCCH-Config are configured in one BWP, and each PDCCH-Config may include a PDCCH configuration for each TRP. That is, a list of CORESETs for each TRP and/or a list of search spaces for each TRP may be included in one PDCCH-Config, and one or more CORESETs and one or more search spaces included in one PDCCH-Config may correspond to a specific TRP.

A configuration of a CORESET beam/beam group: a TRP that corresponds to the corresponding CORESET may be identified through a beam or a beam group configured for each CORESET. For example, when the same TCI state is configured in a plurality of CORESETs, the corresponding CORESETs may be transmitted through the same TRP or a PDCCH for scheduling a PDSCH of the same TRP may be transmitted in the corresponding CORESET.

A configuration of a search space beam/beam group: a beam or a beam group is configured for each search space, and a TRP for each search space may be identified therethrough. For example, when the same beam/beam group or TCI state is configured in a plurality of search spaces, the same TRP may transmit the PDCCH in the corresponding search space or a PDCCH for scheduling a PDSCH of the same TRP may be transmitted in the corresponding search space.

As described above, by separating the CORESETs or search spaces for each TRP, it is possible to divide PDSCHs and HARQ-ACK for each TRP and accordingly to generate an independent HARQ-ACK codebook for each TRP and use an independent PUCCH resource.

The configuration may be independent for each cell or BWP. For example, while two different CORESETPoolIndex values may be configured in the primary cell (PCell), no CORESETPoolIndex value may be configured in a specific SCell. In this case, NC-JT may be configured in the PCell, but NC-JT may not be configured in the SCell in which no CORESETPoolIndex value is configured.

A downlink beam for NC-JT may be configured on the basis of a single PDCCH.

In single PDCCH-based NC-JT, PDSCH transmitted by a plurality of TRPs may be scheduled by one piece of DCI. At this time, as a method of indicating the number of TRPs transmitting the corresponding PDSCHs and the number of TCI states may be used. That is, single PDCCH-based NC-JT may be considered when the number of TCI states indicated by DCI for scheduling the PDSCHs is 2, and single-TRP transmission may be considered when the number of TCI states is 1. The TCI states indicated by the DCI may correspond to one or two TCI states among TCI states activated by the MAC CE. When the TCI states of DCI correspond to two TCI states activated by the MAC CE, a TCI codepoint indicated by the DCI is associated with the TCI states activated by the MAC CE, in which case the number of TCI states activated by the MAC CE, corresponding to the TCI codepoint, may be 2.

The configuration may be independent for each cell or BWP. For example, while a maximum number of activated TCI states corresponding to one TCI codepoint is 2 in the primary cell (PCell), a maximum number of activated TCI states corresponding to one TCI codepoint may be 1 in a specific SCell. In this case, NC-JT may be configured in the PCell but NC-JT may not be configured in the SCell.

Meanwhile, referring to the PDCCH and beam configuration-related description, PDCCH repetitive transmission is not supported in current Rel-15 and Rel-16 NR, and thus it is difficult to achieve required reliability in a scenario requiring high reliability such as URLLC. Accordingly, the disclosure proposes a method of improving PDCCH reception reliability of the UE by providing a PDCCH repetitive transmission method through a plurality of TRPs.

A cell, a TRP, a panel, a beam, and/or a transmission direction distinguished by an indicator such as a higher layer/L1 parameter of a TCI state and spatial relation information, a cell ID, a TRP ID, or a panel ID is commonly described as a TRP. Accordingly, in the actual application, the TRP can be appropriately replaced with one of the terms.

When determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an NC-JT case.

Meanwhile, the BS is the entity that allocates resources to the UE, and may be at least one of a gNode B, a gNB, an eNode B, a Node B, a BS, a radio access unit, a BS controller, and a node on a network. The UE may include an MS, a cellular phone, a smart phone, a computer, or a multimedia system capable of performing a communication function. The embodiments of the disclosure may be applied to 5G, after LTE, or LTE-A mobile communication. The content in the disclosure can be applied to FDD and TDD systems.

Higher-layer signaling may be singling corresponding to at least one of or a combination of one or more of the following signaling:
  MIB signaling;
  SIB or SIB X (X=1, 2, . . . ) signaling;
  RRC signaling; and
  MAC CE signaling.

L1 signaling may be signaling corresponding to at least one of or a combination of one or more of signaling methods using the following physical layer channels or signaling:
  a PDCCH;
  DCI;
  UE-specific DCI;
  group common DCI;
  common DCI;
  scheduling DCI (for example, DCI used to schedule downlink or uplink data);
  non-scheduling DCI (for example, DCI other than DCI used to schedule downlink or uplink data);
  a PUCCH; and
  UCI.

PDCCH transmission or reception may mean DCI transmission or reception through the PDCCH. Additionally, PDSCH transmission or reception may mean data transmission or reception through the PDSCH. In addition, PUSCH transmission or reception may mean data transmission or reception through the PUSCH.

Determining priorities of A and B in the disclosure may be variously expressed as selecting one having a higher priority according to a predetermined priority rule and performing an operation corresponding thereto or omitting (or dropping) an operation for one having a lower priority.

A multi-TRP based PDCCH repetitive transmission method will now be described.

In the PDCCH repetitive transmission based on multiple TRPs, various methods of how to apply each TCI state for PDCCH transmission by each TRP to various parameters used for PDCCH transmission are provided. For example, various parameters used for PDCCH transmission to which different TCI states are applied may include a CCE, a PDCCH candidate, a CORESET, and a search space. In PDCCH repetitive transmission considering multiple TRPs, a reception scheme of the UE may include soft combining and a selection scheme.

For PDCCH repetitive transmission through multiple TRPs, five methods are described below, and the BS may configure at least one the five methods in the UE through higher-layer signaling, indicate the same through L1 signaling, or configure and indicate the same through a combination of higher-layer signaling and L1 signaling. Meanwhile, the following methods are only examples and the disclosure is not limited thereto. That is, PDCCH repetitive transmission according to the disclosure may be performed on the basis of a method obtained by combining the following methods.

For convenience of description, a repetitive transmission method of multiple PDCCHs having the same payload will be referred to as "method 1-1".

Method 1-1 is a method of repeatedly transmitting a plurality of pieces of control information having the same DCI format and the same payload. The control information may indicate information for scheduling repeatedly transmitted PDSCHs, for example, {PDSCH#1, PDSCH#2, . . . , PDSCH#Y} repeatedly transmitted over a plurality of slots. The same payload of repeatedly transmitted control information may mean all pieces of PDSCH scheduling information of control information, for example, the number of PDSCH repetitive transmissions, time axis PDSCH resource allocation information, that is, a slot offset ($K_0$) between control information and PDSCH #1 and the number of PDSCH symbols, frequency axis PDSCH resource allocation information, DMRS port allocation information, PDSCH-to-HARQ-ACK timing, and a PUCCH resource indicator may be the same as each other. The UE may improve reception reliability of control information by soft-combining repetitive transmission control information having the same payload.

In order to perform soft combining, the UE is required to know in advance the resource location of control information to be repeatedly transmitted and the number of repetitive transmissions. To this end, the BS may indicate in advance time domain, frequency domain, and spatial domain resource configurations of the repeatedly transmitted control information. When control information is repeatedly transmitted in the time axis, the control information may be repeatedly transmitted over different CORESETs, repeatedly transmitted over different search space sets within one CORESET, or repeatedly transmitted over different PDCCH monitoring occasions within one CORESET and one search space set. The unit of resources repeatedly transmitted in the time axis (e.g., CORESET unit, search space set unit, or PDCCH monitoring occasion unit) and the location of repetitive transmission resources (e.g., a PDCCH candidate index) may be indicated through a higher-layer configuration of the BS. At this time, the number of PDCCH repetitive transmissions and/or a list of TRPs participating in repetitive transmission, and a transmission pattern may be explicitly indicated, and a higher-layer indication or a MAC-CE/L1 signaling may be used as an explicit indication method. The list of TRPs may be indicated by the TCI state or in the form of QCL assumption.

When control information is repeatedly transmitted in the frequency axis, the control information may be repeatedly transmitted over different CORESETs, repeatedly transmitted over different PDCCH candidates within one CORESET, or repeatedly transmitted for each CCE. The unit of resources repeatedly transmitted in the frequency axis and the location of resources of repetitive transmission may be indicated through a higher-layer configuration. Further, the number of repetitive transmissions and/or a list of TRPs participating in repetitive transmission, and a transmission pattern may be explicitly indicated, and a higher-layer indication or a MAC-CE/L1 signaling may be used as an explicit indication method. The list of TRPs may be indicated by the TCI state or in the form of QCL assumption.

When control information is repeatedly transmitted in the spatial axis, the control information may be repeatedly transmitted over different CORESETs or two or more TCI states may be configured in one CORESET and the control information may be repeatedly transmitted.

For convenience of description, a method of repeatedly transmitting a plurality of pieces of control information having different DCI formats and/or payloads will be referred to as "method 1-2".

Method 1-2 is a method of repeatedly transmitting a plurality of pieces of control information having different DCI formats and/or payloads. The control information schedules repetitive transmission PDSCHs, and the number of PDSCH repetitive transmissions indicated by each pieces of the control information may be different. For example, while PDCCH #1 may indicate information scheduling {PDSCH#1, PDSCH#2, . . . , PDSCH#Y}, PDCCH #2 may indicate information scheduling {PDSCH#2, . . . , PDSCH#Y}, . . . , and PDCCH #X may indicate information scheduling {PDSCH Y} The method of repeatedly transmitting the control information has an advantage of reducing a total of delay time required for control information and PDSCH repetitive transmission compared to method 1-1. On the other hand, in the method, since payloads of repeatedly transmitted control information may be different from each other, soft combining of the repeatedly transmitted control information is impossible, and thus reliability may be lower than that of method 1-1.

In method 1-2, the UE may not need to know in advance the location of resources of control information to be repeatedly transmitted and the number of repetitive transmissions, and may independently decode and process each piece of the repeatedly transmitted control information. When the UE decodes a plurality of pieces of repeatedly transmitted control information scheduling the same PDSCH, only the first repeatedly transmitted control information may be processed and the other repeatedly transmitted control information from the second control information may be ignored. Alternatively, the BS may indicate in advance the location of resources of control information to be repeatedly transmitted and the number of repetitive transmissions, and an indication method may be the same as the method described in method 1-1.

For convenience of description, a method of repeatedly transmitting each piece of plurality of control information having different DCI formats and/or payloads will be referred to as "method 1-3".

Method 1-3 is a method of repeatedly transmitting each piece of a plurality of control information having different DCI formats and/or payloads. At this time, each piece of repeatedly transmitted control information may have the same DCI format and payload. Since the plurality of pieces of control information in method 1-2 may not be soft-combined, it may have lower reliability than method 1-1, and method 1-1 may have a longer total delay time required for control information and PDSCH repetitive transmission. Method 1-3 is a method that makes use of the advantages of method 1-1 and method 1-2, and may transmit control information with higher reliability compared to method 1-2 while reducing the total delay time required for control information and PDSCH repetitive transmission compared to method 1-1.

In order to decode and soft-combine repeatedly transmitted control information, method 1-3 may use soft combining of method 1-1 and individual decoding of method 1-2. For example, in repetitive transmission of a plurality of pieces of control information having different DCI formats and/or payload, the first transmitted control information may be decoded through method 1-2 and repetitive transmission of the decoded control information may be soft-combined through method 1-1.

Meanwhile, the BS may select and configure one of method 1-1, method 1-2, or method 1-3 for repetitive transmission of control information. The method of repeatedly transmitting control information may be explicitly indicated to the UE by the BS through higher-layer signaling. Alternatively, the method of repeatedly transmitting control information may be indicated after a combination with other configuration information. For example, a higher-layer configuration indicating the PDSCH repetitive transmission scheme may be combined with an indication of control information repetitive transmission. When repetitive transmission of the PDSCH in a frequency division multiplexing (FDM) scheme is indicated, control information may be repeatedly transmitted only through method 1-1, and the reason thereof is that there is no effect of reduction in the delay time for PDSCH repetitive transmission in the FDM scheme by method 1-2. For a similar reason, when repetitive transmission of the PDSCH in an intra-slot time division multiplexing (TDM) scheme is indicated, control information may be repeatedly transmitted through method 1-1. On the other hand, when repetitive transmission of the PDSCH in an inter-slot TDM scheme is indicated, method 1-1, method 1-2, or method 1-3 for control information repetitive transmission may be selected through higher-layer signaling or L1 signaling.

Meanwhile, the BS may explicitly indicate the unit of control information repetitive transmission to the UE through a configuration such as higher layer. Alternatively, the unit of control information repetitive transmission may be combined with other configuration information and indicated. For example, the higher-layer configuration indicating the PDSCH repetitive transmission scheme may be combined with the unit of control information repetitive transmission. When repetitive transmission of the PDSCH in the FDM scheme is indicated, control information may be repeatedly transmitted in the FDM or spatial domain multiplexing (SDM) scheme, and the reason thereof is that, if control information is repeatedly transmitted in the inter-slot TDM scheme, there is no effect of reduction in the delay time by the PDSCH repetitive transmission in the FDM scheme. For a similar reason, when repetitive transmission of the PDSCH in the intra-slot TDM scheme is indicated, control information may be repeatedly transmitted in the TDM, FDM or SDM scheme. On the other hand, when repetitive transmission of the PDSCH in the inter-slot TDM scheme is indicated, higher-layer signaling may be selected for repetitive transmission of control information in the inter-slot TDM scheme or the intra-slot TDM, FDM, or SDM scheme.

For convenience of description, a method of a PDCCH transmission scheme applying respective TCI states to different CCEs within the same PDCCH candidates will be referred to as "method 1-4".

In order to improve reception performance of the PDCCH without PDCCH repetitive transmission, method 1-4 may perform transmission after applying different TCI states, meaning transmission from multiple TRPs to different CCEs within PDCCH candidates. The corresponding scheme is not PDCCH repetitive transmission, but is transmission after the application of different TCI states to different CCEs within PDCCH candidates by respective TRPs, and thus may be a scheme of acquiring spatial diversity within the PDCCH candidates. Different CCEs to which different TCI states are applied may be separated in a time or frequency dimension, and the UE needs to know in advance the location of resources to which different TCI states are applied. The UE may receive different CCEs to which different TCI states are applied within the same PDCCH candidates, and independently decode the CCEs or simultaneously decode the CCEs. In order to apply each TCI state to different CCEs in a specific PDCCH candidate, more than one TCI state may be configured in a control resource set in which the corresponding PDCCH candidate may exist, or more than one TCI state may be activated via MAC-CE.

For convenience of description, a method of a PDCCH transmission scheme applying a plurality of TCI states to all CCEs within same the PDCCH candidates (e.g., an SFN scheme) will be referred to as "method 1-5".

In order to improve PDCCH reception performance without PDCCH repetitive transmission, method 1-5 may perform transmission in an SFN scheme after the application of a plurality of TCI states to all CCEs within the PDCCH candidates. The corresponding scheme is not PDCCH repetitive transmission but may be scheme of acquiring spatial diversity through SFN transmission at the same CCE location within a PDCCH candidate group. The UE may receive CCEs at the same location to which different TCI states are applied within the same PDCCH candidate group, and independently decode the CCEs by using some or all of the plurality of TCI states or simultaneously decode the CCEs. In order to apply a plurality of TCI states to all CCEs in the same PDCCH candidate, more than one TCI state may be configured in a control resource set in which the corresponding PDCCH candidate may exist, or more than one TCI state may be activated via MAC-CE.

A soft combining-related UE capability report for PDCCH repetition transmission will now be described.

A UE may report, to a BS, a soft combining-related UE capability for PDCCH repetition transmission, and several methods relating thereto may exist. A UE capability reporting method will now be described. For convenience of description, this method will be referred to as "method 2-1".

According to method 2-1, a UE may report, to a BS, only on whether soft combining is possible during PDCCH repetition transmission in the form of possibility or impossibility via a UE capability.

For example, if the UE has reported information that soft combining is possible during PDCCH repetition transmission to the BS via the UE capability, the BS may determine whether soft combining of the UE is possible as the most flexible degree (for example, determine that the UE can perform soft combining at a log likelihood ratio (LLR) level), and notify the UE of PDCCH repetition transmission-related configuration as flexibly as possible at the time of PDCCH transmission-related configuration. As an example related to PDCCH repetition configuration, the BS may assume that the UE can perform soft combining between control resource sets or search spaces having different configurations, soft combining between PDCCH candidates in the same aggregation level, or soft combining between PDCCH candidates between different aggregation levels, and notify the UE of the corresponding configuration.

In addition, if the UE has reported information that soft combining is possible during PDCCH repetition transmission to the BS via the UE capability, the BS may most conservatively determine a level at which the UE can perform soft combining (for example, determine that the UE can perform soft combining at an OFDM symbol level), and most restrictively notify the UE of PDCCH repetition transmission-related configuration at the time of PDCCH transmission-related configuration. As an example related to PDCCH repetition configuration, the BS may assume that the UE can perform soft combining between multiple control resource sets having the same configuration or soft combining between PDCCH candidates having the same aggregation level, and notify the UE of the corresponding configuration.

Another UE capability reporting method will now be described. For convenience of description, this method will be referred to as "method 2-2".

According to method 2-2, in order to express an operation of soft combining which can be performed in a UE as a UE capability in more detail compared to the UE capability reporting method 2-1 described above, the UE may report, as a UE capability, levels divided with respect to the degree of possibility of soft combining during PDCCH repetition transmission to a BS. That is, among the respective signal levels generated from reception operation processes of the UE, the UE may identify a signal level at which soft combining can be applied with respect to PDCCH repetition transmission, and the UE may report such information to the BS as the UE capability. For example, the UE may inform that soft combining is possible at an OFDM symbol level, as a signal level at which soft combining can be applied, may inform that soft combining is possible at a modulation symbol level, and may inform that soft combining is possible at an LLR level. According to each signal level reported by the UE, the BS may notify the UE of an appropriate configuration such that the UE can perform soft combining, according to the reported UE capability.

Another UE capability reporting method will now be described. For convenience of description, this method will be referred to as "method 2-3".

According to method 2-3, a UE may transmit, via a UE capability, restrictions necessary for allowing soft combining to be possible at the UE side during PDCCH repetition transmission to a BS. For example, the UE may report, to the BS, that configurations of respective control resource sets including two repeated PDCCHs are required to be the same. In addition, the UE may report, to the BS, that two repeated PDCCH candidates are required to at least have the same aggregation level.

Another UE capability reporting method will now be described. For convenience of description, this method will be referred to as "method 2-4".

According to method 2-4, when a UE receives PDCCH repetition transmission from a BS, the UE may report supported a PDCCH repetition transmission scheme, via a UE capability. For example, the UE may report information about supporting the method 1-5 (an SFN transmission scheme) to the BS. In addition, the UE may report, to the BS, information about supporting an intra-slot TDM, inter-slot TDM, or FDM scheme of the method 1-1 (a method for repeatedly transmitting a plurality of PDCCHs having the same payload). In particular, in the case of TDM, the UE may report the maximum value of a time interval between two repeated PDCCHs to the BS. For example, if the UE has reported the maximum value of the time interval between the two repeated PDCCHs as 4 OFDM symbols, in the case of performing TDM-based PDCCH repetition transmission to the UE, based on the corresponding information, the BS may be required to adjust the time interval between the two repeated PDCCHs to 4 OFDM symbols or less.

The above-described UE capability reporting methods can be configured in combinations of two or more in actual application. For example, the UE may report that soft combining is possible at an LLR level by the UE capability reporting method 2-2 and report that two repeated PDCCH candidates are required to have the same aggregation level by the UE capability reporting method 2-3, and support PDCCH repetition transmission TDMed by the UE capability reporting method 2-4, but report the maximum value of a time interval between two repeated PDCCHs as 4 OFDM symbols. In addition, applications based on various combinations of the UE capability reporting methods are possible, but a detailed description thereof is omitted.

A method of an explicit linkage during PDCCH repetition transmission will now be described.

Specifically, a method of an explicit linkage between PDCCH candidates for PDCCH repetition transmission is described. When a BS performs PDCCH repetition transmission to a UE, based on the method 1-1 (a method for repeatedly transmitting a plurality of PDCCHs having the same payload) among various PDCCH repetition transmission methods described above, the BS may configure and indicate, to the UE, information indicating that an explicit connection (linkage or association) is established between repeated PDCCH candidates, so as to reduce the number of blind decodings based on whether soft combining of the UE is possible. The information indicating that an explicit connection (linkage or association) is established between repeated PDCCH candidates may be configured via higher layer signaling, indicated via L1 signaling, or configured and indicated via a combination of higher layer signaling and L1 signaling. In more detail, various linkage methods may exist as follows.

In order to be commonly applied to explicit linkage methods to be described later, various methods of PDCCH repetition transmission and explicit connectivity-related configuration via higher layer signaling may be as follows.

A PDCCH repetition configuration method, in the case where configuration information exists in higher layer signaling (e.g., RRC) PDCCH-config, will now be described.

A BS may transmit, to a UE, configuration information (e.g., a PDCCH-repetition-config) in a PDCCH-config, which is higher layer signaling (e.g., an RRC), in order to configure PDCCH repetition transmission and explicit linkage-related configuration. For example, the configuration information (e.g., a PDCCH-repetition-config) in PDCCH-config may include the following information:

a PDCCH repetition transmission scheme—one of TDM, FDM, and SFN;
    control resource set-search space combination(s) to be used during PDCCH repetition transmission;
    optionally, control resource set index(es);
    optionally, search space index(es);
    optionally, aggregation level(s) for explicit linkage;
    optionally, PDCCH candidate index(es) for explicit linkage; and
    optionally, a frequency resource for explicit linkage.

Based on the above information, the BS may configure PDCCH repetition transmission to the UE via higher layer signaling.

For example, if a PDCCH repetition transmission scheme is configured as an SFN, a control resource set index is configured to be 1 and a search space index is not configured as a control resource set-search space combination to be used during PDCCH repetition transmission, the UE may expect that a PDCCH is to be repeatedly transmitted via the method 1-5 (a SFN transmission scheme) in a control resource set having index 1. In this case, in the configured control resource set, one or more of a plurality of different TCI states may be configured via higher layer signaling, indicated via L1 signaling or MAC-CE signaling, or configured and indicated via a combination of higher layer signaling and L1 signaling or MAC-CE signaling. In addition, if the PDCCH repetition transmission scheme is configured as the SFN, the UE may not expect that a search space index is configured in the control resource set-search space combination to be used during PDCCH repetition transmission.

In addition, the PDCCH repetition transmission scheme may be configured as a TDM or FDM scheme, and a total of two control resource set-search space combinations to be used during PDCCH repetition transmission may be configured. For example, control resource set index 1 and search space index 1 may be configured for the first combination, and control resource set index 2 and search space index 2 may be configured for the second combination. In this case, the UE may expect that a PDCCH is to be repeatedly transmitted in a TDM or FDM scheme via the method 1-1 by using two control resource set-search space combinations. In this case, in each of configured control resource sets, a plurality of TCI states which are the same or different from each other may be configured via higher layer signaling, indicated via L1 signaling or MAC-CE signaling, or configured and indicated via a combination of higher layer signaling and L1 signaling or MAC-CE signaling. In addition, if the PDCCH repetition transmission scheme is configured as TDM or FDM, the UE may expect that up to two control resource set-search space combinations to be used during PDCCH repetition transmission are configured, and expect that both a control resource set index and a search space index are configured in each combination.

Additionally, a value of at least one of the five pieces of information (e.g., a PDCCH repetition transmission scheme, control resource set-search space combination(s) to be used during PDCCH repetition transmission, aggregation level(s) for explicit linkage, PDCCH candidate index(es) for explicit linkage, and a frequency resource for explicit linkage) may be updated based on MAC-CE without RRC reconfiguration.

If the BS does not configure the configuration information (e.g., PDCCH-repetition-config) to the UE, the UE may not expect that a PDCCH is repeatedly transmitted, but expect only single PDCCH transmission. All of the above-described aggregation level, PDCCH candidate index, and frequency resources for explicit linkage may not be configured, or at least one thereof may be configured according to an explicit linkage method to be described later.

A PDCCH repetition configuration method, in the case where configuration information exists in higher layer signaling (e.g., RRC) for a search space, will now be described.

A BS may add a higher layer signaling parameter in a searchSpace information element (IE), which is higher layer signaling for a search space, to configure PDCCH repetition transmission, and notify a UE of the same. For example, a parameter referred to as repetition, which is additional higher layer signaling, may be included in the searchSpace IE, which is higher layer signaling, and the repetition parameter may be configured to be on or off, and thus whether the corresponding search space is used for PDCCH repetition transmission may be configured. For example, a search space in which repetition is configured to be on may be one or two bits or units per bandwidth part.

If, in the searchSpace IE, which is higher layer signaling for search space index 1, searchSpaceId is configured to be 1, controlResourceSetId is configured to be 1, and repetition is configured to be on, the UE may expect that PDCCH repetition transmission is performed according to the method 1-5 (an SFN transmission method) in control resource set 1 linked to search space 1.

In addition, if in searchSpace IE, which is higher layer signaling for search space index 1, searchSpaceId is configured to be 1, controlResourceSetId is configured to be 1, and repetition is configured to be on, and in searchSpace IE, which is higher layer signaling for search space index 2, searchSpaceId is configured to be 2, controlResourceSetId is configured to be 2, and repetition is configured to be on, the UE may identify that PDCCH repetition transmission is performed by TDM or FDM by using the method 1-1 between a combination of control resource set 1 and search space 1, and a combination of control resource set 2 and search space 2. TDM and FDM may be divided according to time and frequency configurations via higher layer signaling of control resource sets 1 and 2 and search spaces 1 and 2.

In addition, in higher layer signaling for the search space in which repetition is configured to be on, an aggregation level or PDCCH candidate indexes for explicit linkage specified in the PDCCH repetition configuration method may be configured, both of the aggregation level and PDCCH candidate indexes may not be configured, only one of them may be configured, or both of them may be configured according to an explicit linkage method to be described later.

Explicit linkage methods to be described later may correspond to the method 1-1. In this case, the UE may expect two combinations of control resource set-search space for PDCCH repetition transmission. The explicit linkage may exist between PDCCH candidates transmitted between control resource set-search space combinations. For example, one or a plurality of PDCCH candidates transmitted in control resource set 1 and search space 1, and one or a plurality of PDCCH candidates transmitted in control resource set 2 and search space 2 may be explicitly connected.

An explicit linkage method, e.g., an aggregation level configuration method, will now be described.

According to the method, a BS may configure one or a plurality of aggregation levels via the above-described PDCCH repetition configuration methods for an explicit linkage between repeated PDCCH candidates. For example, if an aggregation level is configured to be 2, a UE may assume that explicit linkage exists between PDCCH candidates having an aggregation level configured to be 2 in each control resource set-search space combination. More specifically, if the number of PDCCH candidates with aggregation level 2 for a control resource set 1 and search space 1 combination is 4 (described later as 1, 2, 3, and 4 PDCCH candidates), and the number of PDCCH candidates with aggregation level 2 for a control resource set 2 and search space 2 combination is 2 (described later as 1' and 2' PDCCH candidates), the UE may determine that connectivity exists between all PDCCH candidates configured with aggregation level 2 for the two control resource set and search space combinations. In addition, in the case of performing blind decoding for a PDCCH, the UE may determine that an explicit linkage exists for combinations (1, 1'), (2, 1'), (3, 1'), (4, 1'), (1, 2'), (2, 2'), (3, 2'), and (4, 2') between PDCCH candidates, and may perform blind decoding in consideration of soft combining.

In addition, the UE may assume that an explicit linkage exists only for PDCCH candidates with indexes corresponding to the same order for a specific aggregation level. More specifically, the UE may assume that an explicit linkage exists only for PDCCH candidates with indexes corresponding to the same order among combinations of PDCCH candidates for which the same aggregation level is configured. In the example, the UE may assume that explicit linkage exists between (1, 1') and (2, 2') candidates among combinations of the PDCCH candidates configured with aggregation level 2 for the two control resource set and search space combinations, and, based on the assumption, perform blind decoding in consideration of soft combining.

In the corresponding example, it may be assumed that, if the number of PDCCH candidates configured for an aggregation level configured to have an explicit linkage is different for the two control resource set and search space combinations, an explicit linkage exists only for PDCCH candidates with indexes corresponding to the same order as described above (that is, it may be assumed that an explicit linkage exists between the (1, 1') and (2, 2') candidates).

Alternatively, it may be assumed that an additional explicit linkage exists even for the third and fourth PDCCH candidates having no corresponding index, and the following methods are possible. For example, it may be assumed that the 3 and 4 PDCCH candidates having no corresponding index have an explicit linkage with the 1' PDCCH candidate having the lowest index (that is, assumed that explicit a linkage exists between the (1, 1'), (2, 2'), (3, 1'), and (4, 1') candidates). In addition, it may be assumed that the 3 and 4 PDCCH candidates having no corresponding index, have an explicit linkage with the 2' PDCCH candidate having the highest index (that is, assumed that an explicit linkage exists between the (1, 1'), (2, 2'), (3, 2'), and (4, 2') candidates). Additionally, it may be assumed that the 3 and 4 PDCCH candidates having no corresponding index have an explicit linkage with the 1' and 2' PDCCH candidates, respectively (that is, assumed that explicit connectivity exists between the (1, 1'), (2, 2'), (3, 1'), and (4, 2') candidates). In the case where the number of PDCCH candidates of aggregation level 2 in each of the control resource set and search space combinations is n1 and n2, and n1>n2, if a combination of PDCCH candidates in which an explicit linkage exists is referred to as (i, j), it may be generalized to i=1, 2, ..., n1, and j=floor(i/n2)+1 or j=mod(i−1, n2)+1, wherein floor(.) may mean a round-down function and mod(.) may mean a remainder operation (modulo).

The above various methods may be similarly extended or applied even when a plurality of aggregation levels in which an explicit linkage exists between PDCCH repetition transmissions are configured.

If an aggregation level is not configured, the UE may assume that an explicit linkage exists for a specific aggregation level as a default operation of the BS. For example, if the aggregation level is not configured, the UE may assume that an explicit linkage exists between PDCCH candidates configured in aggregation level 16 for the two control resource set and search space combinations.

In addition to the above-described aggregation level configuration method, the UE may assume that an index of the PDCCH candidate having explicit connectivity is previously defined without separate configuration information in order to adjust the complexity of blind decoding.

For example, the UE may assume that an explicit linkage exists only for a PDCCH candidate having the lowest index for a specific aggregation level. More specifically, if an aggregation level having explicit linkage is configured to be 2, the number of PDCCH candidates configured in aggregation level 2 for the control resource set 1 and search space 1 combination is 4 (described later as 1, 2, 3, and 4 PDCCH candidates), and the number of PDCCH candidates configured in aggregation level 2 for the control resource set 2+search space 2 combination is 2 (described later as 1' and 2' PDCCH candidates), the UE may assume that explicit linkage exists between (1, 1') candidates among the combinations of the PDCCH candidates configured in aggregation level 2 for the two control resource set and search space combinations, and, based on the assumption, perform blind decoding in consideration of soft combining.

In addition, the UE may assume that an explicit linkage exists only for a PDCCH candidate having the highest index for a specific aggregation level. More specifically, the UE may assume that explicit linkage exists between (4, 2') candidates among the combinations of the PDCCH candidates configured in aggregation level 2 for the two control resource set and search space combinations, and, based on the assumption, perform blind decoding in consideration of soft combining.

Additionally, the UE may assume that an explicit linkage exists only for up to two PDCCH candidates in ascending order including the lowest index for a specific aggregation level. More specifically, the UE may assume that explicit linkage exists between (1, 1'), (2, 1'), (1, 2'), and (2, 2') candidates among the combinations of the PDCCH candidates configured in aggregation level 2 for the two control resource set and search space combinations, and, based on the assumption, perform blind decoding in consideration of soft combining.

In addition, the UE may assume that an explicit linkage exists only for a PDCCH candidate corresponding to a CCE at the lowest frequency location for a specific aggregation level. More specifically, in the example, if the first PDCCH candidate among the 1, 2, 3 and 4 PDCCH candidates corresponds to the CCE at the lowest frequency location, and the 2' PDCCH candidate among the 1' and 2' PDCCH candidates corresponds to the CCE at the lowest frequency location, the UE may assume that explicit linkage exists between (1, 2') candidates among the combinations of the PDCCH candidates configured in aggregation level 2 for the two control resource set and search space combinations, and, based on the assumption, perform blind decoding in consideration of soft combining.

The above various methods may be similarly extended or applied even when a plurality of aggregation levels in which an explicit linkage exists between PDCCH repetition transmissions are configured.

Another explicit linkage method, e.g., a PDCCH candidate index configuration method, will now be described.

According to the method, a BS may configure one or a plurality of PDCCH candidate indexes via the above-described PDCCH repetition configuration methods for an explicit linkage between repeated PDCCH candidates. For example, if a PDCCH candidate index is configured to be 1, a UE may assume that explicit linkage exists between first PDCCH candidates for each aggregation level in each control resource set-search space combination. For example, it may be assumed that, for a control resource set 1 and search space 1 combination, the number of PDCCH candidates configured in aggregation level 1 is 2 (described as (1-1)th and (1-2)th PDCCH candidates) and the number of PDCCH candidates configured in aggregation level 2 is 4 (described as (2-1)th, (2-2)th, (2-3)th, and (2-4)th PDCCH candidates), and for a control resource set 2 and search space 2 combination, the number of PDCCH candidates configured in aggregation level 1 is 4 (described as (1-1')th, (1-2')th, (1-3')th, and (1-4')th PDCCH candidates) and the number of PDCCH candidates configured in aggregation level 2 is 2 (described as (2-1')th and (2-2')th PDCCH candidates). The UE may determine that an explicit linkage exists between the first PDCCH candidates for the two control resource set and search space combinations, and when performing blind decoding on a PDCCH, determine that an explicit linkage exists for combinations ((1-1)th, (1-1')th), ((1-1)th, (2-1')th), ((2-1)th, (1-1')th), and ((2-1)th, (2-1')th) between PDCCH candidates, and perform blind decoding in consideration of soft combining. This can be naturally extended when a plurality of PDCCH candidate indexes are configured.

In addition, if a PDCCH candidate index is configured to be 1, 2, and 3, the UE may assume that explicit linkage exists between the first to the third PDCCH candidates for each aggregation level in each control resource set-search space combination. Since the number of PDCCH candidates configured in aggregation level 1 for the control resource set 1 and search space 1 combination and the number of PDCCH candidates configured in aggregation level 2 for the control resource set 2 and search space 2 combination are 2, respectively, a value of PDCCH candidate index 3 configured for an explicit linkage may be ignored. In the case of performing blind decoding on a PDCCH, the UE may determine that an explicit linkage exists for combinations ((1-1)th, (1-1')th), ((1-1)th, (1-2')th), ((1-1)th, (1-3')th), ((1-1)th, (2-1')th), ((1-1)th, (2-2')th), 41-2)th, (1-1')th), ((1-2)th, (1-2')th), ((1-2)th, (1-3')th), ((1-2)th, (2-1')th), ((1-2)th, (2-2')th), ((2-3)th, (1-1')th), ((2-3)th, (1-2')th), ((2-3)th, (1-3')th), ((2-3)th, (2-1')th), and ((2-3)th, (2-2')th) between PDCCH candidates, and may perform blind decoding in consideration of soft combining.

Additionally, when the UE is configured with one or a plurality of PDCCH candidate indexes via the PDCCH repetition configuration methods, the UE may assume that an explicit linkage exists only for a specific aggregation level. More specifically, the UE may assume that explicit linkage exists between ((2-1)th, (2-1')th) candidates among combinations of PDCCH candidates configured in aggregation level 2 for the two control resource set and search space combinations, and, based on the assumption, perform blind decoding based on soft combining. The specific aggregation level may be the lowest value or the highest value among aggregation level values commonly configured for the two control resource set and search space combinations. For example, if aggregation levels 1, 2, 4, and 8 are configured in the control resource set 1 and search space 1 combination, and aggregation levels 2, 4, 8, and 16 are configured in the control resource set 2 and search space 2 combination, the UE may assume that the lowest value is 2 and the highest value is 8. This can be naturally extended when there are a plurality of specific aggregation levels.

A linkage method, e.g., a frequency resource configuration method, will now be described.

A BS may configure a frequency resource via the above-described PDCCH repetition configuration methods to configure an explicit linkage between repeated PDCCH candidates. In the frequency resource configuration method, a CCE index may be given, a bitmap may be given with respect to a frequency resource of a control resource set, or the number of consecutive RBs to a start in the frequency resource of the control resource set may be configured. For example, if a frequency resource configured for an explicit linkage has a value of CCE indexes 1 to 4, a UE may assume that explicit linkage exists between all PDCCH candidates for all aggregation levels corresponding to positions of the CCE indexes 1 to 4 in each control resource set-search space combination. More specifically, in the example of the linkage method of a PDCCH candidate index configuration method, if the number of PDCCH candidates corresponding to the positions of the CCE indexes 1 to 4 with respect to a control resource set 1 and search space 1 combination is 2 (described as (1-1)th and (2-3)th PDCCH candidates) and the number of PDCCH candidates corresponding to the positions of the CCE indexes 1 to 4 with respect to a control resource set 2 and search space 2 combination is 2 (described as (1-2')th and (2-1')th PDCCH candidates), in the case of performing blind decoding on a PDCCH with respect to the two control resource set and search space combinations, the UE may determine that an explicit linkage exists for combinations ((1-1)th, (1-2')th), ((1-1)th, (2-1')th), ((2-3)th, (1-2')th), and ((2-3)th, (2-1')th) between PDCCH candidates, and perform blind decoding based on soft combining. In the case of determining a PDCCH candidate included in a CCE index configured for an explicit linkage, it may be determined that the PDCCH candidate is included only when the same is completely included, or it may be determined that the PDCCH candidate is included even when at least one CCE overlaps. This may be similarly applied even when a bitmap is given with respect to a frequency resource of a control resource set or the number of RBs consecutive to a start RB is configured in the frequency resource of the control resource set, in addition to the method of configuring to give a CCE index.

The various linkage methods may be applied exclusively to each other when the UE assumes an explicit linkage, or may be applied as a combination of the various linkage methods. For example, if an aggregation level configured for an explicit linkage is 1 or 2, a PDCCH candidate index configured for the explicit linkage is 1, and a CCE index configured for the explicit linkage is 1 to 4, in the example of the frequency resource configuration linkage method, in the case of performing blind decoding on a PDCCH with respect to the two control resource set and search space combinations, the UE may determine that an explicit linkage exists for a combination ((1-1)th, (2-1')th) between PDCCH candidates, and perform blind decoding in consideration of soft combining.

An explicit linkage method for PDCCH repetition transmission will now be described.

As described above, a UE may be configured with one or more pairs of two search spaces linked via higher layer signaling. In the case of receiving PDCCH repetition transmission, when the UE uses a reception method based on improved reliability for repeated transmission via soft combining, in order to reduce an implementation burden such as the size of LLR buffers that the UE is required to simultaneously use, there may be a restriction, configured for the UE by a BS, on information related to PDCCH repetition transmission. The restriction may be equally applied to all UEs that standardly support PDCCH repetition transmission, or may be applied differentially to each UE according to a UE capability report. Items that may be considered as restrictions on PDCCH repetition transmission are described below, and at least one of the items may be defined as a restriction or may be reported according to a UE capability. In the case of being reported according to the UE capability, a specific value for the corresponding restriction may be configured to a UE as a higher layer according to the UE capability report. The corresponding UE capability report may be defined for each band/each band combination/each FR/each UE. Different values may be defined, reported, or configured according to different numerology. The items (1)-(8) are described below.

1) The number of different cells in which PDCCH repetition transmission may be configured.
   A UE may have a restriction on the number of different cells in which a pair of search spaces linked via higher layer signaling may be configured. The number of different cells may be a restriction within a cell group, or may be a restriction applied to all cell groups.

2) The maximum number of pairs of two search spaces linked via higher layer signaling per each cell.
   A UE may have a restriction for each cell with respect to the maximum number of pairs of two search spaces linked via higher layer signaling. For example, when the two linked search spaces (e.g., search space 1-search space 2) are referred to as one pair, the number of pairs which may be configured/indicated for each cell may be limited.

3) The maximum number of pairs of two search spaces linked via higher layer signaling in all cells.
   A UE may have a restriction in all cells with respect to the maximum number of pairs of two search spaces linked via higher layer signaling. For example, when the two linked search spaces (e.g., search space 1-search space 2) are referred to as one pair, the number of pairs which may be configured/indicated for all cells may be limited.

4) For each cell, the maximum number of pairs of two search spaces which are linked via higher layer signaling and may exist within one slot.
   For each cell, a UE may have a restriction on the maximum number of pairs of two search spaces linked via higher layer signaling within one slot in case of PDCCH repetition transmission within the slot. For example, when the two linked search spaces (e.g., search space 1-search space 2) are referred to as one pair, a restriction on the number of pairs which may exist within one slot may be configured/indicated for each cell. In addition, in 15 kHz numerology, up to four pairs of search spaces may have PDCCH monitoring occasions linked to each other within one slot.

5) For each cell, the maximum number of repeated PDCCH candidates within one slot that a pair of two search spaces linked via higher layer signaling may have.
   For each cell, a UE may have a restriction on the maximum number of repeated PDCCH candidates within one slot that a pair of two search spaces linked via higher layer signaling may have in case of PDCCH repetition transmission within the slot. For example, one or a plurality of PDCCH candidates transmitted in control resource set 1 and search space 1, and one or a plurality of PDCCH candidates transmitted in control resource set 2 and search space 2 may be linked via higher layer signaling. There may be a restriction, for each cell, on the maximum number of repeated PDCCH candidates (that is, connected PDCCH candidates) that a pair of linked search space 1 and search space 2 may have. The corresponding value may have a value for the maximum number of PDCCH candidates for each aggregation level (AL), or may have a value for the maximum number of PDCCH candidates throughout all AL values.

6) For each cell, the number of different PDCCH monitoring occasions within one slot that a pair of two search spaces linked via higher layer signaling may have.
   A UE may have, for each cell, a restriction on the number of different PDCCH monitoring occasions within one slot that a pair of two search spaces linked via higher layer signaling may have in case of PDCCH repetition transmission within a slot.

7) For each cell, the maximum number of PDCCH candidates or PDCCH monitoring occasions of a single search space which is not linked to another search space via higher layer signaling and may exist between two PDCCH monitoring occasions linked to each other of a pair of two search spaces linked via higher layer signaling within one slot, and/or the maximum number of pairs of two search spaces linked via higher layer signaling, PDCCH monitoring occasions, or repeated PDCCH candidates, and/or the maximum number for the sum of two values.

In case of PDCCH repetition transmission within a slot, a UE may have a restriction on the number of PDCCH monitoring occasions which may exist between two PDCCH monitoring occasions linked to each other of a pair of two search spaces which are linked via higher layer signaling and may exist within one slot. Another PDCCH monitoring occasion which may exist between two PDCCH monitoring occasions may be the number of PDCCH monitoring occasions for an independent search space which does not have linkage via higher layer signaling, may be the number of PDCCH monitoring occasions for a pair of two search spaces linked via higher layer signaling, or may also be the sum of two values. In this case, the pair of two search spaces linked via higher layer signaling may perform PDCCH repetition transmission in an FDM scheme in one PDCCH monitoring occasion, or when PDCCH repetition transmission is performed in a TDM scheme, both of the two PDCCH monitoring occasions may exist between specific PDCCH monitoring occasions, or only one PDCCH monitoring occasion among the two PDCCH monitoring occasions may exist between specific PDCCH monitoring occasions.

For example, if the UE is configured with a pair of two linked common search spaces via higher layer signaling, only a PDCCH monitoring occasion for an independent search space (e.g., a search space in which a PDCCH repetition transmission is not applied) having no connectivity via higher layer signaling may exist between two linked PDCCH monitoring occasions of two corresponding common search spaces.

In another example, if the UE is configured with a pair of two linked common search spaces via higher layer signaling, any PDCCH monitoring occasion (e.g., a PDCCH monitoring occasion for two search spaces linked via higher layer signaling or an independent search space (e.g., a search space in which a PDCCH repetition transmission is not applied) having no connectivity via higher layer signaling) may not exist between two linked PDCCH monitoring occasions of two corresponding common search spaces.

In another example, if the UE is configured with a pair of two linked UE-specific search spaces via higher layer signaling, only a PDCCH monitoring occasion for an independent search space (e.g., a search space in which a PDCCH repetition transmission is not applied) having no connectivity via higher layer signaling may exist or only a PDCCH monitoring occasion for two common search spaces linked via higher layer signaling may exist between two linked PDCCH monitoring occasions of two corresponding UE-specific search spaces.

In another example, if the UE is configured with a pair of two linked UE-specific search spaces via higher layer signaling, any PDCCH monitoring occasion (e.g., a PDCCH monitoring occasion for two search spaces linked via higher layer signaling or an independent search space (e.g., a search space in which a PDCCH repetition transmission is not applied) having no connectivity via higher layer signaling) may not exist between two linked PDCCH monitoring occasions of two corresponding UE-specific search spaces.

8) In all cells, the maximum number of PDCCH candidates or PDCCH monitoring occasions of a single search space which is not linked to another search space via higher layer signaling and may exist between two PDCCH monitoring occasions linked to each other of a pair of two search spaces linked via higher layer signaling within one slot based on the smallest numerology (e.g., 15 kHz), the maximum number of pairs of two search spaces linked via higher layer signaling, and/or the maximum number for the sum of two values.

In case of PDCCH repetition transmission within a slot, a UE may have a restriction on the number of PDCCH monitoring occasions which may exist between two PDCCH monitoring occasions linked to each other of a pair of two search spaces which are linked via higher layer signaling and may exist within one slot based on the smallest numerology (e.g., 15 kHz) in all cells. Another PDCCH monitoring occasion which may exist between two PDCCH monitoring occasions may be the number of PDCCH monitoring occasions for an independent search space which does not have connectivity via higher layer signaling, may be the number of PDCCH monitoring occasions for a pair of two search spaces linked via higher layer signaling, or may also be the sum of two values. In this case, the pair of two search spaces linked via higher layer signaling may perform PDCCH repetition transmission in an FDM scheme in one PDCCH monitoring occasion, or when PDCCH repetition transmission is performed in a TDM scheme, both of the two PDCCH monitoring occasions may exist between specific PDCCH monitoring occasions, or only one PDCCH monitoring occasion among the two PDCCH monitoring occasions may exist between specific PDCCH monitoring occasions.

For example, if the UE is configured with a pair of two linked common search spaces via higher layer signaling, only a PDCCH monitoring occasion for an independent search space (e.g., a search space in which a PDCCH repetition transmission is not applied) having no connectivity via higher layer signaling may exist between two linked PDCCH monitoring occasions of two corresponding common search spaces throughout all cells.

In another example, if the UE is configured with a pair of two common search spaces linked via higher layer signaling, any PDCCH monitoring occasion (e.g., a PDCCH monitoring occasion for two search spaces connected via higher layer signaling or an independent search space (e.g., a search space in which a PDCCH repetition transmission is not applied) having no connectivity via higher layer signaling) may not exist between two linked PDCCH monitoring occasions of two corresponding common search spaces throughout all cells.

For example, if the UE is configured with a pair of two UE-specific search spaces linked via higher layer signaling, only a PDCCH monitoring occasion for an independent search space (e.g., a search space in which a PDCCH repetition transmission is not applied) having no connectivity via higher layer signaling may exist or only a PDCCH monitoring occasion for two common search spaces connected via higher layer signaling may exist between two linked PDCCH monitoring occasions of two corresponding UE-specific search spaces throughout all cells.

In another example, if the UE is configured with a pair of two UE-specific search spaces connected via higher layer signaling, any PDCCH monitoring occasion (e.g., a PDCCH monitoring occasion for two search spaces connected via higher layer signaling or an independent search space (e.g., a search space in which a PDCCH repetition transmission is not applied) having no connectivity via higher layer signaling) may not exist between two connected PDCCH monitoring occasions of two corresponding UE-specific search spaces throughout all cells.

The above-described restrictions on PDCCH repetition transmission may be applied to both a UE-specific search space and a common search space, and may be reported for the UE-specific search space according to UE capability, but may be defined as standards for the common search space and applied equally to all UEs, and the same value or different values may be applied to the UE-specific search space and the common search space. When the above-described restrictions on PDCCH repetition transmission are applied to the common search space, the restrictions may be applied only to Type 3 common search space and/or may also be applied to Type 0/0A/1/2 common search space after an RRC CONNECTED state is established.

In addition, the above-described restrictions on PDCCH repetition transmission may be configured or defined differently as standards according to the cases where a UE reports 2, 3, or both 2 and 3 as the number of blind decodings according to the UE capability, or different UE capability report values may be transmitted to a BS.

In addition, the above-described restrictions on PDCCH repetition transmission may be configured or defined as standards differently according to whether control resource sets respectively connected to two search spaces (both the common and UE-specific search spaces) connected via higher layer signaling are the same or different from each other, or different UE capability report values may be transmitted to the BS. The respectively connected control resource sets being the same may mean that PDCCH repetition transmission is performed by applying the same TCI state at the time of transmitting each PDCCH from a single TRP. The respectively connected control resource sets being different may mean that PDCCH repetition transmission is performed by applying different TCI states at the time of transmitting each of PDCCHs transmitted from different TRPs.

Figure 17:
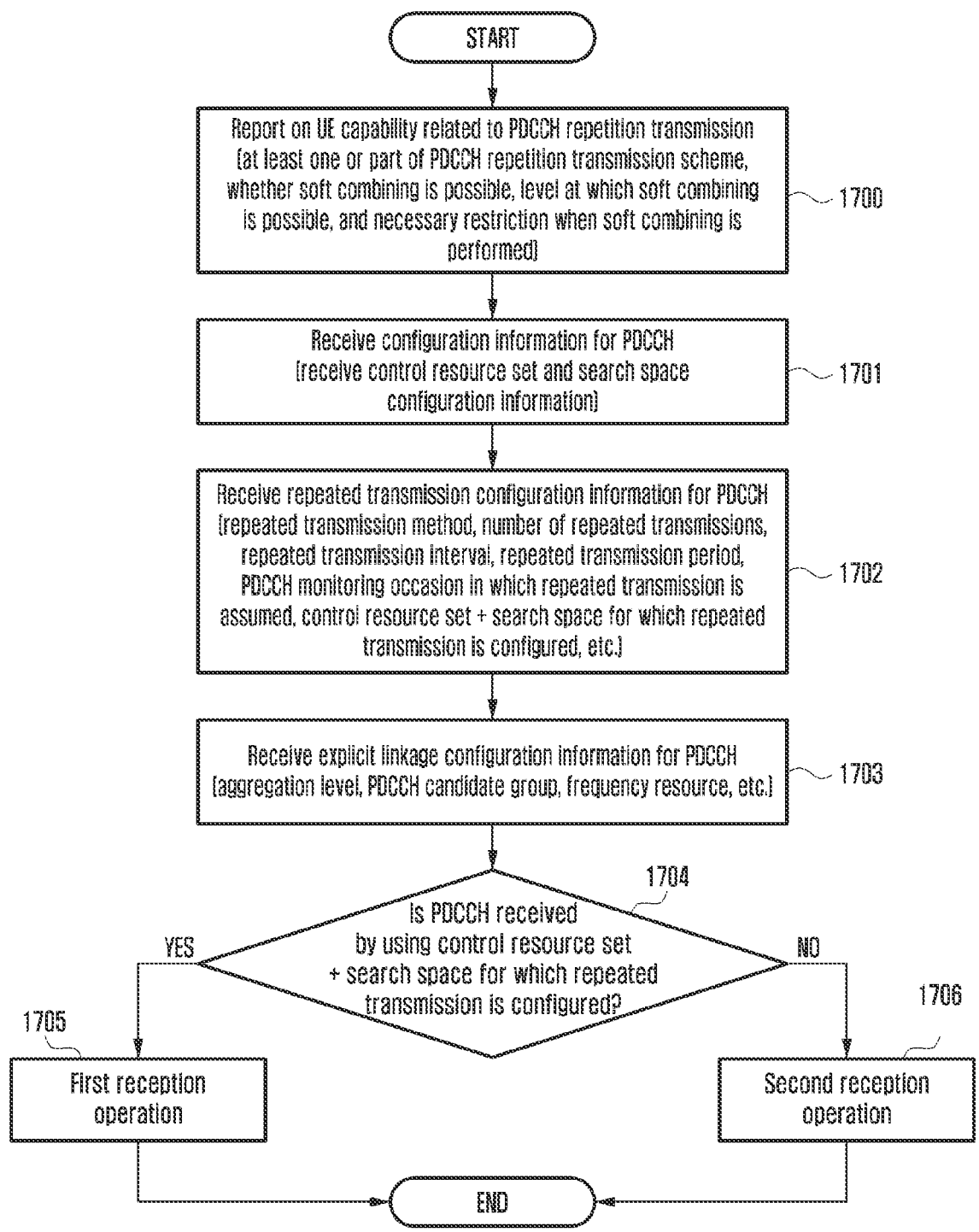
FIG. 17 illustrates a flow chart relating to an operation of a terminal according to PDCCH repetition transmission configuration and explicit linkage configuration conditions of a BS and a terminal capability report during PDCCH repetition transmission, according to an embodiment of the disclosure.

FIG. 17 illustrates a flow chart relating to an operation of a UE according to PDCCH repetition transmission configuration and explicit linkage configuration conditions of a BS and a UE capability report during PDCCH repetition transmission, according to an embodiment of the disclosure.

Referring to FIG. 17, a UE reports UE capability related to PDCCH repetition transmission to a BS in step 1700. In this case, the possible UE capability report may include at least one or a part of a PDCCH repetition transmission scheme (for example, may be one of the methods 1-1 to 1-5) supported by the UE and a soft combining-related UE capability reporting method (e.g., whether soft combining is possible, a level at which soft combining is possible, or a necessary restriction when soft combining is performed). In addition, the reported UE capability may include restriction information associated with PDCCH repetition transmission (e.g., information on a restriction associated with linked PDCCH candidates for a pair of linked search spaces). The UE capability report may include a restriction on at least one of the number of different cells in which PDCCH repetition transmission may be configured, the maximum number of pairs of two linked search spaces, the maximum number of pairs of two linked search spaces which may exist within one slot, or the maximum number of linked PDCCH candidates in a pair of linked search spaces (within one slot). A restriction associated with the maximum number of linked PDCCH candidates may be indicated for each component carrier. A restriction associated with the maximum number of linked PDCCH candidates may be configured differently according to an aggregation level. When information on the UE capability is pre-configured for the corresponding UE, step 1700 may be skipped. In addition, when the information on the UE capability is equally applied as default information to UEs of a predetermined group, step 1700 may be skipped.

Thereafter, the UE receives first configuration information for a PDCCH from the BS in step 1701. The first configuration information (e.g., PDCCH-Config) may include control resource set configuration information (e.g., a control resource set list configured for a PDCCH) and search space configuration information (e.g., a search space list configured for a PDCCH). One or more search spaces may be configured based on the first configuration information.

The UE receives second configuration information for PDCCH repetition transmission in step 1702. In this case, the second configuration information may include at least one of information indicating a repeated transmission scheme, the number of repeated transmissions, a repeated transmission interval, a repeated transmission period, a PDCCH monitoring occasion in which repeated transmission is assumed, whether a connection (linkage or association) between repeated transmissions can be identified, and information on a control resource set and search space for which repeated transmission is configured. The information on the control resource set and search space for which repeated transmission is configured may correspond to an RRC parameter searchSpace IE. The information on the control resource set and search space for which repeated transmission is configured may include a search space ID, an ID of a control resource set associated with the corresponding search space, and a parameter for configuring PDCCH repetition transmission. It may be configured and indicated to the UE that a connection (linkage or association) is established between repeated PDCCH candidates, based on the parameter for configuring PDCCH repetition transmission.

In addition, the UE receives third configuration information in step 1703. In this case, the third configuration information may include information on at least one of an aggregation level, a PDCCH candidate group, and a frequency resource, or none of them may be included in the third configuration information. The number of PDCCH candidates of each search space (search space set) may be configured for each aggregation level based on the third configuration information. In addition, the UE can receive at least a part of the first configuration information to the third configuration information via L1 signaling, or immanently determine at least a part thereof, based on another configuration information. In addition, the first to the third configuration information may be included in one configuration information and provided to the UE.

The UE, having received the configuration information, identifies that transmission is performed using a plurality of control resource sets and search spaces for which repeated transmission is configured in step 1704. A linkage between one or more PDCCH candidates of a first search space (search space set) and one or more PDCCH candidates of a second search space (search space set) may be identified based on the configuration information. If the UE receives a PDCCH by using a control resource set and/or a search space other than a control resource set and search space for which repeated transmission is configured, the UE proceeds to step 1706 to operate using single decoding and single PDCCH reception, which is the existing PDCCH reception operation (a second reception operation). If the UE receives a PDCCH by using a control resource set and search space for which repeated transmission is configured in step 1704, the UE proceeds to step 1705 to perform a first reception operation. The one or more PDCCH candidates of the first search space (search space set) and the one or more PDCCH candidates of the second search space (search space set) may be linked based on having the same aggregation level and the same PDCCH candidate index, and the UE may receive a repeatedly transmitted PDCCH by monitoring the one or more PDCCH candidates of the first search space (search space set) and the one or more PDCCH candidates of the second search space (search space set) when the PDCCH candidates are linked. The first reception operation may mean that the UE determines that repeated transmission of a PDCCH is performed by using configuration information of the BS and uses a single PDCCH reception scheme, which is the existing PDCCH reception operation, or performs soft combining between PDCCH candidates which are assumed to be explicitly connected to each other and in which soft combining is possible.

Figure 18:
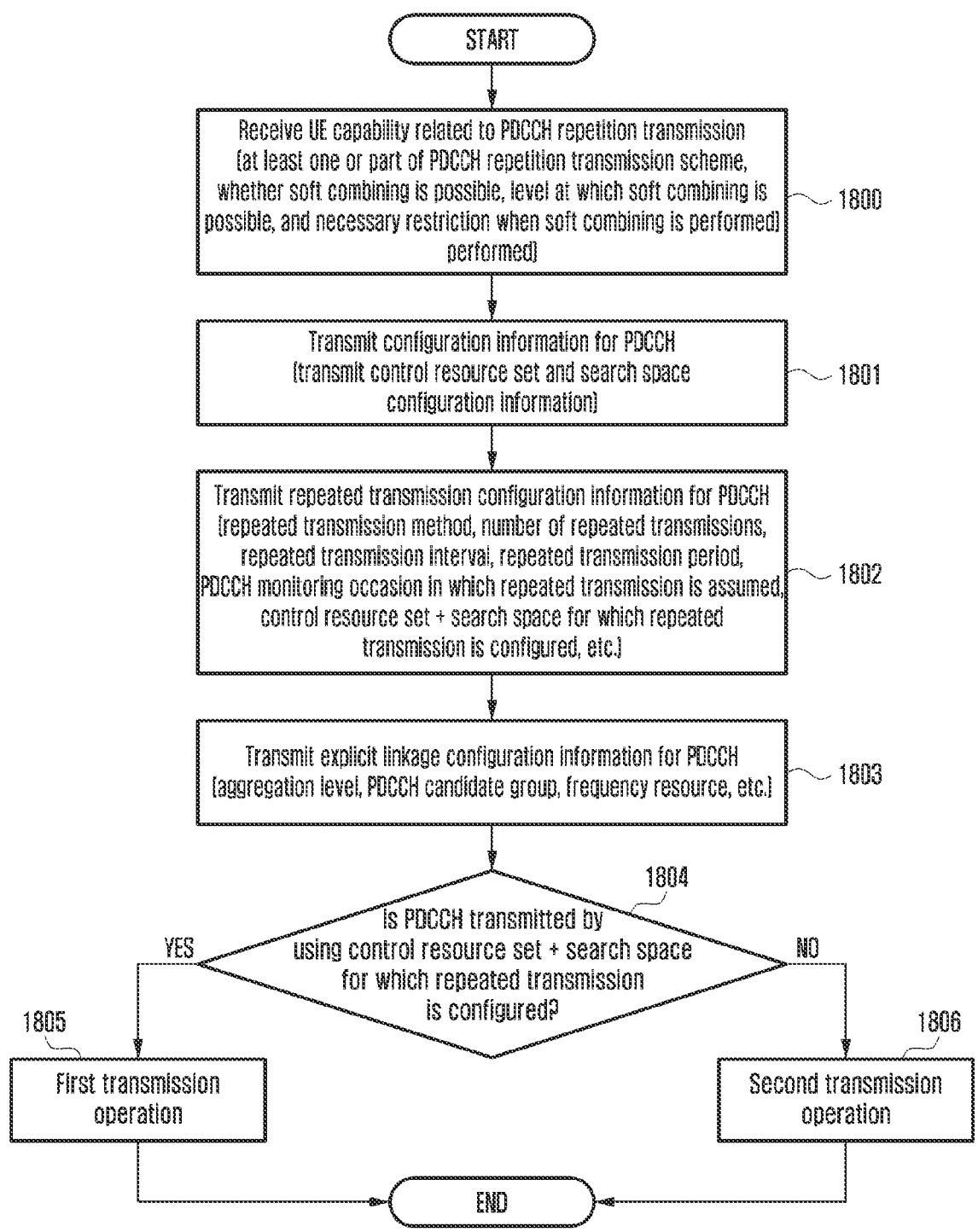
FIG. 18 illustrates a flow chart relating to an operation of a BS according to PDCCH repetition transmission configuration and explicit linkage configuration conditions of the BS and a terminal capability report during PDCCH repetition transmission, according to an embodiment of the disclosure.

FIG. 18 illustrates a flow chart relating to an operation of a BS according to PDCCH repetition transmission configuration and explicit linkage configuration conditions of the BS and a UE capability report during PDCCH repetition transmission, according to an embodiment of the disclosure.

Referring to FIG. 18, a BS receives a UE capability related to PDCCH repetition transmission from a UE in step 1800. In this case, the possible UE capability report may include at least one or a part of a PDCCH repetition transmission scheme (for example, the scheme may be one of the methods 1-1 to 1-5) supported by the UE and a soft combining-related UE capability reporting method (e.g., whether soft combining is possible, a level at which soft combining is possible, or a necessary restriction when soft combining is performed). In addition, the reported UE capability may include restriction information associated with PDCCH repetition transmission (e.g., information on a restriction associated with linked PDCCH candidates of a pair of linked search spaces). The UE capability report may include a restriction on at least one of the number of different cells in which PDCCH repetition transmission may be configured, the maximum number of pairs of two linked search spaces, the maximum number of pairs of two linked search spaces which may exist within one slot, or the maximum number of linked PDCCH candidates in a pair of linked search spaces (within one slot). A restriction associated with the maximum number of linked PDCCH candidates may be indicated for each component carrier. A restriction associated with the maximum number of linked PDCCH candidates may be configured differently according to an aggregation level. When information on the UE capability is pre-configured for the corresponding UE, step 1800 may be omitted. In addition, when the information on the UE capability is equally applied as default information to UEs of a predetermined group, step 1800 may be omitted.

Thereafter, the BS transmits first configuration information for a PDCCH to the UE in step 1801. The first configuration information (e.g., PDCCH-Config) may include control resource set configuration information (e.g., a control resource set list configured for a PDCCH) and search space configuration information (e.g., a search space list configured for a PDCCH). One or more search spaces may be configured based on the first configuration information.

The UE receives second configuration information for PDCCH repetition transmission in step 1802. In this case, the second configuration information may include at least one information among a repeated transmission method, the number of repeated transmissions, a repeated transmission interval, a repeated transmission period, a PDCCH monitoring occasion in which repeated transmission is assumed, whether a connection (linkage or association) between repeated transmissions can be identified, and information on a control resource set and search space for which repeated transmission is configured. The information on the control resource set and search space for which repeated transmission is configured may correspond to an RRC parameter searchSpace IE. The information on the control resource set and search space for which repeated transmission is configured may include a search space ID, an ID of a control resource set associated with the corresponding search space, and a parameter for configuring PDCCH repetition transmission. It may be configured and indicated to the UE that a connection (linkage or association) is established between repeated PDCCH candidates, based on the parameter for configuring PDCCH repetition transmission. A connection between one or more PDCCH candidates of a first search space (search space set) and one or more PDCCH candidates of a second search space (search space set) may be configured based on the configuration information.

In addition, the BS transmits third configuration information in step 1803. In this case, the third configuration information may include information on at least one of an aggregation level, a PDCCH candidate group, and a frequency resource, or none of them may be included in the third configuration information. The number of PDCCH candidates of each search space (search space set) may be configured for each aggregation level based on the third configuration information. In addition, the BS can transmit at least a part of the first configuration information to the third configuration information via L1 signaling, or immanently determine at least a part thereof, based on another configuration information. In addition, the first to the third configuration information may be included in one configuration information and provided to the UE.

The BS, having transmitted the configuration information, identifies that transmission is performed using a plurality of control resource sets and search spaces for which repeated transmission is configured in step 1804, and if a PDCCH is transmitted by using a control resource set and/or a search space other than a control resource set and search space for which repeated transmission is configured, the BS proceeds to step 1806 and operates based on a single PDCCH transmission (a second transmission operation), which is the existing PDCCH transmission operation. If a PDCCH is transmitted by using the plurality of control resource sets and search spaces for which repeated transmission is configured in step 1804, the BS proceeds to step 1805 and performs a first transmission operation in step 1805. The one or more PDCCH candidates of the first search space (search space set) and the one or more PDCCH candidates of the second search space (search space set) may be linked based on having the same aggregation level and the same PDCCH candidate index, and the BS may perform PDCCH repetition transmission in the one or more PDCCH candidates of the first search space (search space set) and the one or more PDCCH candidates of the second search space (search space set) when PDCCH candidates are linked. The first transmission operation may be a transmission operation that is performed when the UE determines that repeated transmission of a PDCCH is performed by using configuration information of the BS using a single PDCCH reception scheme, which is the existing PDCCH reception operation, or performs soft combining between PDCCH candidates which are assumed to be explicitly linked to each other and in which soft combining is possible, and includes a PDCCH repetition transmission from the BS to the UE.

Figure 19:
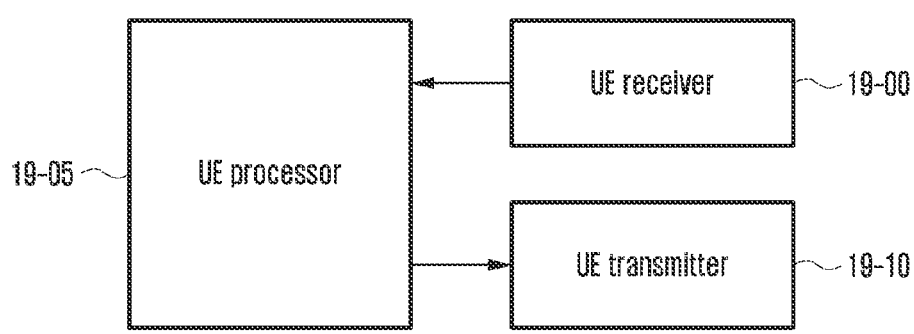
FIG. 19 illustrates a structure of the UE in a wireless communication system, according to an embodiment of the disclosure.

FIG. 19 illustrates a structure of a UE in a wireless communication system, according to an embodiment of the disclosure.

Referring to FIG. 19, the UE may include a transceiver including a UE receiver 19-00 and a UE transmitter 19-10, a memory, and a UE processor 19-05 (or a UE controller or a processor). The transceiver is made up of the receiver 19-00 and the UE transmitter 19-10. The memory and the UE processor 19-05 may operate according to the above-described communication method of the UE. However, the elements of the UE are not limited to the above example. For example, the UE may include more or fewer elements than the above elements. Also, the transmitter 19-10, the memory, and the processor may 19-05 be implemented in the form of a single chip.

The transceiver may transmit and receive a signal to and from the BS. The signal may include control information and data. To this end, the transceiver may include a radio frequency (RF) transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media such as a read only memory (ROM), a random access memory (RAM), a hard disc, a compact disc (CD)-ROM, and a digital versatile disc (DVD), or a combination of the storage media. The number of memories may be plural.

The processor 19-05 may control a series of processes to allow the UE to operate according to the above embodiments. For example, the processor 19-05 may control elements of the UE to receive DCI including two layers and simultaneously receive a plurality of PDSCHs, and/or control elements of the UE to receive the PDCCH repeatedly transmitted from the linked PDCCH candidates. The number of processors 19-05 may be plural, and the processor 19-05 may perform an operation of controlling the elements of the UE by executing the program stored in the memory.

Figure 20:
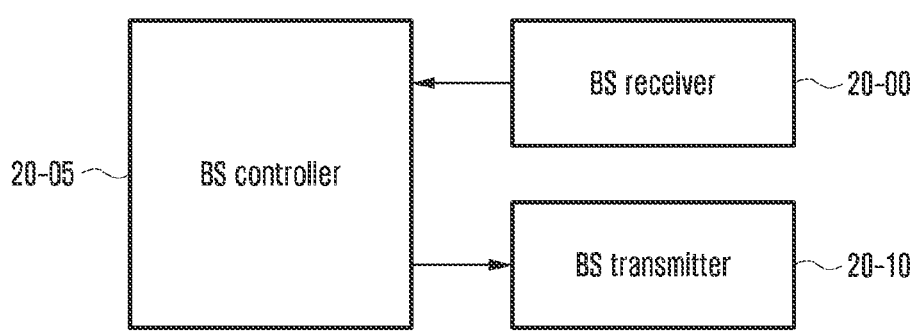
FIG. 20 illustrates a structure of the BS in a wireless communication system, according to an embodiment of the disclosure.

FIG. 20 illustrates a structure of a BS in a wireless communication system, according to an embodiment of the disclosure.

Referring to FIG. 20, the BS may include a transceiver including a BS receiver 20-00 and a BS transmitter 20-10, a memory, and a BS processor 20-05 (or a BS controller or a processor). The transceiver may include the receiver 20-00 and the transmitter 20-10 of the BS, the memory, and the BS processor 20-05 may operate according to the communication method of the BS. However, the elements of the BS are not limited to the above example. For example, the BS may include more or fewer elements than the above-described elements. Also, the transceiver 20-10, the memory, and the processor 20-05 may be implemented in the form of a single chip.

The transceiver 20-10 may transmit and receive a signal to/from the UE. The signal may include control information and data. To this end, the transceiver 20-10 may include an RF transmitter for up-converting and amplifying a frequency of the transmitted signal and an RF receiver for low-noise amplifying the received signal and down-converting the frequency. However, this is only an example of the transmitter 20-10, and elements of the transceiver are not limited to the RF transmitter and the RF receiver.

The transceiver may receive a signal through a radio channel, output the signal to the processor 20-05, and transmit the signal output from the processor through the radio channel.

The memory may store a program and data required for the operation of the BS. The memory may store control information or data included in a signal transmitted and received by the BS. The memory may be configured by storage media such as ROM, RAM, hard disc, CD-ROM, and DVD, or a combination of the storage media. The number of memories may be plural.

The processor 20-05 may control a series of processes to allow the BS to operate according to the embodiments of the disclosure. For example, the processor 20-05 may configure DCI of two layers including allocation information of a plurality of PDSCHs and control each element of the BS to transmit the DCI, establish a linkage between PDCCH candidates of a pair of search spaces for repetition of PDCCH transmission, and/or control each component of the BS to repeatedly transmit the PDCCH. The number of processors 20-05 may be plural, and the processor 20-05 may perform an operation of controlling the elements of the BS by executing the program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a terminal. As an example, a first and second embodiment of the disclosure may be combined with each other to operate a BS and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a terminal in a wireless communication system, the method comprising:
    transmitting capability information associated with physical downlink control channel (PDCCH) repetitions, the capability information including information on a limit associated with a total number of linked PDCCH candidates per component carrier (CC);
    receiving configuration information for configuring one or more search space (SS) sets;
    identifying that a first SS set associated with one or more PDCCH candidates is linked to a second SS set associated with one or more PDCCH candidates based on the configuration information; and
    monitoring one or more PDCCH candidates in the first SS set and one or more PDCCH candidates in the second SS set,
    wherein a first PDCCH candidate in the first SS set and a second PDCCH candidate in the second SS set that are linked to the first SS set have an identical aggregation level.

2. The method of claim 1,
    wherein a number of PDCCH candidates in each SS set is configured per each aggregation level based on the configuration information, and
    wherein the limit associated with the total number of linked PDCCH candidates depends on each aggregation level.

3. A method performed by a base station in a wireless communication system, the method comprising:
    receiving, from a terminal, capability information associated with physical downlink control channel (PDCCH) repetitions, the capability information including information on a limit associated with a total number of linked PDCCH candidates per component carrier (CC);
    transmitting, to the terminal, configuration information for configuring one or more search space (SS) sets; and
    transmitting repeatedly, to the terminal, a PDCCH in one or more PDCCH candidates in a first SS set and one or more PDCCH candidates in a second SS set, the first SS set being linked to the second SS set based on the configuration information,
    wherein a first PDCCH candidates in the first SS set and a second PDCCH candidates in the second SS set that are linked to the first SS set have an identical aggregation level.

4. The method of claim 3,
    wherein a number of PDCCH candidates in each SS set is configured per each aggregation level based on the configuration information, and
    wherein the limit associated with the total number of linked PDCCH candidates depends on each aggregation level.

5. A terminal in a wireless communication system, the terminal comprising:
    a transceiver; and
    a controller configured to:
    transmit, to a base station, capability information associated with physical downlink control channel (PDCCH) repetitions, the capability information including information on a limit associated with a total number of linked PDCCH candidates per component carrier (CC),
    receive, from the base station, configuration information for configuring one or more search space (SS) sets,
    identify that a first SS set associated with one or more PDCCH candidates is linked to a second SS set associated with one or more PDCCH candidates based on the configuration information; and monitor one or more PDCCH candidates in the first SS set and one or more PDCCH candidates in the second SS, wherein a first PDCCH candidates in the first SS set and a second PDCCH candidate in the second SS set that are linked to the first SS set have an identical aggregation level.

6. The terminal of claim 5, wherein a number of PDCCH candidates in each SS set is configured per each aggregation level based on the configuration information, wherein the limit associated with the total number of linked PDCCH candidates depends on each aggregation level.

7. A base station in a wireless communication system, the base station comprising:

a transceiver; and a controller configured to:

receive, from a terminal, capability information associated with physical downlink control channel (PDCCH) repetitions, the capability information including information on a limit associated with a total number of linked PDCCH candidates per component carrier (CC), transmitting, to the terminal, configuration information for configuring one or more search space (SS) sets, transmit repeatedly, to the terminal, a PDCCH in one or more PDCCH candidates in a first SS set and one or more PDCCH candidates in a second SS set, the first SS set being linked to the second SS set based on the configuration information, wherein a first PDCCH candidates in the first SS set and a second PDCCH candidates in the second SS set that are linked to the first SS set have an identical aggregation level.

\* \* \* \* \*